US012684438B2

(12) United States Patent
Teyeb et al.

(10) Patent No.: US 12,684,438 B2
(45) **Date of Patent: \*Jul. 14, 2026**

(54) HANDLING OF BUFFERED TRAFFIC DURING INTER-CU MIGRATION OF AN ANCESTOR INTEGRATED ACCESS BACKHAUL (IAB) NODE

(71) Applicant: Telefonaktiebolaget LM Ericsson (publ), Stockholm (SE)

(72) Inventors: Oumer Teyeb, Montréal (CA); Filip Barac, Huddinge (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

This patent is subject to a terminal disclaimer.

(21) Appl. No.: 18/017,756

(22) PCT Filed: Jul. 30, 2021

(86) PCT No.: PCT/SE2021/050764
§ 371 (c)(1),
(2) Date: Jan. 24, 2023

(87) PCT Pub. No.: WO2022/025818
PCT Pub. Date: Feb. 3, 2022

(65) Prior Publication Data
US 2023/0328604 A1      Oct. 12, 2023

Related U.S. Application Data

(60) Provisional application No. 63/059,714, filed on Jul. 31, 2020.

(51) Int. Cl.
*H04W 36/02*      (2009.01)
*H04W 36/08*      (2009.01)

(52) U.S. Cl.
CPC ...... *H04W 36/0235* (2023.05); *H04W 36/087* (2023.05)

(58) Field of Classification Search
CPC ............... H04W 36/023; H04W 36/08; H04W 36/0235; H04W 36/087; H04W 84/047;
(Continued)

(56) References Cited

U.S. PATENT DOCUMENTS

2021/0051695 A1 *  2/2021  Majmundar .......... H04W 72/21
2021/0160735 A1 *  5/2021  Fujishiro ........... H04W 28/0278
(Continued)

FOREIGN PATENT DOCUMENTS

WO        2019194486 A1    10/2019
WO        2019246446 A1    12/2019
(Continued)

OTHER PUBLICATIONS

International Search Report and Written Opinion of the International Searching Authority for PCT International Application No. PCT/SE2021/050764 dated Nov. 16, 2021.
(Continued)

*Primary Examiner* — Ji-Hae Yea
(74) *Attorney, Agent, or Firm* — Sage Patent Group

(57) ABSTRACT

Embodiments include methods performed by a first network node arranged as an ancestor node of a second network node in an Integrated Access Backhaul (IAB) network. Such methods include determining that the second network node is migrating from a first centralized unit (CU) to a second CU and, based on determining that the second network node is migrating from the first CU to the second CU, performing modified handling of buffered data associated with the second network node, including at least one of the following: uplink (UL) data buffered at the first network node, downlink (DL) data buffered at the first network node, and
(Continued)

UL data buffered at one or more child nodes of the first network node. Other embodiments include complementary methods for a first CU, as well as network nodes (e.g., IAB nodes, distributed units, CUs) configured to perform such methods.

18 Claims, 18 Drawing Sheets

(58) Field of Classification Search
CPC ............. H04W 88/085; H04W 36/083; H04W 36/085; H04W 36/13
See application file for complete search history.

(56) References Cited

U.S. PATENT DOCUMENTS

| 2021/0185755 A1* | 6/2021 | Kim | .................... H04W 68/005 |
| 2022/0014976 A1* | 1/2022 | Luo | .................... H04W 36/0044 |

FOREIGN PATENT DOCUMENTS

| WO | WO-2020032127 A1 * | 2/2020 | ........ H04W 36/0064 |
| WO | 2020065446 A1 | 4/2020 | |

OTHER PUBLICATIONS

LG Electronics Inc., "E2E reliability in hop-by-hop RLC ARQ," R2-1904942, 3GPP TSG-RAN WG2 #105bis, Xi'an, China, Apr. 8-12, 2019, 3 pages.

3GPP TS 38.300 V16.2.0, "3rd Generation Partnership Project; Technical Specification Group Radio Access Network; NR; NR and NG-RAN Overall Description; Stage 2 (Release 16)," Jul. 2020, 148 pages.

3GPP TS 38.331 V16.2.0, "3rd Generation Partnership Project; Technical Specification Group Radio Access Network; NR; Radio Resource Control (RRC) protocol specification (Release 16)," Sep. 2020, 921 pages.

3GPP TS 38.340 V16.2.0, "3rd Generation Partnership Project; Technical Specification Group Radio Access Network; NR; Backhaul Adaptation Protocol (BAP) specification (Release 16)," Sep. 2020, 22 pages.

3GPP TS 38.401 V16.2.0, "3rd Generation Partnership Project; Technical Specification Group Radio Access Network; NG-RAN; Architecture description (Release 16)," Jul. 2020, 77 pages.

Qualcomm, "New WID on Enhancements to Integrated Access and Backhaul," RP-193251, 3GPP TSG RAN Meeting #86, Sitges, Spain, Dec. 9-12, 2019, 5 pages.

3GPP TS 38.321 V16.1.0, "3rd Generation Partnership Project; Technical Specification Group Radio Access Network; NR; Medium Access Control (MAC) protocol specification (Release 16)," Jul. 2020, 151 pages.

ETSI TS 138 473 V16.2.0, "5G; NG-RAN; F1 Application Protocol (F1AP) (3GPP TS 38.473 version 16.2.0 Release 16)," Jul. 2020, 366 pages.

* cited by examiner

| UE | Source gNB-DU | Target gNB-DU | gNB-CU |
|---|---|---|---|

Downlink user data

Uplink user data

1. *MeasurementReport*

2. UL RRC MESSAGE TRANSFER
(*MeasurementReport*)

3. UE CONTEXT SETUP REQUEST

4. UE CONTEXT SETUP RESPONSE

5. UE CONTEXT MODIFICATION REQUEST
(*RRCReconfigration*)

6. *RRCReconfiguration*

Downlink Data Delivery Status

7. UE CONTEXT MODIFICATION RESPONSE

8. Random Access Procedure

Downlink Data Delivery Status

9. *RRCReconfigurationComplete*

Downlink User Data

10. UL RRC MESSAGE TRANSFER
(*RRCReconfigurationComplete*)

Downlink user data

Uplink user data

11. UE CONTEXT RELEASE COMMAND

12. UE CONTEXT RELEASE COMPLETE

Fig. 9

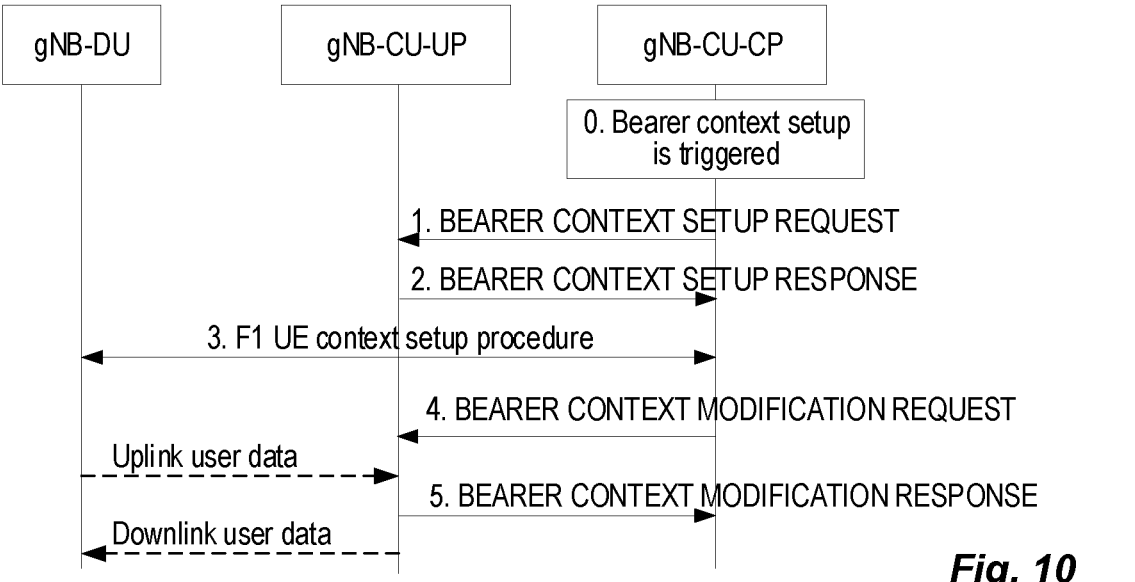

| gNB-DU | gNB-CU-UP | gNB-CU-CP |
|---|---|---|

0. Bearer context setup is triggered

1. BEARER CONTEXT SETUP REQUEST

2. BEARER CONTEXT SETUP RESPONSE

3. F1 UE context setup procedure

4. BEARER CONTEXT MODIFICATION REQUEST

Uplink user data

5. BEARER CONTEXT MODIFICATION RESPONSE

Downlink user data

Fig. 10

```
-- ASN1START
-- TAG-HANDOVER-COMMAND-START

HandoverCommand ::=                    SEQUENCE {
    criticalExtensions                    CHOICE {
        c1                                    CHOICE{
            handoverCommand                       HandoverCommand-IEs,
            spare3 NULL, spare2 NULL, spare1 NULL
        },
        criticalExtensionsFuture          SEQUENCE {}
    }
}

HandoverCommand-IEs ::=                SEQUENCE {
    handoverCommandMessage                OCTET STRING (CONTAINING RRCReconfiguration),
    nonCriticalExtension                  SEQUENCE {}                    OPTIONAL
}

-- TAG-HANDOVER-COMMAND-STOP
-- ASN1STOP
```

Fig. 15

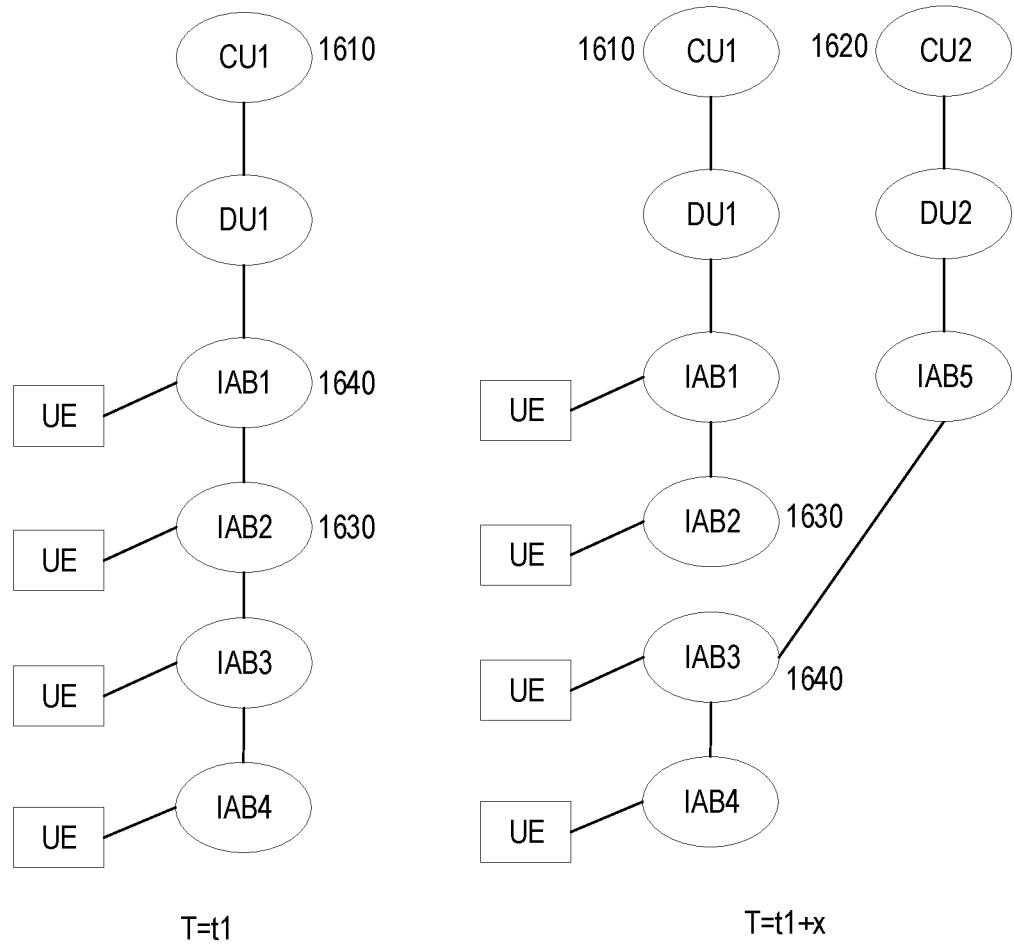

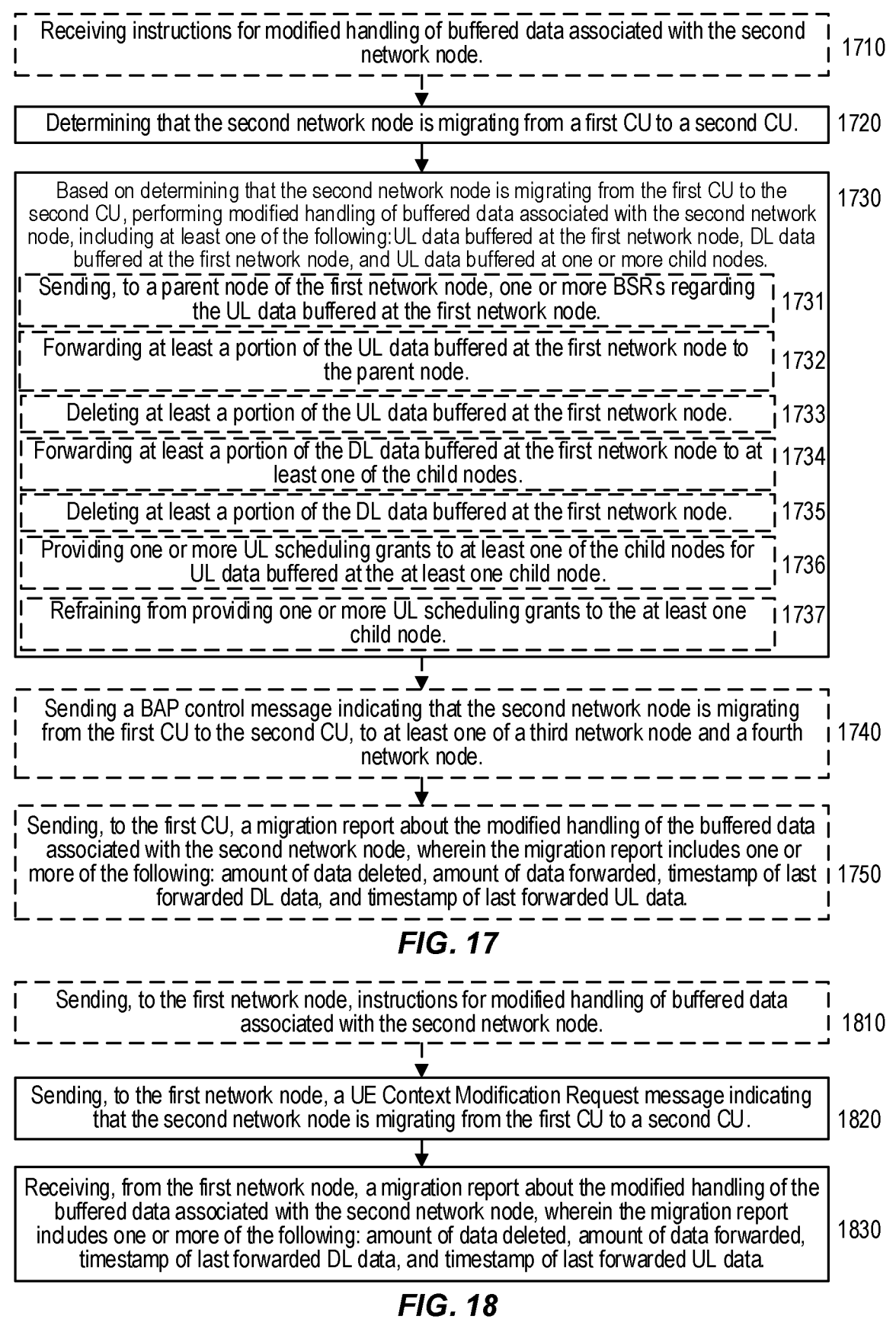

Receiving instructions for modified handling of buffered data associated with the second network node. — 1710

Determining that the second network node is migrating from a first CU to a second CU. — 1720

Based on determining that the second network node is migrating from the first CU to the second CU, performing modified handling of buffered data associated with the second network node, including at least one of the following: UL data buffered at the first network node, DL data buffered at the first network node, and UL data buffered at one or more child nodes. — 1730

Sending, to a parent node of the first network node, one or more BSRs regarding the UL data buffered at the first network node. — 1731

Forwarding at least a portion of the UL data buffered at the first network node to the parent node. — 1732

Deleting at least a portion of the UL data buffered at the first network node. — 1733

Forwarding at least a portion of the DL data buffered at the first network node to at least one of the child nodes. — 1734

Deleting at least a portion of the DL data buffered at the first network node. — 1735

Providing one or more UL scheduling grants to at least one of the child nodes for UL data buffered at the at least one child node. — 1736

Refraining from providing one or more UL scheduling grants to the at least one child node. — 1737

Sending a BAP control message indicating that the second network node is migrating from the first CU to the second CU, to at least one of a third network node and a fourth network node. — 1740

Sending, to the first CU, a migration report about the modified handling of the buffered data associated with the second network node, wherein the migration report includes one or more of the following: amount of data deleted, amount of data forwarded, timestamp of last forwarded DL data, and timestamp of last forwarded UL data. — 1750

*FIG. 17*

Sending, to the first network node, instructions for modified handling of buffered data associated with the second network node. — 1810

Sending, to the first network node, a UE Context Modification Request message indicating that the second network node is migrating from the first CU to a second CU. — 1820

Receiving, from the first network node, a migration report about the modified handling of the buffered data associated with the second network node, wherein the migration report includes one or more of the following: amount of data deleted, amount of data forwarded, timestamp of last forwarded DL data, and timestamp of last forwarded UL data. — 1830

*FIG. 18*

HANDLING OF BUFFERED TRAFFIC DURING INTER-CU MIGRATION OF AN ANCESTOR INTEGRATED ACCESS BACKHAUL (IAB) NODE

CROSS REFERENCE TO RELATED APPLICATIONS

This application is a 35 U.S.C. § 371 national stage application of PCT International Application No. PCT/SE2021/050764 filed on Jul. 30, 2021, which claims the benefit of U.S. Provisional Patent Application Ser. No. 63/059,714, filed on Jul. 31, 2020, the disclosures and content of which are incorporated by reference herein in their entireties.

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

INTRODUCTION

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of the 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, including Session Management Function(s) (SMF).

Although not shown, in some deployments 5GC 198 can be replaced by an Evolved Packet Core (EPC), which conventionally has been used together with a Long-Term Evolution (LTE) Evolved UMTS RAN (E-UTRAN). In such deployments, gNBs 100, 150 can connect to one or more Mobility Management Entities (MMEs) in EPC 198 via respective S1-C interfaces. Similarly, gNBs 100, 150 can connect to one or more Serving Gateways (SGWs) in EPC via respective NG-U interfaces.

In addition, the gNBs can be connected to each other via one or more Xn interfaces, such as Xn interface 140 between gNBs 100 and 150. The radio technology for the NG-RAN is often referred to as "New Radio" (NR). With respect to NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0).

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. F1 separates control plane (CP) and user plane (CP) into respective F1-AP protocol and F1-U protocols, such that a gNB-CU may also be separated in CP and UP. F1 also separates Radio Network Layer (RNL) and Transport Network Layer (TNL) functionality.

The F1-U protocol is also used to convey control information related to the user data flow management of data radio bearers, as defined in 3GPP TS 38.425 (v15.6.0). The F1-U protocol data is conveyed by the GTP-U protocol, more specifically by the "RAN Container" GTP-U extension header as defined in 3GPP TS 29.281 (v15.6.0). In other words, the GTP-U protocol over user datagram protocol (UDP) over Internet Protocol (IP) carries data streams on the F1 interface. A GTP-U "tunnel" between two nodes is identified in each node by tunnel endpoint identifier (TEID), an IP address, and a UDP port number. A GTP-U tunnel is necessary to enable forwarding packets between GTP-U entities.

A CU can host protocols such as RRC and PDCP, while a DU can host protocols such as RLC, MAC and PHY. In other variants, the RLC protocol can be split between CU and DU, with Automatic Retransmission Request (ARQ) functionality in CU. In other variants, a CU can host RRC and PDCP, where PDCP handles both UP (e.g., PDCP-U) and CP (e.g., PDCP-C) traffic.

Furthermore, centralized control plane protocols (e.g., PDCP-C and RRC) can be hosted in a different CU than centralized user plane protocols (e.g., PDCP-U). In particular, it has also been agreed in 3GPP RAN3 Working Group (WG) to support a separation of the gNB-CU into a CU-CP function (including RRC and PDCP for signaling radio bearers) and CU-UP function (including PDCP for user plane). FIG. 2 shows an exemplary gNB architecture that includes two DUs, a CU-CP, and one or more CU-UPs. As shown in FIG. 2, a single CU-CP can be associated with multiple CU-UPs in a gNB. The CU-CP and CU-UP communicate with each other using the E1-AP protocol over the E1 interface, as specified in 3GPP TS 38.463 (v15.4.0). Furthermore, the F1 interface between CU and DU (see FIG. 1) is functionally split into F1-C between DU and CU-CP and F1-U between DU and CU-UP. The three deployment scenarios for the split gNB architecture shown in FIG. 2 are CU-CP and CU-UP centralized, CU-CP distributed/CU-UP centralized, and CU-CP centralized/CU-UP distributed.

Densification via deployment of more base stations is on mechanism used to satisfy increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative.

One such approach is an integrated access backhaul (JAB) network where the operator can repurpose radio resources conventionally used for network access (e.g., by wireless devices or UEs) for use to connect small cells to the operator's backhaul network. IAB was studied earlier in 3GPP in the scope of LTE Rel-10. That work produced an architecture based on a Relay Node (RN) with the functionality of an LTE eNB and UE modem. The RN is connected to a donor eNB which has a S1/X2 proxy functionality hiding the RN from the rest of the network. That architecture enabled the Donor eNB to also be aware of the UEs behind the RN, but hide any UE mobility between Donor eNB and connected RN(s) from the CN.

Similar IAB options can also be considered for 5G/NR networks. One difference compared to LTE is the gNB-CU/ DU split architecture described above, which separates time critical RLC/MAC/PHY protocols from less time critical RRC/PDCP protocols. In general, the 3GPP NR IAB specifications reuse existing functions and interfaces defined in NR. Each IAB node can include the functionality of a gNB-DU (also referred to as "IAB-DU") that terminates the radio interface layers of access links towards served UEs and backhaul links towards immediately downstream (or "child") IAB nodes.

Each IAB node can also include a Mobile-Termination function (referred to as MT or "IAB-MT") that terminates the radio interface layers of a backhaul link towards an immediately upstream (or "parent") DU, i.e., either an IAB-DU or a donor gNB. The MT functionality is similar to functionality that enables UEs to access the IAB network and has been specified by 3GPP as part of the Mobile Equipment (ME).

In addition to the connection to downstream IAB-MTs and/or UEs, each IAB-DU also has an upstream F1 connection to the CU part of a donor gNB, also referred to as an "IAB-donor CU". This connection is via a particular DU of the donor gNB, also referred to as an "IAB-donor DU". Each IAB-donor CU may be associated with multiple IAB-donor DUs, as illustrated in FIG. 1. In some scenarios, an IAB node may need to be migrated (or moved) during operation such that its connection is handed over to a different parent DU, i.e., IAB-DU or IAB-donor DU. This new parent DU may be connected to the same IAB-donor DU, a different IAB-donor DU but the same IAB-donor CU, or different IAB-donor DU and CU. There are various problems, issues, and/or difficulties with IAB-node migration to a different IAB-donor CU.

SUMMARY

Accordingly, embodiments of the present disclosure address these and other difficulties in integrating IAB nodes into a RAN, thereby enabling the otherwise-advantageous deployment of IAB solutions.

Embodiments of the present disclosure include methods (e.g., procedures) for a first network node arranged as an ancestor node of a second network node in an IAB network. In various embodiments, these exemplary methods can be performed by an IAB node or a donor DU.

These exemplary methods can include determining that the second network node is migrating from a first CU to a second CU. These exemplary methods can also include, based on determining that the second network node is migrating from the first CU to the second CU, performing modified handling of buffered data associated with the second network node, including at least one of the following: UL data buffered at the first network node, DL data buffered at the first network node, and UL data buffered at one or more child nodes of the first network node.

In some embodiments, performing the modified handling can include one or more of the following operations:
  sending, to a parent node of the first network node, one or more buffer status reports (BSR) regarding the UL data buffered at the first network node;
  forwarding at least a portion of the UL data buffered at the first network node to the parent node;
  deleting at least a portion of the UL data buffered at the first network node;
  forwarding at least a portion of the DL data buffered at the first network node to at least one of the child nodes;
  deleting at least a portion of the DL data buffered at the first network node;
  providing one or more UL scheduling grants to at least one of the child nodes for UL data buffered at the at least one child node; and
  refraining from providing one or more UL scheduling grants to the at least one child node.

In some embodiments, the UL and/or DL data associated with the second network node that is buffered at the first network node includes one or more of the following:
  UL data originating from the second network node;
  UL data originating from one or more descendant nodes of the second network node;
  UL data originating from UEs served directly or indirectly by the second network node;
  DL data destined for the second network node;
  DL data destined for one or more descendant nodes of the second network node; and
  DL data destined for UEs served directly or indirectly by the second network node.

In some embodiments, these exemplary methods can also include receiving instructions for modified handling of buffered data associated with the second network node. The modified handling can be performed in accordance with the instructions. In some embodiments, the instructions can include one or more of the following:
  one or more first criteria related to amounts of DL data buffered at the first network node; and
  one or more second criteria related to whether DL data buffered at the first network node should be deleted or forwarded to respective descendant nodes.

In some embodiments, the second criteria can include one or more of the following:

an indicator that all types of buffered DL data should be deleted or forwarded;

list of backhaul radio link control (BH RLC channels) whose buffered DL data should be forwarded;

list of BH RLC channels whose buffered DL data should be deleted;

list of access RLC channels whose buffered DL data should be forwarded;

list of access RLC channels whose buffered DL data should be deleted;

list of QoS profiles and/or priorities for which buffered DL data should be forwarded;

list of QoS profiles and/or priorities for which buffered DL data should be deleted;

list of backhaul adaptation protocol (BAP) routing identifiers for which buffered DL data should be forwarded; and list of BAP routing identifiers for which buffered DL data should be deleted.

In some embodiments, the instructions can also include one or more third criteria related to amounts of UL data buffered at the first network node; and one or more fourth criteria related to whether BSRs should be transmitted, to a parent node, for UL data buffered at the first network node. In some of these embodiments, each of the first and third criteria identify amounts according to one or more of the following: all buffered data; an explicit amount of buffered data; a percentage of buffered data; and a duration. In some of these embodiments, the fourth criteria can include one or more of the following:

an indicator that BSRs should be transmitted for all types of buffered UL data;

list of BH RLC channels for which BSRs should be transmitted;

list of access RLC channels for which BSRs should be transmitted;

list of QoS profiles and/or priorities for which BSRs should be transmitted; and list of BAP routing identifiers for which BSRs should be transmitted.

In some embodiments, the instructions can include a first configuration for handling UL data buffered at a first child node, a second configuration for handling UL data buffered at a second child node, and a third configuration for handling UL data buffered at both the first and second child nodes.

In other embodiments, the instructions can include one or more fifth criteria related to amounts of UL data buffered at the child nodes and one or more sixth criteria related to whether UL grants should be provided for UL data buffered at the child nodes. In some of these embodiments, the sixth criteria include one or more of the following:

an indicator that UL grants should be provided for all buffered UL data;

list of BH RLC channels for which UL grants should be provided;

list of access RLC channels for which UL grants should be provided;

list of QoS profiles and/or priorities for which UL grants should be provided; and list of BAP routing identifiers for which UL grants should be provided.

In some embodiments, these exemplary methods can also include sending, to the first CU, a migration report about the modified handling of the buffered data associated with the second network node. The migration report can include one or more of the following: amount of data deleted, amount of data forwarded, timestamp of last forwarded DL data, and timestamp of last forwarded UL data.

In some embodiments, determining that the second network node is migrating from the first CU to the second CU can be based on a UE Context Modification Request message from the first CU, or a BAP control message from the second network node or from a third network node arranged as child node of the first network node and as an ancestor node of the second network node. In some embodiments, the UE Context Modification Request message or the BAP control message includes respective BAP addresses of one or more descendant nodes, of the second network node, that are also involved in the inter-CU handover.

In some of these embodiments, determining that the second network node is migrating from the first CU to the second CU can be based on one of the following in the UE Context Modification Request message: an embedded RRC message, a separate indication that an embedded RRC message is for an inter-CU handover of the second network node to the second CU, or a BAP address of the second network node.

In other of these embodiments, determining that the second network node is migrating from the first CU to the second CU can be based on one of the following in the BAP control message: a message type indicator, and a BAP address of the second network node.

In some embodiments, these exemplary methods can also include sending a BAP control message indicating that the second network node is migrating from the first CU to the second CU, to at least one of the following:

a third network node arranged as a child node of the first network node and as an ancestor node of the second network node; and a fourth network node arranged as a parent node of the first network node.

Other embodiments include methods (e.g., procedures) for a first CU arranged as an ancestor node of first and second network nodes in an IAB network.

These exemplary methods can include sending, to the first network node, a UE Context Modification Request message indicating that the second network node is migrating from the first CU to a second CU in the IAB network. These exemplary methods can also include subsequently receiving, from the first network node, a migration report about modified handling of buffered data associated with the second network node. The buffered data can include at least one of the following: UL data buffered at the first network node, DL data buffered at the first network node, and UL data buffered at one or more child nodes of the first network node.

In some embodiments, the migration report includes one or more of the following: amount of data deleted, amount of data forwarded, timestamp of last forwarded DL data, and timestamp of last forwarded UL data.

In some embodiments, the UE Context Modification Request message indicates that the second network node is migrating from the first CU to the second CU based on one of the following: an embedded RRC message, a separate indication that an embedded RRC message is for an inter-CU handover of the second network node to the second CU, or a BAP address of the second network node. In some of these embodiments, the embedded RRC message is a handover (HO) command for the second network node. In some of these embodiments, the UE Context Modification Request message includes respective BAP addresses of one or more descendant nodes, of the second network node, that are also migrating from the first CU to the second CU.

In some embodiments, these exemplary methods can also include sending, to the first network node, instructions for modified handling of buffered data associated with the second network node. The migration report can be based on the instructions.

In some embodiments, the instructions can include one or more of the following: one or more first criteria related to amounts of DL data buffered at the first network node; and one or more second criteria related to whether DL data buffered at the first network node should be deleted or forwarded to respective descendant nodes. In some embodiments, the instructions can also include one or more third criteria related to amounts of UL data buffered at the first network node; and one or more fourth criteria related to whether BSRs should be transmitted, to a parent node, for UL data buffered at the first network node.

In various embodiments, the first, second, third, and fourth criteria can include any of the information and/or have any of the characteristics summarized above in relation to first network node embodiments.

In some embodiments, the instructions can include a first configuration for handling UL data buffered at a first child node, a second configuration for handling UL data buffered at a second child node, and a third configuration for handling UL data buffered at both the first and second child nodes.

In other embodiments, the instructions can include one or more fifth criteria related to amounts of UL data buffered at the child nodes and one or more sixth criteria related to whether UL grants should be provided for UL data buffered at the child nodes. In various embodiments, the sixth criteria can include any of the information and/or have any of the characteristics summarized above in relation to first network node embodiments.

Other embodiments include network nodes (e.g., IAB nodes, DUs, CUs) configured to perform operations corresponding to any of the exemplary methods described herein. Other embodiments also include non-transitory, computer-readable media storing computer-executable instructions that, when executed by processing circuitry, configure such network nodes to perform operations corresponding to any of the exemplary methods described herein.

These and other embodiments disclosed herein can reduce and/or minimize data packet losses before handover of a migrating IAB node is executed. Furthermore, embodiments can expedite delivery of data packets that were in flight before the handover is executed. In addition, embodiments can avoid unnecessary transmissions of packets destined to nodes or sent by nodes (i.e., IAB nodes, UEs) that have been already migrated to the second CU. Consequently, embodiments can reduce and/or avoid waste of radio and processing resources and unnecessary energy consumption at the UEs and IAB nodes.

These and other objects, features, and advantages of the present disclosure will become apparent upon reading the following Detailed Description in view of the Drawings briefly described below.

BRIEF DESCRIPTION OF THE DRAWINGS

FIG. 9 shows an exemplary inter-gNB-DU mobility procedure.

FIG. 10 shows an exemplary bearer context setup procedure.

FIG. 15 shows an exemplary ASN.1 data structure for a HandoverCommand message.

FIG. 16 shows an exemplary IAB node inter-CU migration scenario that illustrates various embodiments of the present disclosure.

FIG. 17 shows an exemplary method (e.g., procedure) for a first network node (e.g., IAB node, DU, etc.) of an IAB network, according to various embodiments of the present disclosure.

FIG. 18 shows an exemplary method (e.g., procedure) for a first CU of an IAB network, according to various embodiments of the present disclosure.

DETAILED DESCRIPTION

Figure 1:
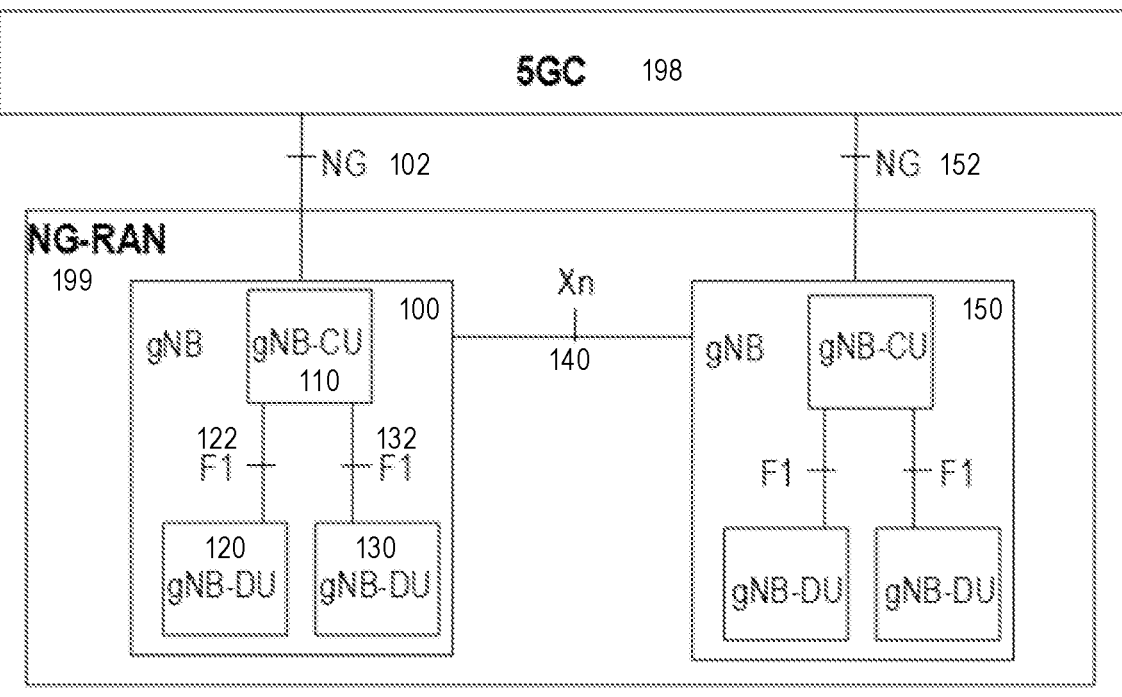
FIG. 1 shows a high-level view of the 5G network architecture, including central unit (CU)-distributed unit (DU) split architecture of gNBs.
Figure 2:
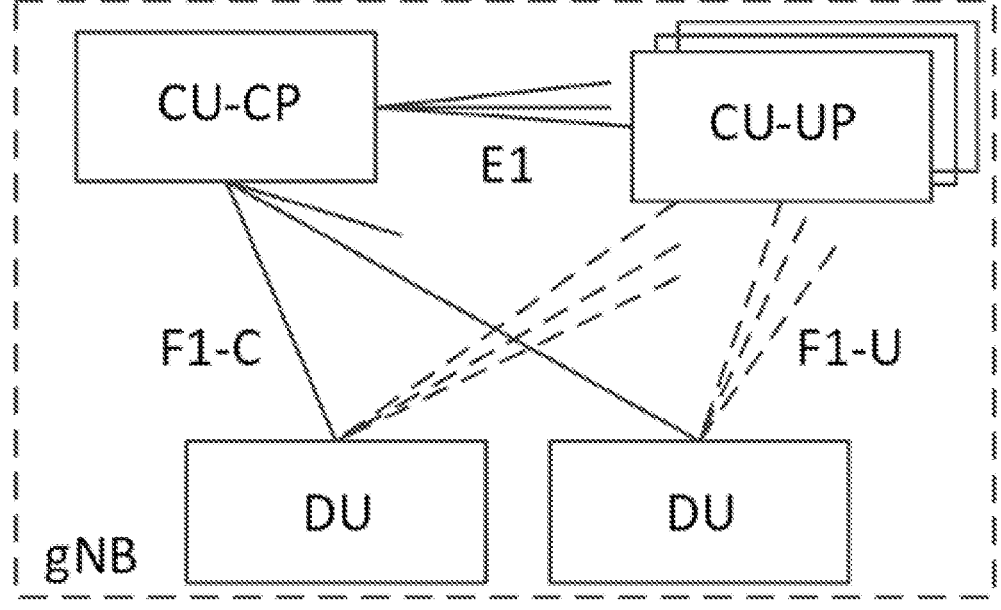
FIG. 2 shows the control-plane (CP) and user-plane (UP) interfaces within the split CU-DU architecture shown in FIG. 1.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (JAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Parent Node: As used herein, the term "parent node" (or "parent IAB node") refers to a node immediately upstream from a particular IAB node in an IAB network (e.g., an IAB node one hop closer to a donor gNB). Even so, a parent node may be only one of the nodes upstream from the particular IAB node in the network, e.g., if there are multiple hops to a donor gNB.

Ancestor Node: As used herein, the term "ancestor node" refers to any node upstream from a particular IAB node (e.g., towards a donor gNB) in an IAB network, including a parent node.

Child node: As used herein, the term "child node" (or "child IAB node') refers to a node immediately downstream from a particular IAB node (e.g., an IAB node one hop further from a donor gNB) in an IAB network. Even so, a child node may be only one of the nodes downstream from the particular IAB node in the network, e.g., if there are multiple hops to served UEs.

Descendant Node: As used herein, the term "descendant node" refers to any node downstream from a particular IAB node (e.g., away from a donor gNB) in an IAB network, including a child node.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, an IAB node may need to be migrated (or moved) during operation such that its connection is handed over to a different parent node, i.e., IAB-DU or IAB-donor DU. This new parent node may be connected to the same IAB-donor DU, a different IAB-donor DU but the same IAB-donor CU, or a different IAB-donor CU. There are various problems, issues, and/or difficulties with IAB-node migration to a different IAB-donor CU. This is discussed in more detail below, after the following discussion of IAB network architecture and protocols.

Figure 3:
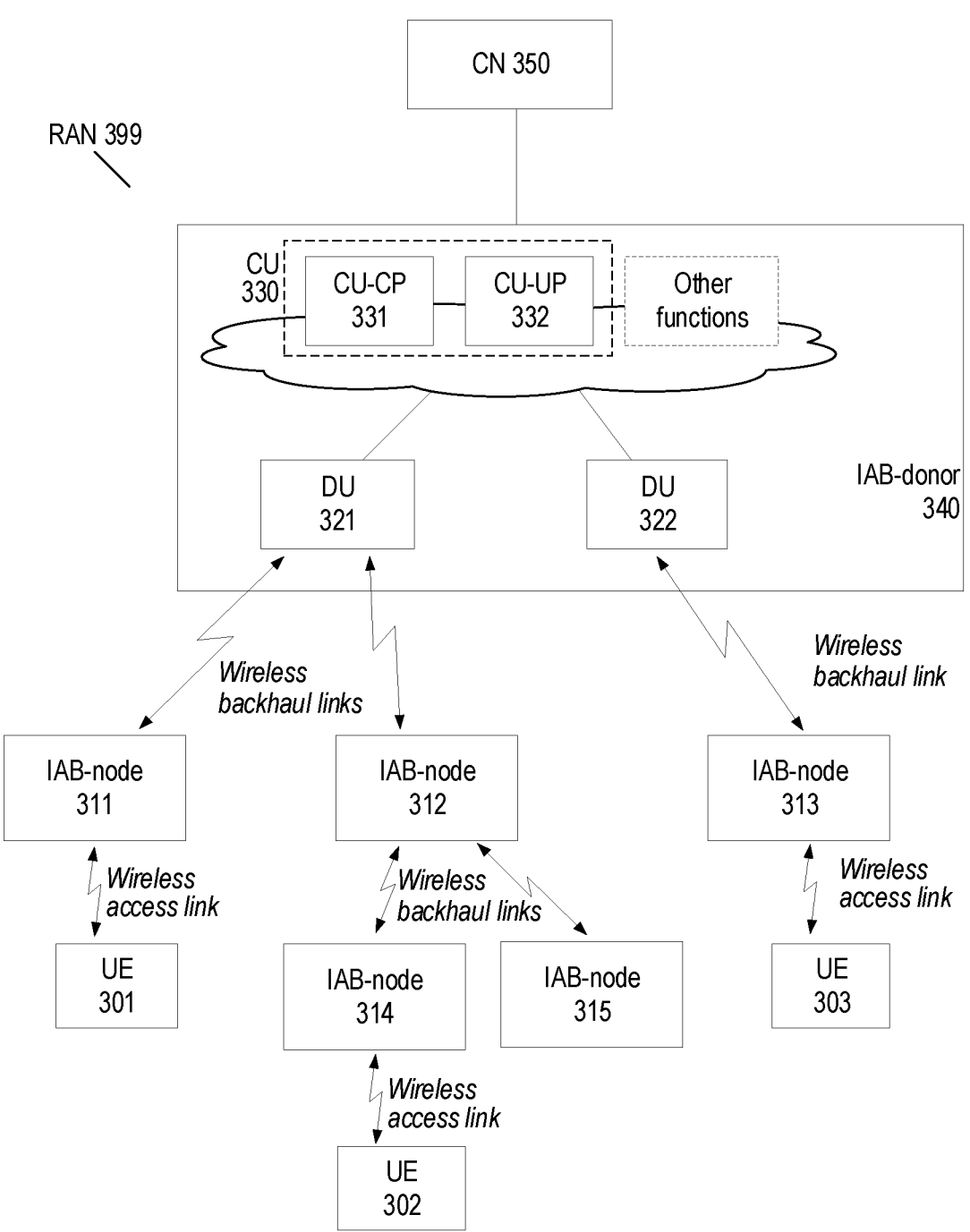
FIG. 3 shows a reference diagram for an integrated access backhaul (JAB) network in standalone mode.

FIG. 3 shows a reference diagram for an IAB network in standalone mode, as further explained in 3GPP TR 38.874 (version 0.2.1). The IAB network shown in FIG. 3 includes one IAB-donor 340 and multiple IAB-nodes 311-315, all of which can be part of a radio access network (RAN 399) such as an NG-RAN. IAB donor 340 includes DUs 321, 322 connected to a CU 330, which is represented by functions CU-CP 331 and CU-UP 332. IAB donor 340 can communicate with core network (CN) 350 via the CU functionality shown.

Each of the IAB nodes 311-315 connects to the IAB-donor via one or more wireless backhaul links (also referred to herein as "hops"). More specifically, the Mobile-Termination (MT) function of each IAB-node 311-315 terminates the radio interface layers of a wireless backhaul link towards a corresponding ancestor DU function. This MT functionality is similar to functionality that enables UEs to access the IAB network and, in fact, has been specified by 3GPP as part of the Mobile Equipment (ME). However, IAB functionality is transparent to UEs, such that UEs are unaware if they are being served by a conventional gNB or an IAB-donor gNB via one or more intermediate IAB nodes.

In the context of FIG. 3, ancestor DUs can include either DU 321 or 322 of IAB donor 340 and, in some cases, a DU function of an intermediate IAB node that is descendant from IAB donor 340. As a more specific example, IAB-node 314 is descendant from IAB-node 312 and DU 321, IAB-node 312 is an ancestor of IAB-node 314 but a descendant of DU 321, and DU 321 is an ancestor of IAB-nodes 312 and 314. The DU functionality of IAB nodes 311-315 also terminates the radio interface layers of wireless access links towards UEs (e.g., for network access via the DU) and wireless backhaul links towards other descendant IAB nodes. Accordingly, IAB-nodes 311, 313, and 314 can be considered "access IAB nodes" for UEs 301, 303, and 302, respectively, and that term will be used in the same manner hereinafter.

As shown in FIG. 3, IAB-donor 340 can be treated as a single logical node that comprises a set of functions such as gNB-DUs 321-322, gNB-CU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In general, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

Figures 4, 5:
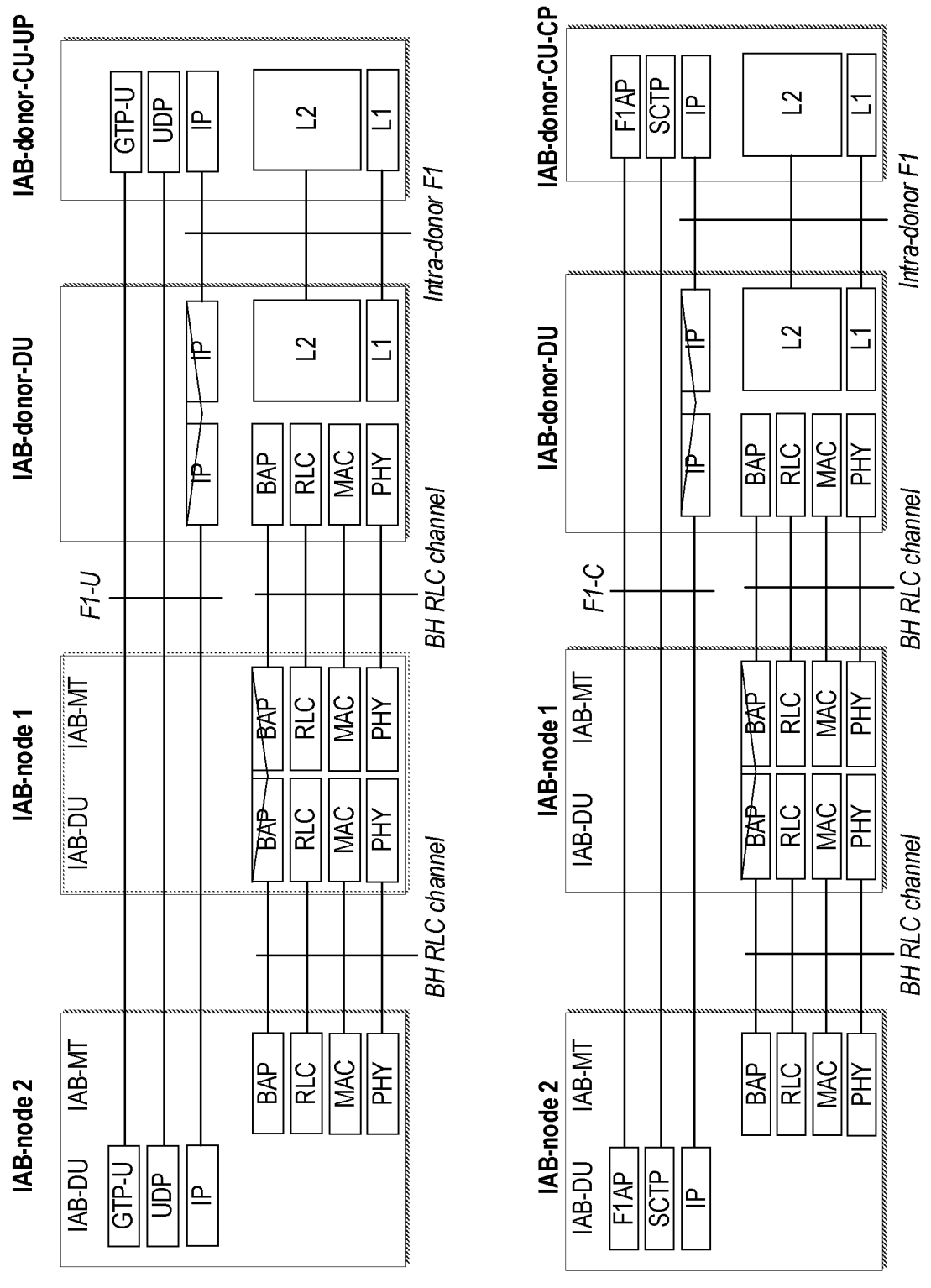
FIGS. 4-5 show exemplary IAB UP and CP protocol stacks, respectively.

FIGS. 4-5 show exemplary IAB user plane (UP) and control plane (CP) protocol stacks, respectively, as defined in 3GPP Rel-16. As shown in these figures, the chosen protocol stacks reuse the current CU-DU split specified in 3GPP Rel-15. The full F1-U interface (GTP-U/UDP/IP) and the full F1-C interface (F1-AP/SCTP/IP) are terminated at the IAB node like a conventional DU. Network Domain Security (NDS) can be used to protect both UP and CP traffic: IPsec for UP, datagram transport layer security (DTLS) for CP. IPsec could also be used for the CP protection instead of DTLS.

A Backhaul Adaptation Protocol (BAP) layer has been introduced in the IAB nodes and the IAB donor. The BAP layer routes packets to the appropriate downstream/upstream node. The BAP layer also maps UE bearer data to the proper backhaul RLC channel (also referred to herein as "backhaul RLC bearers"), as well as between ingress and egress backhaul RLC channels in intermediate IAB nodes. In particular, a node is a receiver on its ingress BH RLC channels and a transmitter on its egress BH RLC channels, irrespective of whether the direction is upstream or downstream in the IAB network. In contrast, communications between a UE and its access IAB node takes place over "access RLC channels."

The BAP layer can be configured to satisfy the end-to-end QoS requirements of bearers. On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. Each transmitting part of a BAP entity on one end of a backhaul link has a corresponding receiving part of a BAP entity at the other end of the backhaul link across the backhaul link (e.g., in an IAB-node or an IAB-donor-DU, as the case may be).

In general, a BAP sublayer expects lower layers per RLC entity to provide acknowledged or unacknowledged data transfer service for BAP SDUs. In addition, the BAP sublayer supports the following functions:

Data transfer;

Determination of BAP destination and path for packets from upper layers;

Determination of egress BH RLC channels for packets routed to next hop;

Routing of packets to next hop;

Differentiating traffic to be delivered to upper layers from traffic to be delivered to egress link; and Flow control feedback and polling signaling.

Figure 6:
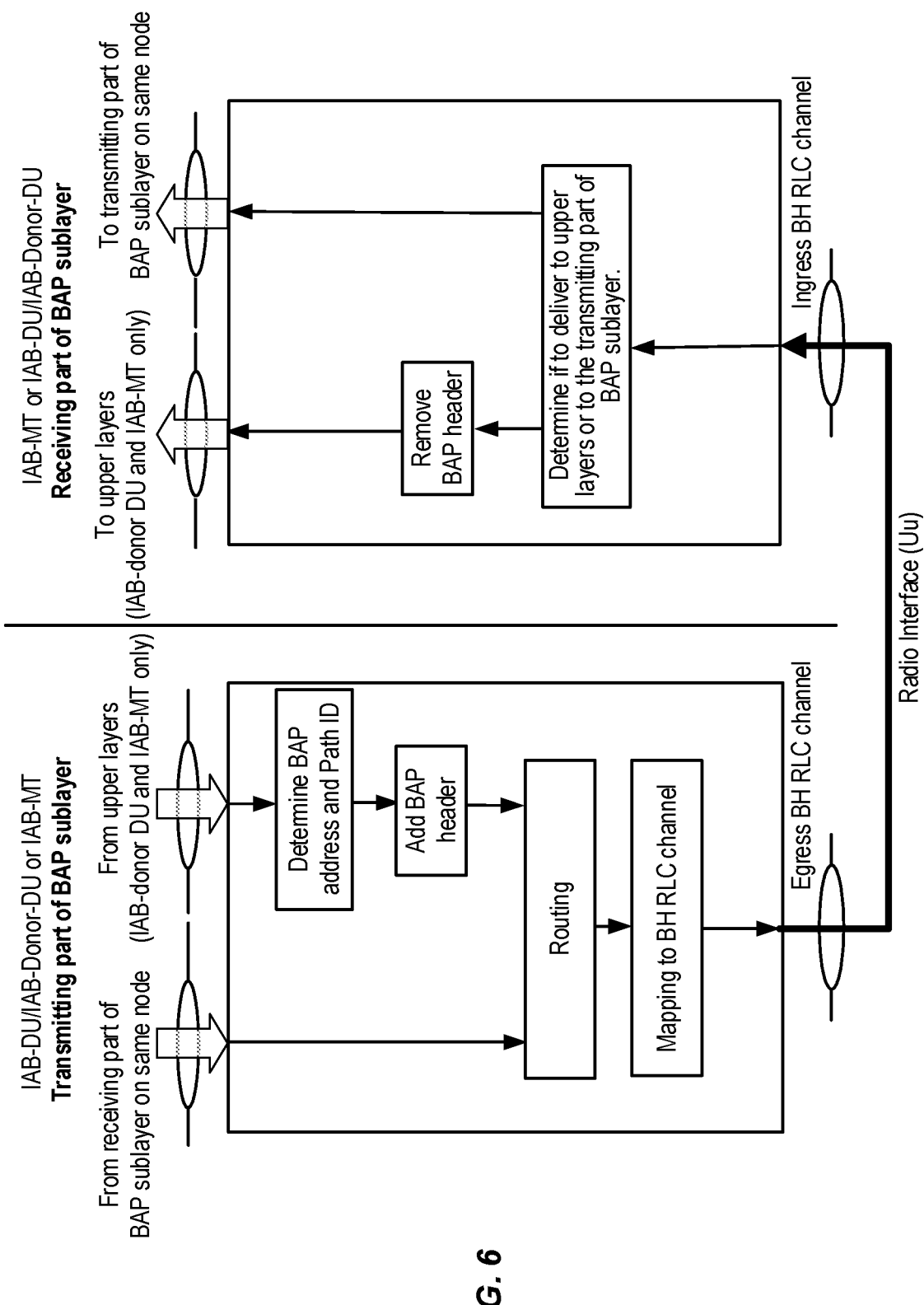
FIG. 6 shows a functional view of an exemplary IAB backhaul adaptation protocol (BAP) sublayer.

FIG. 6 shows an exemplary functional view of the IAB BAP sublayer, based on the radio interface protocol architecture defined in 3GPP TS 38.300. In the example of FIG. 6, the receiving part on the BAP entity delivers BAP PDUs (e.g., received on an ingress BH RLC channel) to the transmitting part on the BAP entity in the same node (e.g., MT to DU or vice versa). Likewise, the receiving part may deliver BAP SDUs to the transmitting part on the BAP entity in the same node (e.g., for transmission on an egress BH RLC channel). When passing BAP SDUs, the receiving part removes the BAP PDU header and the transmitting part adds the BAP header with the same BAP routing ID as carried on the BAP PDU header prior to removal. Passing BAP SDUs in this manner is therefore functionally equivalent to passing BAP PDUs, in implementation.

Figure 7:
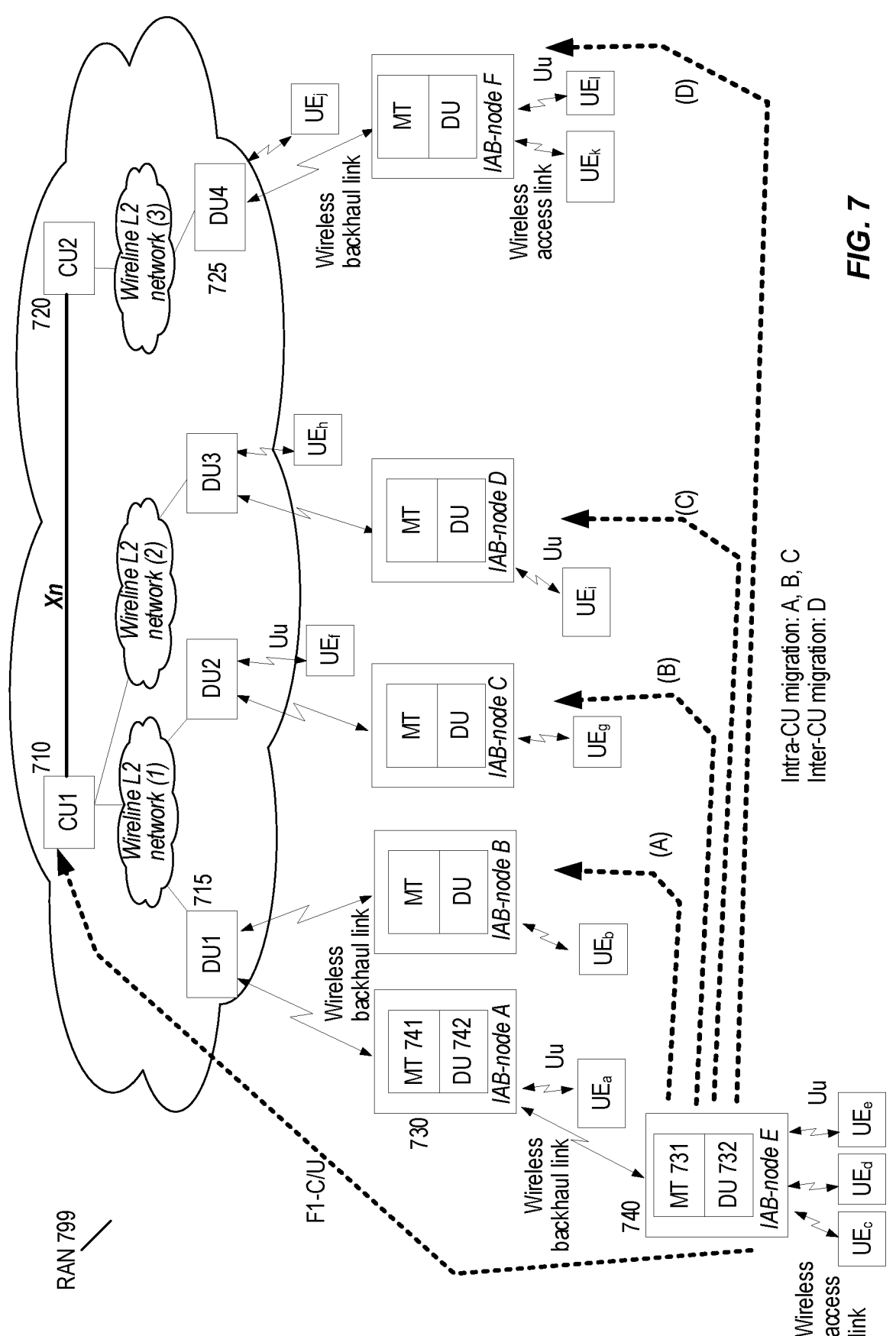
FIG. 7 illustrates four different IAB node migration scenarios, labelled A-D.

FIG. 7 illustrates four different IAB node migration scenarios, labelled A-D. These are described below in order of complexity. In all scenarios, the migrating IAB node (JAB-node e, 740) serves three different UEs, labelled UEc, UEd, and UEe. Initially, IAB node e is a child node of IAB node a (730) and an ancestor of CU1 (710).

In scenario A ("intra donor-DU"), IAB-node e and its served UEs are moved to a new parent node, IAB-node b, that is under the same IAB-donor DU, i.e., DU1 (711). A successful intra-donor DU migration requires establishing UE context setup for IAB-node e's MT in the DU of new parent node IAB-node b, updating routing tables of IAB nodes along the path to IAB-node e, and allocating resources on the new path. The IP address for IAB-node e will not change, but the F1-U tunnel/connection between donor-CU 1 and IAB-node e's DU will be redirected through IAB-node b.

In scenario B ("intra donor-CU"), IAB-node e and its served UEs are moved to a new parent node, IAB-node c, that is under a different IAB-donor DU, DU2 (712), but under the same donor-CU 1. The procedural requirements and/or complexity is the same as scenario A, discussed above. Also, since the new IAB-donor DU (DU2) is connected to the same L2 network, migrating IAB-node e can use the same IP address under new donor DU2. However, new donor DU2 will need to inform the network using IAB-node e's L2 address in order to get/keep the same IP address for IAB-node e, e.g., by employing some mechanism such as Address Resolution Protocol (ARP).

Scenario C is an "intra-donor CU" migration similar to scenario B, but new donor-DU 3 (713) is connected to donor CU1 through a different wireline layer 2 (L2) network. As such, allocation of new IP address for IAB-node e is required. If IPsec is used for the F1-U tunnel/connection between the donor-CU1 and IAB-node e's DU, then it might be possible to use an existing IP address along the path segment between donor-CU1 and SeGW, and a new IP address for the IPsec tunnel between SeGW and IAB-node e's DU.

In scenario D ("inter-CU" or "inter-donor-CU"), IAB-node e and its served UEs are moved to a new parent node, IAB-node f (750), that is under a different donor-DU, DU4 (721), and a different donor CU, CU2 (720). This is the most complicated scenario in terms of procedural requirements, which are beyond the scope of 3GPP Rel-16 specifications.

Figure 8:
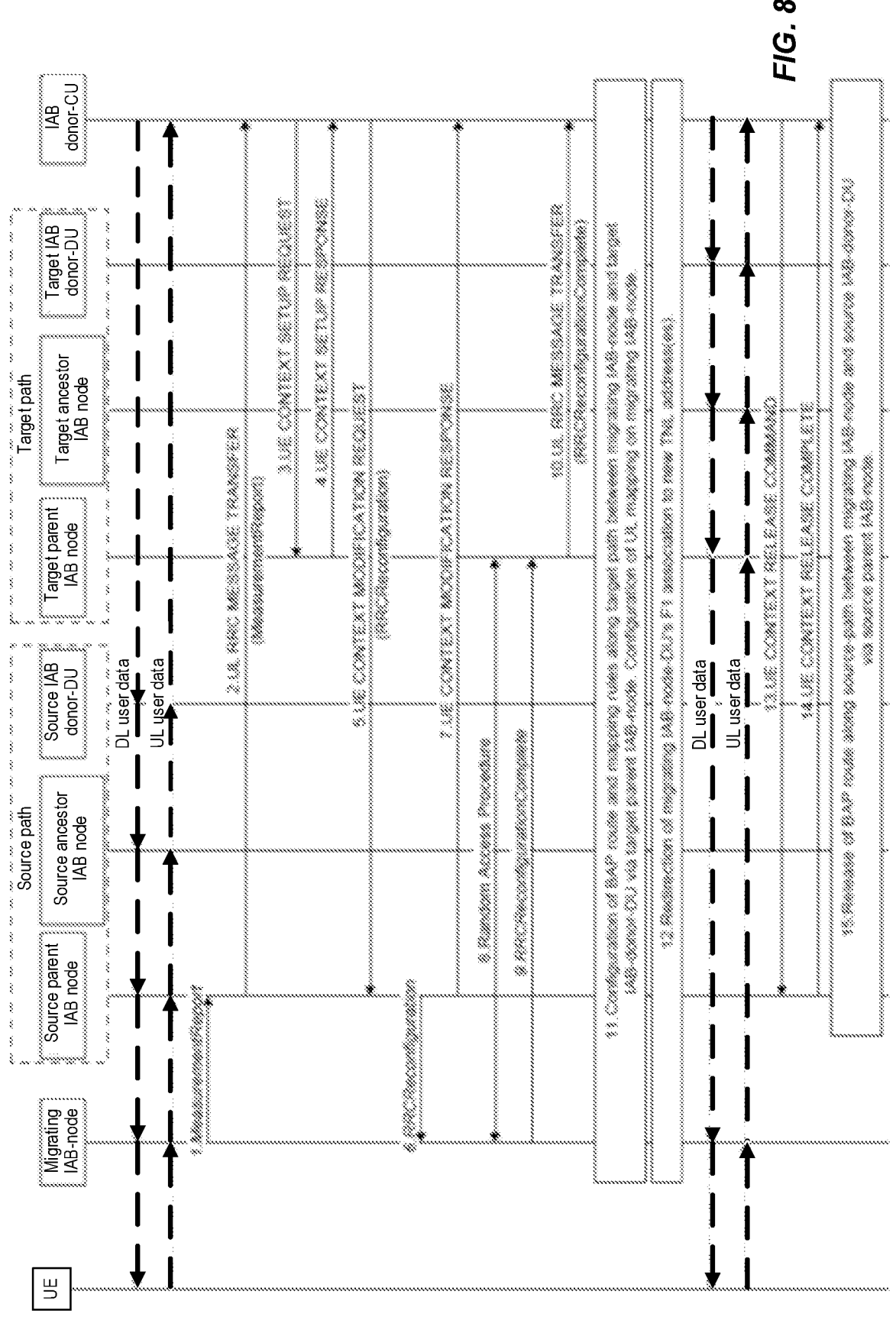
FIG. 8 shows an exemplary intra-CU topology adaptation procedure in which the target parent IAB-node uses a different IAB-donor-DU than the source parent IAB-node.

During intra-CU topology adaptation/migration, both the source parent IAB-node and the target parent IAB-node are connected to the same IAB-donor-CU. The target parent IAB-node may use a different IAB-donor-DU than the source parent IAB-node. The source path may also have one or more common nodes with the target path. FIG. 8 shows an exemplary intra-CU topology adaptation procedure in which the target parent IAB-node uses a different IAB-donor-DU than the source parent IAB-node. Although the operations shown in FIG. 8 are given numerical labels, these labels are intended to facilitate the following description rather than to require and/or imply a particular order of the operations. In the following description, the terms "parent node" and "parent IAB-node" are used interchangeably.

In operation 1, the migrating IAB-MT sends a Measurement Report message to the source parent node gNB-DU. This report is based on a Measurement Configuration the migrating IAB-MT received from the IAB-donor-CU before. In operation 2, the source parent node gNB-DU sends an UL RRC MESSAGE TRANSFER message to the IAB-donor-CU to convey the received Measurement Report.

In operation 3, the IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signalling traffic. In operation 4, the target parent node gNB-DU responds to the IAB-donor-CU with a UE CONTEXT SETUP RESPONSE message.

In operation 5, the IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node. In operation 6, the source parent node gNB-DU forwards the received RRCReconfiguration message to the migrating IAB-MT. In operation 7, the source parent node gNB-DU responds to the IAB-donor-CU with the UE CONTEXT MODIFICATION RESPONSE message.

In operation 8, a Random Access procedure is performed at the target parent node gNB-DU. In operation 9, the migrating IAB-MT responds to the target parent node gNB-DU with an RRCReconfigurationComplete message. In operation 10, the target parent node gNB-DU sends an UL RRC MESSAGE TRANSFER message to the IAB-donor-CU to convey the received RRCReconfigurationComplete message. Also, UL packets can be sent from the migrating IAB-MT, and are forwarded to the IAB-donor-CU through the target parent node gNB-DU. These DL and UL packets belong to the MT's own signalling and data traffic.

In operation 11, the IAB-donor-CU configures BH RLC channels and BAP-layer route entries on the target path between migrating IAB-node and target IAB-donor-DU. This step also includes allocation of TNL address(es) that is (are) routable via the target IAB-donor-DU. These configurations may be performed at an earlier stage, e.g., right after operation 3. The new TNL address(es) is (are) included in the RRCReconfiguration message at operation 5.

In operation 12, all F1-U tunnels and F1-C are switched to use the migrating IAB-node's new TNL address(es). In operation 13, the IAB-donor-CU sends a UE CONTEXT RELEASE COMMAND message to the source parent node gNB-DU. In operation 14, the source parent node gNB-DU releases the migrating IAB-MT's context and responds the IAB-donor-CU with a UE CONTEXT RELEASE COMPLETE message. In operation 15, the IAB-donor-CU releases BH RLC channels and BAP routing entries on the source path. The migrating IAB-node may further release the TNL address(es) it used on the source path. If the source route and target route have common nodes, the BH RLC channels and BAP routing entries of those nodes may not need to be released in this operation.

In addition, operations 11, 12, and 15 also must be performed for the migrating IAB-node's child and other downstream nodes. In this procedure, the downstream nodes must switch to new TNL addresses that are anchored in the target IAB-donor-DU. The IAB-donor-CU may send these addresses to the downstream nodes and release the old addresses via corresponding RRC signaling. If needed, the IAB-donor-CU configures BH RLC channels, BAP-layer route entries on the target path for the downstream nodes and the BH RLC Channel mappings on the downstream nodes in the same manner as described for the migrating IAB-node in operation 11. The downstream nodes switch their F1-U and F1-C tunnels to new TNL addresses that are anchored at the new IAB-donor-DU, in the same manner as described for the migrating IAB-node in operation 12. Based on implementation, these steps can be performed after or in parallel with the handover of the migrating IAB-node. In Rel-16, in-flight packets in UL direction that were dropped during the migration procedure may not be recoverable.

In addition, in the NG-RAN, an inter-gNB-DU mobility procedure can be used when a UE moves from one gNB-DU to another gNB-DU within the same gNB-CU. FIG. 9 shows an exemplary inter-gNB-DU mobility procedure. Although the operations shown in FIG. 9 are given numerical labels, these labels are intended to facilitate the following description rather than to require and/or imply a particular order of the operations.

In operation 1, the UE sends a MeasurementReport message to the source gNB-DU. In operation 2, the source gNB-DU sends an UL RRC MESSAGE TRANSFER message to the gNB-CU to convey the received MeasurementReport message. In operation 3, the gNB-CU sends a UE CONTEXT SETUP REQUEST message to the target gNB-DU to create a UE context and setup one or more data bearers. The UE CONTEXT SETUP REQUEST message includes a HandoverPreparationInformation. In operation 4, the target gNB-DU responds to the gNB-CU with a UE CONTEXT SETUP RESPONSE message.

In operation 5, the gNB-CU sends a UE CONTEXT MODIFICATION REQUEST message to the source gNB-DU, which includes a generated RRCReconfiguration message and indicates to stop the data transmission for the UE. The source gNB-DU also sends a Downlink Data Delivery Status frame to inform the gNB-CU about the unsuccessfully transmitted downlink data to the UE. In operation 6, the source gNB-DU forwards the received RRCReconfiguration message to the UE. In operation 7, the source gNB-DU responds to the gNB-CU with the UE CONTEXT MODIFICATION RESPONSE message.

In operation 8, the UE performs a Random Access procedure toward the target gNB-DU. The target gNB-DU sends a Downlink Data Delivery Status frame to inform the gNB-CU. DL packets, which may include PDCP PDUs not successfully transmitted in the source gNB-DU, are sent from the gNB-CU to the target gNB-DU. It is up to gNB-CU implementation whether to start sending DL User Data to gNB-DU before or after reception of the Downlink Data Delivery Status.

In operation 9, the UE responds to the target gNB-DU with an RRCReconfigurationComplete message. In operation 10, the target gNB-DU sends an UL RRC MESSAGE TRANSFER message to the gNB-CU to convey the received RRCReconfigurationComplete message. DL packets are sent to the UE and UL packets sent from the UE are forwarded to the gNB-CU through the target gNB-DU. In operation 11, the gNB-CU sends a UE CONTEXT RELEASE COMMAND message to the source gNB-DU. In operation 12, the source gNB-DU releases the UE context and responds the gNB-CU with a UE CONTEXT RELEASE COMPLETE message.

In the split CU-DU gNB architecture, a bearer context setup procedure can be used to setup the context for a user-plane bearer over the F1-U interface between a gNB-CU and a gNB-DU. FIG. 10 shows an exemplary bearer context setup procedure. Although the operations shown in FIG. 10 are given numerical labels, these labels are intended to facilitate the following description rather than to require and/or imply a particular order of the operations.

In operation 0, bearer context setup is triggered in the gNB-CU-CP. For example, this can be in relation to an SGNB ADDITION REQUEST message from another network, such as for initiating dual connectivity towards a UE. In operation 1, the gNB-CU-CP sends a BEARER CONTEXT SETUP REQUEST message containing UL TNL address information for S1-U or NG-U, and if required, DL TNL address information for X2-U or Xn-U to setup the bearer context in the gNB-CU-UP. For NG-RAN, the gNB-CU-CP decides flow-to-DRB mapping and sends the generated SDAP and PDCP configuration to the gNB-CU-UP.

In operation 2, the gNB-CU-UP responds with a BEARER CONTEXT SETUP RESPONSE message containing the UL TNL address information for F1-U, and DL TNL address information for S1-U or NG-U, and if required, UL TNL address information for X2-U or Xn-U. Indirect data transmission for split bearer through the gNB-CU-UP is not precluded here.

In operation 3, an F1 UE context setup procedure is performed to setup one or more bearers in the gNB-DU. In operation 4, the gNB-CU-CP sends a BEARER CONTEXT MODIFICATION REQUEST message containing the DL TNL address information for F1-U and PDCP status. In operation 5, the gNB-CU-UP responds with a BEARER CONTEXT MODIFICATION RESPONSE message.

Figure 11:
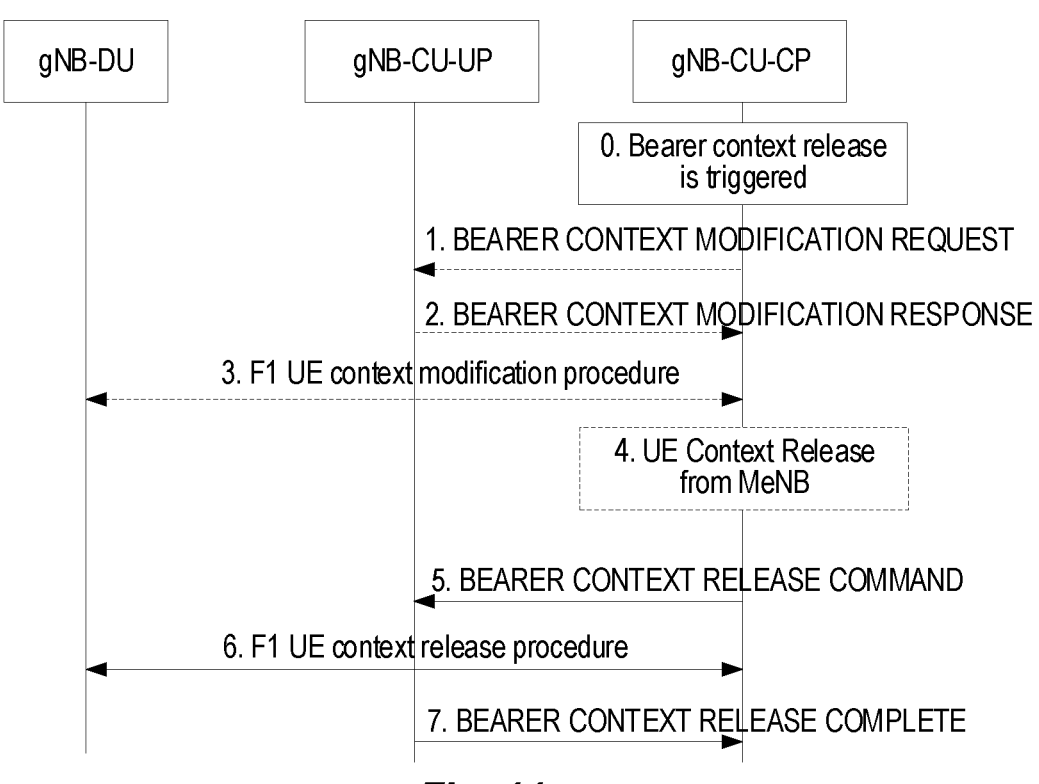
FIGS. 11-12 show exemplary bearer context release procedures initiated by a gNB-CU-CP and by a gNB-CU-UP, respectively.

Similarly, a bearer context release procedure can be used to release the context for an existing user-plane bearer over the F1-U interface between a gNB-CU and a gNB-DU. FIG. 11 shows an exemplary bearer context release procedure that is initiated by a gNB-CU-CP. Although the operations shown in FIG. 11 are given numerical labels, these labels are intended to facilitate the following description rather than to require and/or imply any particular order of the operations.

In operation 0, bearer context release is triggered in the gNB-CU-CP. For example, this can be in relation to an SGNB RELEASE REQUEST message from a master node in dual connectivity towards a UE. In operation 1, the gNB-CU-CP sends a BEARER CONTEXT MODIFICATION REQUEST message to the gNB-CU-UP. In operation 2, the gNB-CU-UP responds with a BEARER CONTEXT MODIFICATION RESPONSE carrying the PDCP UL/DL status.

In operation 3, an F1 UE context modification procedure is performed to stop the data transmission for the UE. It is up to gNB-DU implementation when to stop the UE scheduling. In general, operations 1-3 are performed only if the PDCP status of the bearer(s) needs to be preserved, e.g., for bearer type change.

In operation 4, the gNB-CU-CP may receive the UE CONTEXT RELEASE message from the MeNB in EN-DC operation as described in 3GPP TS 38.331 section 8.4.2.1. In operation 5, the gNB-CU-CP sends a BEARER CONTEXT RELEASE COMMAND to the gNB-CU-UP. In operation 6, an F1 UE context release procedure is performed to release the UE context in the gNB-DU. In operation 7, the gNB-CU-UP responds to the message in operation 5 with a BEARER CONTEXT RELEASE COMPLETE.

Figure 12:
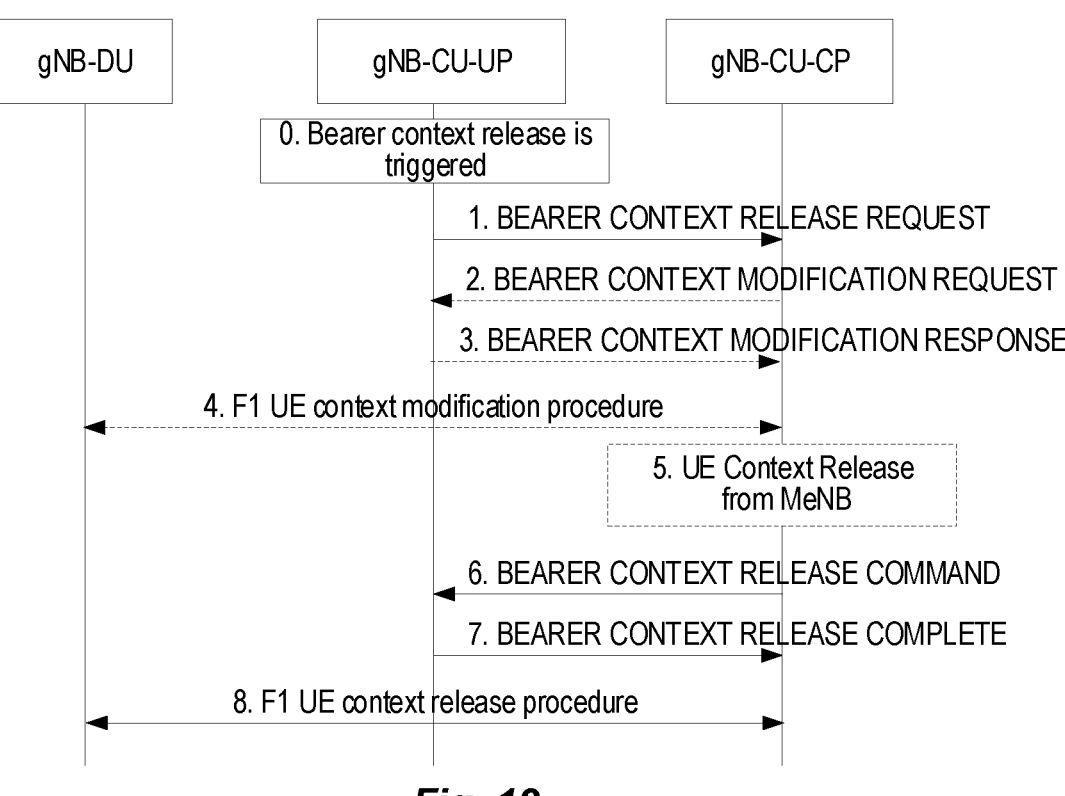

FIG. 12 shows an exemplary bearer context release procedure that is initiated by a gNB-CU-UP. Although the operations shown in FIG. 12 are given numerical labels, these labels are intended to facilitate the following description rather than to require and/or imply a particular order of the operations.

In operation 0, bearer context release is triggered in the gNB-CU-UP, e.g., due to local failure. In operation 1, the gNB-CU-UP sends a BEARER CONTEXT RELEASE REQUEST message to request the release of the bearer context in the gNB-CU-UP. This message may contain the PDCP status. In operations 2-5, if the PDCP status needs to be preserved, the E1 Bearer Context Modification and the F1 UE Context Modification procedures are performed. The E1 Bearer Context Modification procedure is used to convey data forwarding information to the gNB-CU-UP. The gNB-CU-CP may receive the UE Context Release from the MeNB.

In operation 6, the gNB-CU-CP sends a BEARER CONTEXT RELEASE COMMAND message to release the bearer context in the gNB-CU-UP. In operation 7, the gNB-CU-UP responds with a BEARER CONTEXT RELEASE COMPLETE to confirm the release of the bearer context including data forwarding information. In operation 8, an F1 UE context release procedure may be performed to release the UE context in the gNB-DU.

Figure 13:
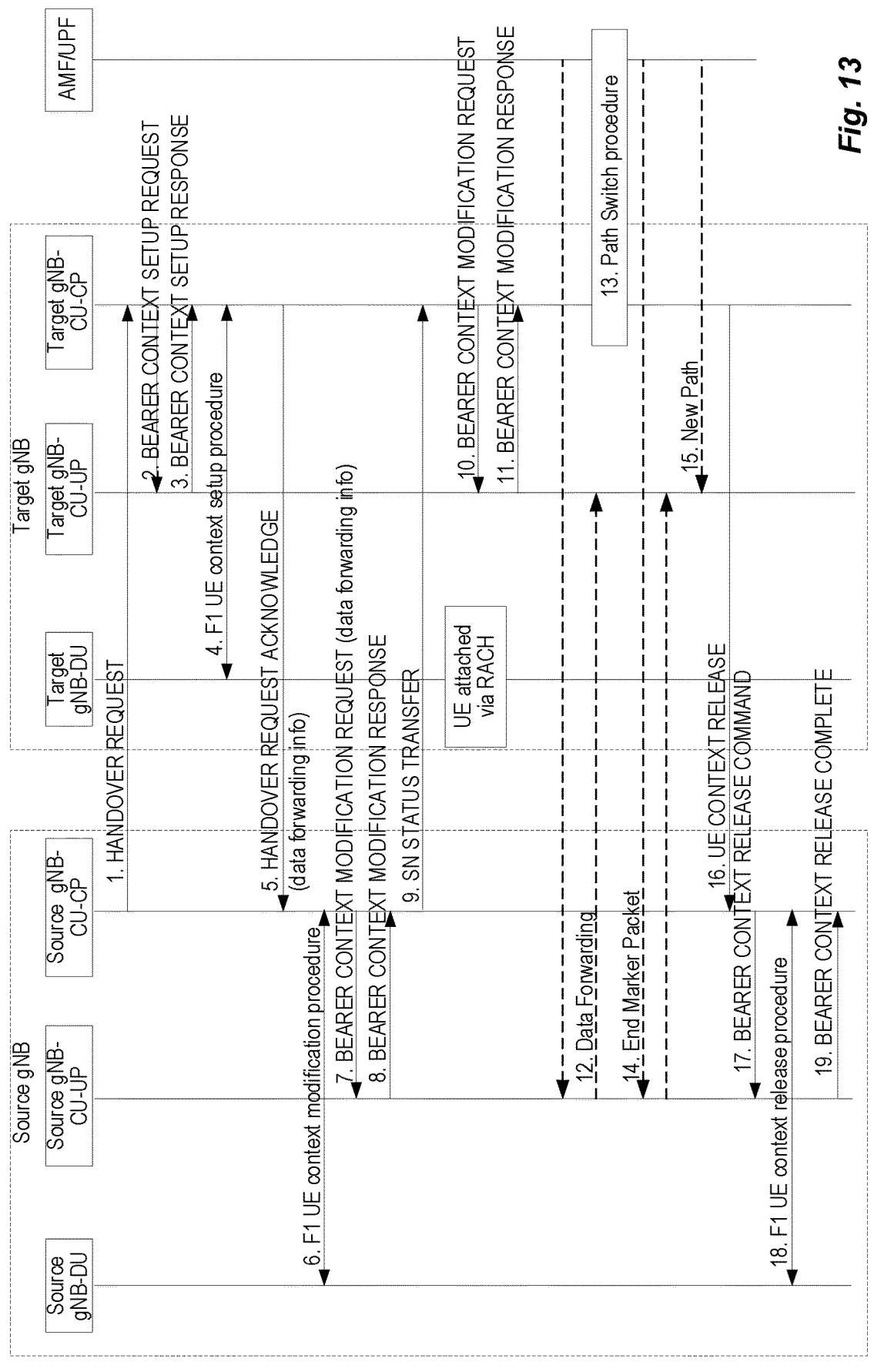
FIG. 13 shows an exemplary procedure for inter-gNB UE handover involving gNB-CU-UP change.

In NR networks, a gNB may attempt to handover a UE to another gNB. This may involve a change in gNB-CU-CP entity for the UE. FIG. 13 shows an exemplary procedure for inter-gNB UE handover involving gNB-CU-UP change. The UE (not shown) is handed over from a source gNB to a target gNB, both of which have respective DU, CU-CP, and CU-UP entities. Although the operations shown in FIG. 13 are given numerical labels, these labels are intended to facilitate the following description rather than to require and/or imply a particular order of the operations.

In operation 1, the source gNB-CU-CP sends HAN-DOVER REQUEST message to the target gNB-CU-CP. In operations 2-4, a bearer context setup procedure is performed as described in 3GPP TS 38.331 section 8.9.2. In operation 5, the target gNB-CU-CP responds to the source gNB-CU-CP with a HANDOVER REQUEST ACKNOWL-EDGE message. In operation 6, an F1 UE Context Modification procedure is performed to stop UL data transmission at the gNB-DU and to send the handover command to the UE.

In operations 7-8, a gNB-CU-CP initiated bearer context modification procedure is performed to enable the gNB-CU-CP to retrieve the PDCP UL/DL status and to exchange data forwarding information for the bearer. In operation 9, the source gNB-CU-CP sends an SN STATUS TRANSFER message to the target gNB-CU-CP. In operations 10-11, a bearer context modification procedure is performed as described in 3GPP TS 38.331 section 8.9.2. In operation 12, data Forwarding may be performed from the source gNB-CU-UP to the target gNB-CU-UP.

In operations 13-15, a path switch procedure is performed to update the DL TNL address information for the NG-U towards the core network. In operation 16, the target gNB-CU-CP sends a UE CONTEXT RELEASE message to the source gNB-CU-CP. Operations 17-19 are substantially similar to operations 5-7 of FIG. 11, described above.

Figure 14:
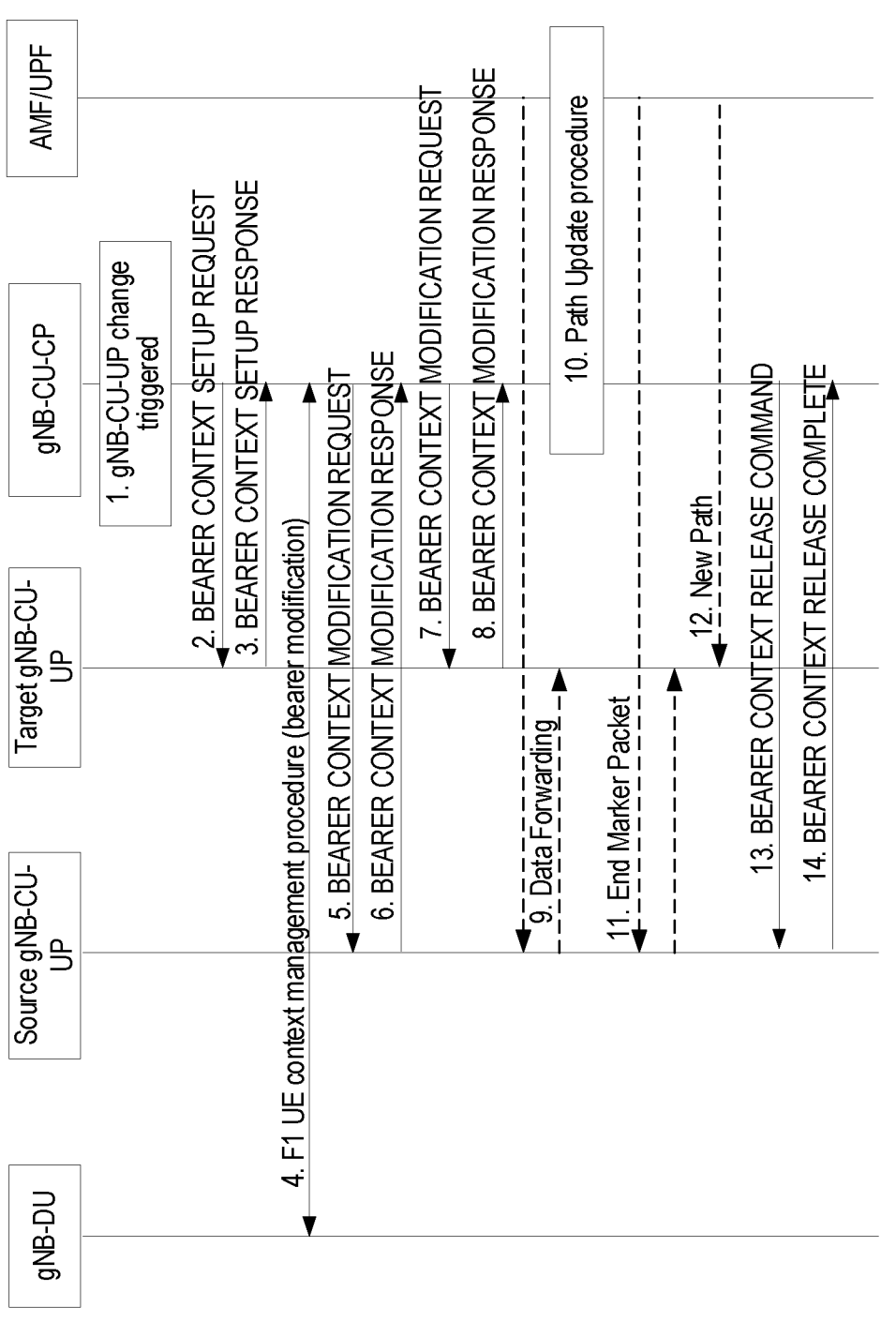
FIG. 14 shows an exemplary procedure for an intra-gNB change of gNB-CU-UP entities for a UE.

In NR networks, a gNB may have multiple gNB-CU-UP entities. In some scenarios, the gNB may need to change which of the gNB-CU-UP entities is serving the UE, e.g., due to handover of the UE. FIG. 14 shows an exemplary procedure for an intra-gNB change of gNB-CU-UP entities for a UE (not shown). The UE is changed from a source gNB-CU-UP to a target gNB-CU-UP. Although the operations shown in FIG. 14 are given numerical labels, these labels are intended to facilitate the following description rather than to require and/or imply a particular order of the operations.

In operation 1, a change of gNB-CU-UP is triggered in gNB-CU-CP based on, e.g., a measurement report from the UE. In operations 2-3, a bearer context setup procedure is performed as described above in relation to FIG. 10. In operation 4, an F1 UE Context Modification procedure is performed to change the UL TNL address information for F1-U for one or more bearers in the gNB-DU. In operations 5-6, a gNB-CU-CP initiated bearer context modification procedure is performed to enable the gNB-CU-CP to retrieve the PDCP UL/DL status and to exchange data forwarding information for the bearer.

In operations 7-8, a bearer context modification procedure is performed as described in 3GPP TS 38.331 section 8.9.2. In operation 9, data Forwarding may be performed from the source gNB-CU-UP to the target gNB-CU-UP. In operations 10-12, a path switch procedure is performed to update the DL TNL address information for the NG-U towards the core network. In operations 13-14, a gNB-CU-CP initiated bearer Context release procedure is performed as described above in relation to FIG. 11.

UE mobility operations across different gNBs (or different gNB-CUs) involve various messages over the Xn interface between gNBs, including messages shown in the figures described above. The following messages are of particular relevance:

HANDOVER REQUEST sent by source gNB to target gNB to request the preparation of resources for handover of a UE. Exemplary contents are shown in Table 1 below.

HANDOVER REQUEST ACKNOWLEDGE sent by target gNB to source gNB to inform about resources prepared for the UE in the target gNB. Exemplary contents are shown in Table 2 below.

SN STATUS TRANSFER sent by source gNB to target gNB to transfer UL/DL PDCP sequence number (SN) and hyper frame number (HFN) status during a handover or for dual connectivity towards a UE. Exemplary contents are shown in Table 3 below.

HANDOVER PREPARATION FAILURE sent by the target gNB to inform the source gNB that handover preparation has failed. Exemplary contents are shown in Table 4 below.

HANDOVER CANCEL sent by source gNB to target gNB to cancel an ongoing handover. Exemplary contents are shown in Table 5 below.

HandoverCommand sent by target gNB to transfer the handover command message prepared for the UE by the target gNB. FIG. 15 shows an exemplary ASN.1 data structure for a HandoverCommand message. Note that the handoverCommandMessage information element (IE) contains an RRCReconfiguration message used by a UE to perform handover. In the following, the term "handover command" is used generically to refer to an RRCReconfiguration message containing reconfigurationWithSync for a UE's master cell group (MCG).

TABLE 1

| IE/Group Name | Presence | IE type/ref. | Semantics description |
|---|---|---|---|
| Message Type | M | 9.2.3.1 | |
| Source NG-RAN node UE XnAP ID reference | M | NG-RAN node UE XnAP ID 9.2.3.16 | Allocated at the source NG-RAN node |
| Cause | M | 9.2.3.2 | |
| Target Cell Global ID | M | 9.2.3.25 | Includes either an E-UTRA CGI or an NR CGI |
| GUAMI | M | 9.2.3.24 | |

TABLE 1-continued

| IE/Group Name | Presence | IE type/ref. | Semantics description |
|---|---|---|---|
| UE Context Information | | | |
| >NG-C UE associated Signalling reference | M | AMF UE NGAP ID 9.2.3.26 | Allocated at the AMF on the source NG-C connection. |
| >Signalling TNL association address at source NG-C side | M | CP Transport Layer Information 9.2.3.31 | This IE indicates the AMF's IP address of the SCTP association used at the source NG-C interface instance. Note: If no UE TNLA binding exists at the source NG-RAN node, the source NG-RAN node indicates the TNL association address it would have selected if it would have had to create a UE TNLA binding. |
| >UE Security Capabilities | M | 9.2.3.49 | |
| >AS Security Information | M | 9.2.3.50 | |
| >Index to RAT/Frequency Selection Priority | O | 9.2.3.23 | |
| >UE Aggregate Maximum Bit Rate | M | 9.2.3.17 | |
| >PDU Session Resources To Be Setup List | | 9.2.1.1 | Similar to NG-C signalling, containing UL tunnel information per PDU Session Resource; and in addition, the source side QoS flow to DRB mapping |
| >RRC Context | M | OCTET STRING | Either includes HandoverPreparationInformation message as defined in subclause 10.2.2. of TS 36.331, if the target NG-RAN node is an ng-eNB, or HandoverPreparationInformation message as defined in subclause 11.2.2 of TS 38.331, if the target NG-RAN node is a gNB. |
| >Location Reporting Information | O | 9.2.3.47 | Includes the necessary parameters for location reporting. |
| >Mobility Restriction List | O | 9.2.3.53 | |
| Trace Activation | O | 9.2.3.55 | |
| Masked IMEISV | O | 9.2.3.32 | |
| UE History Information | M | 9.2.3.64 | |
| UE Context Reference at the S-NG-RAN node | O | | |
| >Global NG-RAN Node ID | M | 9.2.2.3 | |
| >S-NG-RAN node UE XnAP ID | M | NG-RAN node UE XnAP ID 9.2.3.16 | |

TABLE 2

| IE/Group Name | Presence | IE type/ref. | Semantics description |
|---|---|---|---|
| Message Type | M | 9.2.3.1 | |
| Source NG-RAN node UE XnAP ID | M | NG-RAN node UE XnAP ID 9.2.3.16 | Allocated at the source NG-RAN node |
| Target NG-RAN node UE XnAP ID | M | NG-RAN node UE XnAP ID 9.2.3.16 | Allocated at the target NG-RAN node |
| PDU Session Resources Admitted List | M | 9.2.1.2 | |
| PDU Session Resources Not Admitted List | O | 9.2.1.3 | |
| Target NG-RAN node To Source NG-RAN node Transparent Container | M | OCTET STRING | Either includes HandoverCommand message as defined in subclause 10.2.2 of TS 36.331, if the target NG-RAN node is an ng-eNB, or HandoverCommand |

TABLE 2-continued

| IE/Group Name | Presence | IE type/ref. | Semantics description |
|---|---|---|---|
| | | | message as defined in subclause 11.2.2 of TS 38.331, if the target NG-RAN node is a gNB. |
| UE Context Kept Indicator | O | 9.2.3.68 | |
| Criticality Diagnostics | O | 9.2.3.3 | |
| DRBs transferred to MN | O | DRB List 9.2.1.29 | In case of DC, indicates that SN Status is needed for the listed DRBs from the S-NG-RAN node. |

TABLE 3

| IE/Group Name | Presence | IE type/ref. | Semantics description |
|---|---|---|---|
| Message Type | M | 9.2.3.1 | |
| Source NG-RAN node | M | NG-RAN node UE | Allocated for handover at the source NG-RAN node |

TABLE 3-continued

| IE/Group Name | Presence | IE type/ref. | Semantics description |
|---|---|---|---|
| UE XnAP ID | | XnAP ID 9.2.3.16 | and for dual connectivity at the NG-RAN node from which the DRB context is transferred. |
| Target NG-RAN node UE XnAP ID | M | NG-RAN node UE XnAP ID 9.2.3.16 | Allocated for handover at the target NG-RAN node and for dual connectivity at the NG-RAN node to which the DRB context is transferred. |
| DRBs Subject To Status Transfer List | M | 9.2.1.14 | |

TABLE 4

| IE/Group Name | Presence | IE type/ref. | Semantics description |
|---|---|---|---|
| Message Type | M | 9.2.3.1 | |
| Source NG-RAN node UE XnAP ID | M | NG-RAN node UE XnAP ID 9.2.3.16 | Allocated at the source NG-RAN node |
| Cause | M | 9.2.3.2 | |
| Criticality Diagnostics | O | 9.2.3.3 | |

TABLE 5

| IE/Group Name | Presence | IE type/ref. | Semantics description |
|---|---|---|---|
| Message Type | M | 9.2.3.1 | |
| Source NG-RAN node UE XnAP ID | M | NG-RAN node UE XnAP ID 9.2.3.16 | Allocated at the source NG-RAN node. |
| Target NG-RAN node UE XnAP ID | O | NG-RAN node UE XnAP ID 9.2.3.16 | Allocated at the target NG-RAN node. |
| Cause | M | 9.2.3.2 | |

The PDU Session Resources To Be Setup List IE included in the HANDOVER REQUEST message contains PDU session resource-related information used at UE context transfer between NG-RAN nodes (e.g., gNBs). Exemplary contents are shown in Table 6 below.

TABLE 6

| IE/Group Name | Presence | IE type/ref. | Semantics description |
|---|---|---|---|
| PDU Session Resources To Be Setup List | | | |
| >PDU Session Resources To Be Setup Item | | | Range 1 to <maxnoof PDUsessions > |
| >>PDU Session ID | M | 9.2.3.18 | |
| >>S-NSSAI | M | 9.2.3.21 | |
| >>PDU Session Resource Aggregate Maximum Bitrate | O | PDU Session Aggregate Maximum Bit Rate 9.2.3.69 | This IE shall be present when at least one Non-GBR QoS Flow has been setup. |
| >>UL NG-U UP TNL Information at UPF | M | UP Transport Layer Information 9.2.3.30 | UPF endpoint of the NG-U transport bearer. For delivery of UL PDUs |
| >>Additional UL NG-U UP TNL Information at UPF List | C | Additional UP Transport Layer Information 9.2.1.32 | Additional UPF endpoint of the NG-U transport bearer. For delivery of UL PDUs |
| >>Source DL NG-U TNL Information | O | UP Transport Layer Information 9.2.3.30 | Indicates the possibility to keep the NG-U GTP-U tunnel termination point at the target NG-RAN node. |
| >>Security Indication | O | 9.2.3.52 | |
| >>PDU Session Type | M | 9.2.3.19 | |
| >>Network Instance | O | 9.2.3.85 | This IE is ignored if the Common Network Instance IE is present. |
| >>QoS Flows To Be Setup List | | | |
| >>>QoS Flows To Be Setup Item | | | |
| >>>>QoS Flow Identifier | M | 9.2.3.10 | |
| >>>>QoS Flow Level QoS Parameters | M | 9.2.3.5 | |
| >>>>E-RAB ID | O | INTEGER (0..15, . . . ) | |
| >>Data Forwarding and Offloading Info from source NG-RAN node | O | 9.2.1.17 | |
| >> Common Network Instance | O | 9.2.3.92 | |

Likewise, the PDU Session Resources Admitted List and PDU Session Resources Not Admitted List Es included in the HANDOVER REQUEST ACKNOWLEDGE message report admission success or failure (respectively) of the requested PDU Session Resources. Exemplary contents are shown in Tables 7-8 below, respectively.

TABLE 7

| IE/Group Name | Presence | IE type/ref. | Semantics description |
|---|---|---|---|
| PDU Session Resources Admitted List | | | |
| >PDU Session Resources Admitted Item | | | Range 1 to <maxnoof PDUsessions > |
| >>PDU Session ID | M | 9.2.3.18 | |
| >>PDU Session Resource Admitted Info | M | | |

TABLE 7-continued

| IE/Group Name | Presence | IE type/ref. | Semantics description |
|---|---|---|---|
| >>>DL NG-U TNL Information Unchanged | O | ENUMERATED (True, . . . ) | Indicates the NG-U tunnels that have been kept unchanged at the target NG-RAN node |
| >>>QoS Flows Admitted List | | | |
| >>>>QoS Flows Admitted Item | | | Range 1 to <maxnoofQoSFlows> |
| >>>>>QoS Flow Identifier | M | Integer(0 . . . 63, . . . ) | |
| >>>QoS Flows not Admitted List | 0 | QoS Flow List with Cause 9.2.1.4 | |
| >>>Data Forwarding Info from target NG-RAN node | 0 | 9.2.1.16 | |
| >>>Secondary Data Forwarding Info from target NG-RAN node List | O | 9.2.1.31 | This IE would be present only when the target M-NG-RAN node decide to split a PDU session between MN and SN |

TABLE 8

| IE/Group Name | Presence | IE type/ref. | Semantics description |
|---|---|---|---|
| PDU Session Resources Not Admitted List | | | |
| >PDU Session Resources Not Admitted Item | | | Range 1 to <maxnoof PDUsessions > |
| >>PDU Session ID | M | 9.2.3.18 | |
| >>Cause | O | 9.2.3.2 | |

In addition, UE mobility procedures can involve various messages over the F1 interface between CU and DU, including messages shown in the figures described above. The following messages are of particular relevance:

INITIAL UL RRC MESSAGE TRANSFER sent by gNB-DU to transfer the initial UL layer-3 message to the gNB-CU over the F1 interface. Exemplary contents are shown in Table 9 below.

DL RRC MESSAGE TRANSFER sent by gNB-CU to transfer the initial DL layer-3 message to the gNB-DU over the F1 interface. Exemplary contents are shown in Table 10 below.

UL RRC MESSAGE TRANSFER sent by gNB-DU to transfer an UL layer-3 message (non-initial) to the gNB-CU over the F1 interface. Exemplary contents are shown in Table 11 below.

RRC DELIVERY REPORT sent by gNB-DU to inform gNB-CU about the delivery status of DL RRC messages. Exemplary contents are shown in Table 12 below.

TABLE 9

| IE/Group Name | Presence | IE type/ref. | Semantics description |
|---|---|---|---|
| Message Type | M | 9.3.1.1 | |
| gNB-DU UE F1AP ID | M | 9.3.1.5 | |
| NR CGI | M | 9.3.1.12 | NG-RAN Cell Global Identifier (NR CGI) |
| C-RNTI | M | 9.3.1.32 type/ref. | C-RNTI allocated at the gNB-DU |
| RRC-Container | M | 9.3.1.6 | Includes the UL-CCCH-Message IE as defined in subclause 6.2 of TS 38.331 [8]. |
| DU to CU RRC Container | O | OCTET STRING | CellGroupConfig IE as defined in subclause 6.3.2 in TS 38.331 [8]. Required at least to carry SRB1 configuration. The Reconfiguration WithSync field is not included in the CellGroupConfig IE. |
| SUL Access Indication | O | ENUMER-ATED (true, . . . ) | |
| Transaction ID | M | 9.3.1.23 | |
| RAN UE ID | O | OCTET STRING (SIZE (8)) | |
| RRC-Container-RRCSetupComplete | O | 9.3.1.6 | Includes the UL-DCCH-Message IE including the RRCSetupComplete message, as defined in subclause 6.2 of TS 38.331 [8]. |

TABLE 10

| IE/Group Name | Presence | IE type/ref. | Semantics description |
|---|---|---|---|
| Message Type | M | 9.3.1.1 | |
| gNB-CU UE F1AP ID | M | 9.3.1.4 | |
| gNB-DU UE F1AP ID | M | 9.3.1.5 | |
| old gNB-DU UE F1AP ID | O | 9.3.1.5 | |
| SRB ID | M | 9.3.1.7 | |
| Execute Duplication | O | ENUMERATED (true, . . . ) | |
| RRC-Container | M | 9.3.1.6 | Includes DL-DCCH-Message IE defined in subclause 6.2 of TS 38.331 encapsulated in a PDCP PDU, or DL-CCCH-Message IE defined in subclause 6.2 of TS 38.331. |
| RAT-Frequency Priority Information | O | 9.3.1.34 | |
| RRC Delivery Status Request | O | ENUMERATED (true, . . . ) | Indicates whether RRC DELIVERY REPORT procedure is requested for the RRC message. |
| UE Context not retrievable | O | ENUMERATED (true, . . . ) | |
| Redirected RRC message | O | RRC Container 9.3.1.6 | Includes the UL-DCCH-Message IE as defined in subclause 6.2 of TS 38.331 [8], encapsulated in a PDCP PDU. |
| PLMN Assistance Info for Network Sharing | O | PLMN Identity 9.3.1.14 | |
| New gNB-CU UE F1AP ID | O | gNB-CU UE F1AP ID 9.3.1.4 | |
| Additional RRM Policy Index | O | 9.3.1.90 | |

TABLE 11

| IE/Group Name | Presence | IE type/ref. | Semantics description |
|---|---|---|---|
| Message Type | M | 9.3.1.1 | |
| gNB-CU UE F1AP ID | M | 9.3.1.4 | |
| gNB-DU UE F1AP ID | M | 9.3.1.5 | |
| SRB ID | M | 9.3.1.7 | |
| RRC-Container | M | 9.3.1.6 | Includes the UL-DCCH-Message IE as defined in subclause 6.2 of TS 38.331 [8], encapsulated in a PDCP PDU. |
| Selected PLMN ID | O | PLMN Identity 9.3.1.14 | |
| New gNB-DU UE F1AP ID | O | gNB-DU UE F1AP ID 9.3.1.5 | |

TABLE 12

| IE/Group Name | Presence | IE type/ref. | Semantics description |
|---|---|---|---|
| Message Type | M | 9.3.1.1 | |
| gNB-CU UE F1AP ID | M | 9.3.1.4 | |
| gNB-DU UE F1AP ID | M | 9.3.1.5 | |
| RRC Delivery Status | M | 9.3.1.71 | |
| SRB ID | M | 9.3.1.7 | |

Unlike an intra-CU migration scenario, all UEs and IAB nodes that are directly or indirectly served by an IAB node migrating (i.e., a "migrating node") between two different CUs must also receive respective reconfigurationWithSync messages for changing their security keys. This is because their respective UE/MT contexts are relocated, and 3GPP specifications mandate a security key change whenever the node that terminates a PDCP connection changes. Such an inter-CU migration may be caused by radio link failure (RLF), load balancing, and/or IAB node mobility, among other causes. Unless stated otherwise, the terms "migration" and "handover" are used interchangeably in the following description with respect to an JAB node that is changing donor CUs (which may be referred to as gNB-CU or, more simply, CU).

Once a handover (HO) command containing a reconfigurationWithSync has been received and processed by an IAB node (i.e., MT) or a UE, the security keys are changed and the M/UE will not be able to properly decrypt (and/or verify integrity, if configured) any packets that were encrypted with the old security keys—even if these packets were already in-flight between the source donor CU and the IAB-DU serving the IAB node or UE at the time of the HO command. The same holds for the keys used by the CU to decrypt the data received from the MT/UE.

Even so, it is not clear how to handle DL data, buffered at (source) ancestor nodes of the migrating IAB node, that is destined for the migrating IAB node or has to be routed via the migrating IAB node towards its descendant IAB nodes or any UEs served directly or indirectly (e.g., via descendant nodes) by the migrating IAB node. Furthermore, it is not clear how to handle UL data, buffered (e.g., pending to be transmitted) at the ancestor nodes of the migrating IAB node, that originated from the migrating IAB node, any of its descendant nodes, or any UEs served directly or indirectly by the migrating IAB node.

This lack of clarity can result in at least two problems. First, such packets may never be correctly received by the intended device, leading to packet losses and possibly increased data traffic due to retransmission of the lost packets. Second, since the intended device cannot correctly receive these packets, their transmission causes waste of radio and processing resources and unnecessary energy consumption at the UEs and IAB nodes.

Embodiments of the present disclosure address these and other problems, challenges, and/or issues by providing mechanisms for ancestor nodes (including a parent node) of an IAB node migrating from a first CU to second CU ("migrating IAB node"), to handle: 1) DL data, buffered at the ancestor nodes, that is destined for the migrating IAB node or has to be routed via the migrating IAB node towards its descendant IAB nodes (including child nodes) and/or UEs served directly (e.g., via a connection to the migrating IAB node) or indirectly (e.g., via connection to a descendant node) by the migrating IAB node; and 2) UL data, buffered at the ancestor nodes, that originated from the migrating IAB node, any of its descendant nodes, or any UEs served directly or indirectly by the migrating IAB node.

In various embodiments, such mechanisms can include operations such as determining that a descendant IAB node will handed over (or migrated) from a first CU to a second CU (i.e., an inter-CU handover). If the migrating IAB node is a child node (i.e., the ancestor node is a parent node), the ancestor node may determine this implicitly and/or directly, or based on an explicit indication received from the source donor CU. If the migrating IAB node is not a child node (i.e., the ancestor node is not a parent node), this determination can be based on an explicit indication received from the migrating IAB node's parent node (of which the ancestor node is a parent), from an intermediate descendant node between the migrating IAB node's parent node and the ancestor node, or from the source donor CU. In the example shown in FIG. 7, if IAB node e is the migrating IAB node, then ancestor IAB-node a (a parent node) can receive an explicit indication from CU1, while ancestor node DU1 (a non-parent node) can receive an explicit indication from CU1 or from parent IAB-node a.

The ancestor node of the migrating IAB node can also receive indications/configurations of how to perform modified handling of packets during the migration. The modified handling can include reception, transmission, forwarding, and/or deletion of the UL and/or DL data. Upon determining an inter-CU handover and/or receiving an explicit indication to perform modified handling of UL/DL packets, the ancestor node can perform this modified handling before, during, or after forwarding the handover command to the migrating IAB node, and/or the migrating IAB node can perform the modified handling before executing the handover command. The modified handling can be performed on DL packets, buffered at the ancestor node, that are associated with the migrating IAB node or have to be routed downstream via the migrating IAB node; and/or UL data, buffered at the ancestor node, that are associated with the migrating IAB node or UEs/IAB nodes that are directly/indirectly served by the migrating IAB node.

By operating in this manner, embodiments can reduce and/or minimize losses of data packets associated with a migrating IAB node (i.e., for which a handover command was previously issued) or UEs/IAB nodes that are directly or indirectly served by the migrating IAB node. Embodiments can also reduce and/or minimize unnecessary transmission of data packets associated with the migrating IAB node or UEs/IAB nodes that are directly or indirectly served by the migrating IAB node. At a high level, this can reduce interference on the wireless IAB links in the network and provide better utilization of available radio resources.

Although embodiments are primarily described in terms of UP data, various embodiments can also be adapted to perform similar operations on CP data CP data (e.g., RRC messages, F1-AP messages, etc.). In general, it is assumed that buffering CP data at intermediate IAB nodes will not be a big issue because CP messages are associated with separate BH RLC channels that have higher priority than UP data. However, in some deployments, there could be prioritization among the CP data of different UEs/IAB nodes, which could lead to some considerable CP data buffering in intermediate nodes. This buffered CP data can suffer from similar problems as buffered UP data, which can be addressed by various embodiments of the present disclosure.

FIG. 16 shows an exemplary IAB node inter-CU migration scenario that illustrates various embodiments of the present disclosure. In particular, FIG. 16 illustrates a scenario in which node IAB3 (1640) is a child node of node IAB2 (1630) at time t1, but is migrated to be a child of node IAB5 at time t1+x. IAB2 communicates with donor CU1 (1610) via donor DU1, while IAB5 communications with donor CU2 (1620) via donor DU2.

In FIG. 16, IAB3 is the "migrating IAB node", while IAB2, IAB1, and DU1 are "ancestor nodes" (or "source ancestor nodes") of IAB3. Of these, IAB2 is the "parent node" for migrating IAB3. Likewise, IAB4 is both a "child" and a "descendant" of migrating IAB3.

As discussed above, during a HO, a gNB-CU sends a UE CONTEXT MODIFICATION REQUEST message to the source gNB-DU. This message includes the HO command and indicates to stop the data transmission for the UE or IAB-MT (i.e., Transmission Action Indicator IE is set to the value of "stop"). The source gNB-DU also sends a Downlink Data Delivery Status (DDDS) frame to inform the gNB-CU about DL data to the UE or IAB-MT that was unsuccessfully transmitted.

However, the indication to "stop" transmission for the UE or IAB-MT does not necessarily indicate that the handover is inter-CU. For example, Transmission Action Indicator can take also the value of "restart", which the CU could use to start/stop the DL transmission for various reasons, such as flow control. In fact, a parent node is not normally aware of whether the UE CONTEXT MODIFICATION REQUEST is sent for handover, because it is supposed to pass the contents of that message transparently to the UE. In other words, from the parent node's perspective, the HO command is merely an octet string.

Later during the HO procedure, the parent node (JAB-DU or donor-DU) will receive a UE CONTEXT RELEASE message from the CU. Even with that message, the parent node cannot be sure that there is a HO ongoing. The reason is that the CU may have decided to release the UE to RRC_IDLE state in the previous RRC message contained in UE CONTEXT MODIFICATION REQUEST message, and later on sent the UE CONTEXT RELEASE message to the DU.

Accordingly, embodiments include various techniques for a parent node to determine that a child node is involved inter-CU HO. In some embodiments, an IAB-DU can be enabled to decrypt/understand the RRC message contained in the UE CONTEXT MODIFICATION REQUEST message, and from that determine if it is a HO and also if it is an inter-CU HO. However, this may conflict with the CU/DU split security principles, where security keys are supposed to be available only at the CU that terminates the PDCP. Furthermore, security keys are usually also deployed in physically secured locations that are not physically accessible for tampering by intruders/hackers.

In other embodiments, a new explicit indicator can be included in an F1 UE CONTEXT MODIFICATION REQUEST message to indicate the RRC message contained in that message is a HO command. Table 13 below describes an exemplary indicator according to these embodiments. The field is an enumerated data type with values "intra-DU" indicating it is a HO where the target cell is also served by the source DU, "intra-CU" indicating an intra-CU handover with a change of DU, "inter-CU" indicates a change of both the CU and DU, and "non-HO" indicates that it is a non-HO-related message.

In some embodiments, upon determining that a child node (i.e., the migrating IAB node) is involved inter-CU HO in any of the ways discussed above, an ancestor node can send an indication that the child node is involved inter-CU HO to a parent node or a child node of the ancestor node. The following examples illustrate this behavior in the context of FIG. 16.

1. IAB2 receives a BAP indication from child IAB3 and sends a BAP CE that contains the same information (i.e., same message type and same BAP address as the ones indicated in the received message) to parent IAB1, which then forwards it to parent DU1.
2. DU1 receives an F1-based indication from CU1 about the inter-CU migration of IAB3. DU1 passes the information with a BAP CE to child IAB1, which forwards it to child IAB2.
3. IAB2 receives an F1-based indication from CU1 (e.g., in an enhanced UE CONTEXT MODIFICATION REQUEST message described above) and forwards the information in a BAP CE to parent IAB1, which then sends to parent DU1.
4. IAB2 determines that child IAB3 is involved in inter-CU HO by inspecting the RRC message contained in

TABLE 13

| IE/Group Name | Presence | IE type/ref. | Semantics description |
| --- | --- | --- | --- |
| Handover command Indicator | O | ENUMERATED (non-HO, intra-DU, intra-CU, inter-CU, ..) | |

In other embodiments, a new BAP control message (e.g., a BAP Control Element (CE)) can be used to indicate that migrating IAB node is involved in an inter-CU HO. The BAP control message can be sent by the migrating IAB node or by any of the descendants of the ancestor node that are also ancestors of the migrating IAB node. In any event, it will be received by the ancestor node (e.g., IAB1, IAB2, or DU1 in FIG. 16).

In some embodiments, the BAP control message may contain a header with a message type indicator. The reception of such a message from a child node is an indication that the child node is involved in an inter-CU HO. In the example of FIG. 16, IAB3 can sending such a BAP message towards IAB2 upon determining that it is being involved in inter-CU HO. In some embodiments, this indication may indicate the handover type (e.g., non-HO, intra-DU, intra-CU, inter-CU) in a similar way as discussed above for the indication included in an F1AP UE CONTEXT MODIFICATION REQUEST message.

In some embodiments, the BAP control message may contain a header with a message type indicator as well as an identification of the migrating IAB node, e.g., a BAP address of the migrating IAB node. In the example of FIG. 16, IAB3 can send such a message to IAB2 or IAB2 can send such a message to IAB1.

In some embodiments, an F1-based indication can be sent from the source CU (e.g., CU1 in FIG. 16) to the ancestor node information about the migrating IAB node, such as the BAP address of migrating IAB node (e.g., IAB3 in FIG. 16). These embodiments may be particularly applicable to ancestor nodes that are not the parent node of the migrating IAB node (e.g., DU1, IAB1 in FIG. 16). The F1-based indication may be a new F1 message or added to an existing F1 message. For example, the "Handover Command Indicator" in Table 13 above can be used for this purpose.

the UE CONTEXT MODIFICATION REQUEST message as described above, and forwards the information in a BAP CE to parent IAB1, which then sends to parent DU1.

In the Rel-16 IAB architecture, nodes are not aware of the detailed topology of the network on the hops above or below their parent(s) and children. For example, IAB1 is aware of IAB2 and DU1 and it may also have some information in its routing table about IAB3 and IAB4 (e.g., instructing it to forward a DL data with BAP addresses of IAB3 or IAB4 to IAB2). However, IAB1 is not aware whether IAB3 and IAB4 are both are directly served by IAB2, or whether one is the parent of the other as shown in FIG. 16.

As such, knowing about the inter-CU HO of IAB3 does not fully inform IAB1 how to handle the UL/DL packets that are impacted due by the inter-CU HO. For example, if IAB3 and IAB4 were sibling node rather than parent/child, then the migration of IAB3 should not affect the treatment of UL/DL packets associated with IAB4. On the other hand, where IAB4 is a child of IAB3 as shown in FIG. 16, the treatment of UL/DL packets associated with IAB4 is also impacted by the inter-CU HO of IAB3.

Various embodiments can be used to provide the missing information, such that an ancestor node of a migrating IAB node can properly handle packets associated with the migrating IAB node as well as packets associated with any other IAB nodes (or UEs) that are directly or indirectly being served by the migrating IAB node. In some embodiments, a donor CU can provide IAB nodes complete topology information about their descendant nodes, either unsolicited or upon request.

In other embodiments, F1-based messages can be enhanced in a similar manner as discussed above, but containing more than one BAP address (e.g., addresses of IAB3 and IAB4), indicating to the receiving ancestor node that buffered packets with such destination addresses are impacted by the inter-CU HO.

In other embodiments, BAP CEs can be provided and/or enhanced in a similar manner as discussed above, but containing additional BAP addresses as this information propagates upstream. For the example shown in FIG. 16, when IAB2 sends a BAP CE to IAB1, it can include the BAP address of IAB4, based on knowledge that data destined to IAB4 must be forwarded via IAB3. IAB2 could pass this info as is to IAB1, which passes it to DU1. That way, DU1 and IAB1 know that inter-CU HO of IAB3 affects packets with destination BAP addresses of IAB3and IAB4.

In some embodiments, an ancestor node (including a parent node) of a migrating IAB node can be provided with instructions regarding modified handling of buffered UL and/or DL data associated with the migrating IAB node. These instructions can be for handling UL packets in the ancestor node's transmit buffer that are associated with the migrating IAB node, including UL packets originating from the migrating IAB node or UL packets originating from UEs or IAB nodes that are being service directly or indirectly by the migrating IAB node. Additionally or alternatively, these instructions can be for modified handling of DL packets buffered at the ancestor node that are associated with the migrating IAB node, e.g., are destined for the migrating IAB node or have to be routed via the migrating IAB node.

As discussed above, the BAP layer delivers BAP PDUs to the RLC entity via BH RLC channels, each identified by a BH RLC channel ID or/and a corresponding LCID. The RLC entity processes RLC SDUs and delivers RLC PDUs to the MAC via BH Logical Channels identified by the LCID. This means that each BH RLC channel ID maps to one LCID. As such, when the following discussion refers to a list of BH (RLC) channels, it could mean either a list of RLC channel IDs or a list of LCIDs.

In various embodiments, the instructions provided to a non-parent ancestor node regarding modified handling of buffered DL packets can include any of the following, individually or in any combination:

One indicator of whether DL data should be forwarded or deleted (i.e., applicable for all BH RLC channels);

A list of egress BH RLC channels whose buffered data should be forwarded;

A list of egress BH RLC channels whose data should be deleted;

A list of QoS profiles (e.g., 5QI) and/or priorities for BH RLC channels (for user plane and control plane BH RLC channels respectively), whose buffered data should be forwarded;

A list of QoS profiles (e.g., 5QI) and/or priorities for BH RLC channels (for user plane and control plane BH RLC channels respectively), whose buffered data should be deleted; and A list of BAP routing IDs, where the packets bearing these BAP routing IDs are to be forwarded or deleted.

In various embodiments, "DL data to be forwarded" can refer to any of the following:

All the buffered data.

A certain, explicitly indicated, amount of data or number of packets.

Until a certain percentage of the data (e.g., 50%) is received, with the value/percentage included in the configuration provided to the ancestor node. This could be provided individually for each BH RLC channel, for each BAP routing ID for each QoS profile and/or BH RLC channel priority, for a group of BH RLC channels, for a group of BAP routing IDs, for a group of QoS profiles and/or BH RLC channel priorities, or just one value that is applicable to all data.

An amount of data corresponding to a particular duration. For example, a timer value could also be included and specified with similar granularity as the percentage value described above. In some embodiments, the two could be combined, e.g., forward until 50% of the DL buffered data or until 30 ms has elapsed, whichever happens first. After timer expiration, the data may be deleted.

In various embodiments, the instructions provided to an ancestor node regarding modified handling of UL packets buffered at the ancestor node can include any of the following, individually or in any combination:

One indicator of whether UL buffer status reports (BSRs) should be sent to the parent node (i.e., applicable for all BH RLC channels);

A list of BH RLC channels for which UL BSRs should be sent to the parent node;

A list of QoS profiles (e.g., 5QI) and/or priorities for BH RLC channels (for user plane and control plane BH RLC channels respectively), for which UL BSRs should be sent to the parent; and A list of BAP routing IDs for which UL BSRs should be sent to the parent.

In some embodiments, the instructions regarding modified handling of buffered UL and/or DL data associated with the migrating IAB node can include instructions for modified handling, by the ancestor node, of UL packets buffered at one or more child IAB nodes of the ancestor node. For example, the child IAB node(s) can be ancestor node(s) with respect to the migrating IAB node. Such instructions can include any of the following, individually or in any combination:

One indicator indicating whether UL grants should be provided for the buffered data (i.e., for all BH RLC channels);

A list of BH channels for which UL grants should be provided;

A list of QoS profiles (e.g., 5QI) and/or priorities for BH RLC channels (for user plane and control plane BH RLC channels respectively), for which UL grants should be provided; and A list of BAP routing IDs, where the packets bearing these BAP routing IDs are to be forwarded or deleted.

In these embodiments, "UL grant" can refer to one or more UL grants pertaining to any of the following amounts and/or scenarios:

Until all the UL data buffered at the child node has been received.

Until a certain percentage of the buffered UL data (e.g., 50%) has been received, with the value/percentage included in the configuration provided to the parent. This could be provided individually for each BH RLC channel, for each BAP routing ID, for each QoS profile and/or BH RLC channel priority, for a group of BH RLC channels, for a group of BAP routing IDs, for a group of QoS profiles and/or BH RLC channel priorities, or just one value that is applicable to all UL data.

An UL grant corresponding to a particular duration. For example, a timer value could be included and specified with similar granularity as the percentage value described above. In some embodiments, the two could be combined, e.g., UL grants provided until 50% of the UL buffered data from the child node is received or until 30 ms has elapsed, whichever happens first. After timer expiration, the UL data may be deleted.

In various embodiments, the UL and DL configurations could be separate or the same, or they can have a common part and a separate part. The instructions can include the same values or different values for the UL and DL, such as for percentages and timer values described above.

In case a group handover is being performed at once, the instructions can be provided per migrating child node, in a group configuration applicable to all migrating child nodes, or a combination thereof. For example, if child nodes x and y are part of a group handover, their parent node could receive a modified handling configuration such as any of the following:

configuration related to x (e.g., forward data for BH RLC CH1, delete data for BH RLC CH2) and configuration related to y (e.g., delete data for BH RLC CH1, forward data for BH RLC CH2);

common configuration related to both x and y (e.g., forward data for BH RLC channels with 5QI=n, delete data for BH RLC channels with 5QI=m); or common configuration related to both x and y (e.g., forward data for BH RLC channels with 5QI=n), configuration related to x (e.g., delete data for BH RLC channels with 5QI=m), and configuration related to y (e.g., delete data for BH RLC channels with 5QI=m).

In other embodiments, the instructions to an ancestor node regarding modified handling of buffered data associated with a BH RLC channels can be provided in any of the following ways:

part of the BH RLC channel configuration that is specified during the BH RLC channel setup/reconfiguration (e.g., no additional info required during handover);

before the inter-CU HO procedure is initiated, e.g., during IAB node integration procedure, anytime while the IAB node is up and running, via F1 or RRC configuration, from the OAM, etc.

specified in 3GPP standards (e.g., all data should be forwarded, all data should be deleted, data over specific LCID should be forwarded or deleted, data with specific 5QI should be forwarded or deleted, etc.); and according to specific implement of IAB node and/or IAB network.

Any of the above can be specific to a particular IAB node. For example, when an IAB node gets connected as a child node, the parent node could be configured on how to treat the data associated with this child IAB node, to be transmitted/received over the backhaul RLC channels between the parent IAB node and this child IAB node.

In various embodiments, the instructions regarding modified handling of buffered data can be provided to an ancestor node of the migrating IAB node together with, or separate from, an indication that the migrating IAB node is subject to an inter-CU HO. For example, an F1 message, sent to an ancestor node about the inter-CU HO of the migrating IAB node (and also possibly including information about other nodes that are directly/indirectly being served by the migrating IAB node), could include the instructions regarding modified handling of buffered data. To put simply, the ancestor node receives a message that includes a list of BAP addresses of concerned IAB nodes, and a configuration for how currently buffered packets associated with those IAB node should be handled.

In various embodiments, an ancestor node of a migrating IAB node can perform various operations upon determining that: 1) the handover of the migrating IAB node is an inter-CU handover, and/or 2) there is some explicit indication of (e.g., instructions for) modified handling of UL/DL data packets associated with the migrating IAB node. These are described in more detail below.

With respect to handling of DL data buffered at the ancestor node, the ancestor node can perform any of the following operations upon making either or both of these determinations:

forward (e.g., schedule and/or transmit) all buffered DL data packets associated with the migrating IAB node (e.g., IAB3 in FIG. 16);

delete all buffered DL data packets associated with the migrating IAB node;

forward a subset of buffered DL packets associated with the migrating IAB node while deleting the remainder of these buffered DL data packets.

Several examples are provided to illustrate the third of these options. In a first example, an ancestor node forwards only the buffered DL data packets that are mapped to BH RLC channels indicated in the received instructions. In contrast, buffered DL data packets mapped to other BH RLC channels are deleted. As a second example, an ancestor node deletes the buffered DL data packets that are mapped to BH RLC channels indicated in the received instructions indicated to be forwarded and deletes the remaining buffered DL data packets. In contrast, buffered DL data packets mapped to other BH RLC channels are forwarded.

With respect to handling of UL data associated with a migrating IAB node that is buffered at a child node of the ancestor node, the ancestor node can perform any of the following operations upon making either or both of these determinations:

Refrain from providing more UL scheduling grants to the child node for buffered UL data associated with the migrating IAB node.

Provide UL scheduling grants to the child node and wait for the reception of buffered UL data associated with the migrating IAB node. UL grants could be provided for all the buffered UL data at the child node, for a certain percentage of the data, for certain indicated BH RLC channels, for a timer-based duration, etc. as discussed above.

With respect to handling of UL data associated with a migrating IAB node that is buffered at the ancestor node, the ancestor node can perform any of the following operations upon making either or both of these determinations:

Send a buffer status report (BSR) to the parent node of the ancestor node regarding the buffered UL data associated with the migrating IAB node.

Refrain from sending a BSR to the parent node regarding the buffered UL data associated with the migrating IAB node.

Delete the buffered UL data upon fulfillment of one or more conditions, e.g., a percentage of the buffered UL data has been transmitted, data for particular BH RLC channels have been transmitted, a particular duration has elapsed, etc.

In some embodiments, an ancestor node (including the parent node) of the migrating IAB node can prioritize buffered UL/DL data associated with the migrating IAB node to be forwarded (e.g., as identified in the received instructions) over other buffered data handled by the ancestor node, such as packets from/for IAB nodes that are not affected by the inter-CU HO of the migrating IAB node. In some embodiments, this prioritization can be done even if the other buffered data has a higher priority according to criteria unrelated to inter-CU HO (e.g., belongs to LCID that has higher priority).

In some embodiments, an ancestor node (including a parent node) that performs the modified handling according to received instructions can send a "migration report" message to the source CU. The message can indicate and/or describe actions performed the migrating IAB node and, if applicable, other IAB nodes and/or UEs served directly or indirectly by the migrating IAB node. For example, the message can include one or more of the following:

amount of data deleted/discarded, e.g., in bytes or the number of packets;

amount of data forwarded/transmitted, e.g., in bytes or the number of packets;

timestamp of last forwarded/transmitted DL data, e.g., packet timestamp; and timestamp of last forwarded/transmitted UL data, e.g., packet timestamp.

In various embodiments, any of the above information can be indicated per DRB, per BH RLC channel, per destination BAP address, per BAP routing ID, etc.

These embodiments described above can be further illustrated with reference to FIGS. 17-18, which depict exemplary methods (e.g., procedures) for a first network node and a first CU, respectively. Put differently, various features of the operations described below correspond to various embodiments described above. The exemplary methods shown in FIGS. 17-18 can be complementary to each other such that they can be used cooperatively to provide benefits, advantages, and/or solutions to problems described herein. Although the exemplary methods are illustrated in FIGS. 17-18 by specific blocks in particular orders, the operations corresponding to the blocks can be performed in different orders than shown and can be combined and/or divided into blocks and/or operations having different functionality than shown. Optional blocks and/or operations are indicated by dashed lines.

More specifically, FIG. 17 illustrates an exemplary method (e.g., procedure) method for a first network node arranged as an ancestor node of a second network node in an IAB network, according to various embodiments of the present disclosure. The exemplary method shown in FIG. 17 can be performed by an IAB node (e.g., IAB-MT and IAB-DU) or a donor DU, such as described elsewhere herein.

The exemplary method can include the operations of block 1720, where the first network node determine that the second network node is migrating from a first CU to a second CU. The exemplary method can also include the operations of block 1730, where the first network node can, based on determining that the second network node is migrating from the first CU to the second CU, perform modified handling of buffered data associated with the second network node, including at least one of the following: UL data buffered at the first network node, DL data buffered at the first network node, and UL data buffered at one or more child nodes of the first network node.

In some embodiments, performing the modified handling in block 1730 can include one or more of the following operations, identified by respective sub-block numbers:

(1731) sending, to a parent node of the first network node, one or more buffer status reports (BSR) regarding the UL data buffered at the first network node;

(1732) forwarding at least a portion of the UL data buffered at the first network node to the parent node;

(1733) deleting at least portion of the UL data buffered at the first network node;

(1734) forwarding at least a portion of the DL data buffered at the first network node to at least one of the child nodes;

(1735) deleting at least a portion of the DL data buffered at the first network node;

(1736) providing one or more UL scheduling grants to at least one of the child nodes for UL data buffered at the at least one child node; and (1737) refraining from providing one or more UL scheduling grants to the at least one child node.

In some embodiments, the UL and/or DL data associated with the second network node that is buffered at the first network node includes one or more of the following:

UL data originating from the second network node;

UL data originating from one or more descendant nodes of the second network node;

UL data originating from UEs served directly or indirectly by the second network node;

DL data destined for the second network node;

DL data destined for one or more descendant nodes of the second network node; and DL data destined for UEs served directly or indirectly by the second network node.

In some embodiments, the exemplary method can also include the operations of block 1710, where the first network node can receive instructions for modified handling of buffered data associated with the second network node. The modified handling can be performed in block 1730 in accordance with the instructions. For example, the instructions can be received from the first CU or from another ancestor node of the first network node. In some embodiments, the instructions can include one or more of the following:

one or more first criteria related to amounts of DL data buffered at the first network node; and one or more second criteria related to whether DL data buffered at the first network node should be deleted or forwarded to respective descendant nodes.

In some embodiments, the second criteria can include one or more of the following:

an indicator that all types of buffered DL data should be deleted or forwarded;

list of backhaul radio link control (BH RLC channels) whose buffered DL data should be forwarded;

list of BH RLC channels whose buffered DL data should be deleted;

list of access RLC channels whose buffered DL data should be forwarded;

list of access RLC channels whose buffered DL data should be deleted;

list of QoS profiles and/or priorities for which buffered DL data should be forwarded;

list of QoS profiles and/or priorities for which buffered DL data should be deleted;

list of backhaul adaptation protocol (BAP) routing identifiers for which buffered DL data should be forwarded; and list of BAP routing identifiers for which buffered DL data should be deleted.

In some embodiments, the instructions (e.g., received in block 1710) can also include one or more third criteria related to amounts of UL data buffered at the first network node; and one or more fourth criteria related to whether BSRs should be transmitted, to a parent node, for UL data buffered at the first network node. In some of these embodiments, each of the first and third criteria identify amounts according to one or more of the following: all buffered data;

an explicit amount of buffered data; a percentage of buffered data; and a duration. In some of these embodiments, the fourth criteria can include one or more of the following:

an indicator that BSRs should be transmitted for all types of buffered UL data;

list of BH RLC channels for which BSRs should be transmitted;

list of access RLC channels for which BSRs should be transmitted;

list of QoS profiles and/or priorities for which BSRs should be transmitted; and list of BAP routing identifiers for which BSRs should be transmitted.

Different examples of the first, second, third, and fourth criteria were discussed above.

In some embodiments, the instructions (e.g., received in block 1710) can include a first configuration for handling UL data buffered at a first child node, a second configuration for handling UL data buffered at a second child node, and a third configuration for handling UL data buffered at both the first and second child nodes.

In other embodiments, the instructions (e.g., received in block 1710) can include one or more fifth criteria related to amounts of UL data buffered at the child nodes and one or more sixth criteria related to whether UL grants should be provided for UL data buffered at the child nodes.

In some of these embodiments, the sixth criteria include one or more of the following:

an indicator that UL grants should be provided for all buffered UL data;

list of BH RLC channels for which UL grants should be provided;

list of access RLC channels for which UL grants should be provided;

list of QoS profiles and/or priorities for which UL grants should be provided; and list of BAP routing identifiers for which UL grants should be provided.

Different examples of the fifth and sixth criteria were discussed above.

In some embodiments, the exemplary method can also include the operations of block 1750, where the first network node can send, to the first CU, a migration report about the modified handling of the buffered data associated with the second network node. The migration report can include one or more of the following: amount of data deleted, amount of data forwarded, timestamp of last forwarded DL data, and timestamp of last forwarded UL data.

In some embodiments, determining that the second network node is migrating from the first CU to the second CU (e.g., in block 1720) is based on one of the following messages: a UE Context Modification Request message from the first CU, or a BAP control message from the second network node or from a third network node arranged as child node of the first network node and as an ancestor node of the second network node. In some embodiments, the UE Context Modification Request message or the BAP control message includes respective BAP addresses of one or more descendant nodes, of the second network node, that are also involved in the inter-CU handover.

In some of these embodiments, determining that the second network node is migrating from the first CU to the second CU (e.g., in block 1720) is based on one of the following in the UE Context Modification Request message: an embedded RRC message, a separate indication that an embedded RRC message is for an inter-CU handover of the second network node to the second CU, or a BAP address of the second network node.

In some embodiments, the UE Context Modification Request message can include the instructions for modified handling of buffered data associated with the second network node. For example, the embedded RRC message can be a handover command for the second network node, such that the instructions are sent in the UE Context Modification Request message together with the handover command.

In other of these embodiments, determining that the second network node is migrating from the first CU to the second CU (e.g., in block 1720) is based on one of the following in the BAP control message: a message type indicator, and a BAP address of the second network node.

In some embodiments, the exemplary method can also include the operations of block 1740, where the first network node can send a BAP control message indicating that the second network node is migrating from the first CU to the second CU, to at least one of the following:

a third network node arranged as a child node of the first network node and as an ancestor node of the second network node; and a fourth network node arranged as a parent node of the first network node.

In addition, FIG. 18 illustrates an exemplary method (e.g., procedure) for a first CU arranged as an ancestor node of first and second network nodes in an IAB network, according to various embodiments of the present disclosure. For example, the exemplary method shown in FIG. 18 can be performed by a source CU for a migrating IAB node, such as described elsewhere herein.

The exemplary method can include the operations of block 1820, where the first CU can send, to the first network node, a User Equipment (UE) Context Modification Request message indicating that the second network node is migrating from the first CU to a second CU in the IAB network. The exemplary method can also include the operations of block 1830, where the first CU can subsequently receive, from the first network node, a migration report about modified handling of buffered data associated with the second network node. The buffered data can include at least one of the following: UL data buffered at the first network node, DL data buffered at the first network node, and UL data buffered at one or more child nodes of the first network node.

In some embodiments, the migration report includes one or more of the following: amount of data deleted, amount of data forwarded, timestamp of last forwarded DL data, and timestamp of last forwarded UL data.

In some embodiments, the UE Context Modification Request message indicates that the second network node is migrating from the first CU to the second CU based on one of the following: an embedded RRC message, a separate indication that an embedded RRC message is for an inter-CU handover of the second network node to the second CU, or a BAP address of the second network node. In some of these embodiments, the embedded RRC message is a handover (HO) command for the second network node. In some of these embodiments, the UE Context Modification Request message includes respective BAP addresses of one or more descendant nodes, of the second network node, that are also migrating from the first CU to the second CU.

In some embodiments, the UE Context Modification Request message can include the instructions for modified handling of buffered data associated with the second network node. For example, when the embedded RRC message is a HO command for the second network node, the instructions can be sent in the UE Context Modification Request message together with the handover command.

In some embodiments, the exemplary method can also include the operations of block 1810, where the first CU can send, to the first network node, instructions for modified handling of buffered data associated with the second network node. The migration report (e.g., received in block 1830) can be based on the instructions.

In some embodiments, the instructions (e.g., sent in block 1810) can include one or more of the following: one or more first criteria related to amounts of DL data buffered at the first network node; and one or more second criteria related to whether DL data buffered at the first network node should be deleted or forwarded to respective descendant nodes.

In some embodiments, the instructions (e.g., sent in block 1810) can also include one or more third criteria related to amounts of UL data buffered at the first network node; and one or more fourth criteria related to whether BSRs should be transmitted, to a parent node, for UL data buffered at the first network node.

In various embodiments, the first, second, third, and fourth criteria can include any of the information and/or have any of the characteristics discussed above for these respective criteria in relation to first network node embodiments (e.g., FIG. 17). Furthermore, different examples of the first, second, third, and fourth criteria were discussed above.

In some embodiments, the instructions (e.g., sent in block 1810) can include a first configuration for handling UL data buffered at a first child node, a second configuration for handling UL data buffered at a second child node, and a third configuration for handling UL data buffered at both the first and second child nodes.

In other embodiments, the instructions (e.g., sent in block 1810) can include one or more fifth criteria related to amounts of UL data buffered at the child nodes and one or more sixth criteria related to whether UL grants should be provided for UL data buffered at the child nodes. In various embodiments, the sixth criteria can include any of the information and/or have any of the characteristics discussed above for the sixth criteria in relation to first network node embodiments (e.g., FIG. 17). Furthermore, different examples of the fifth and sixth criteria were discussed above.

Figure 19:
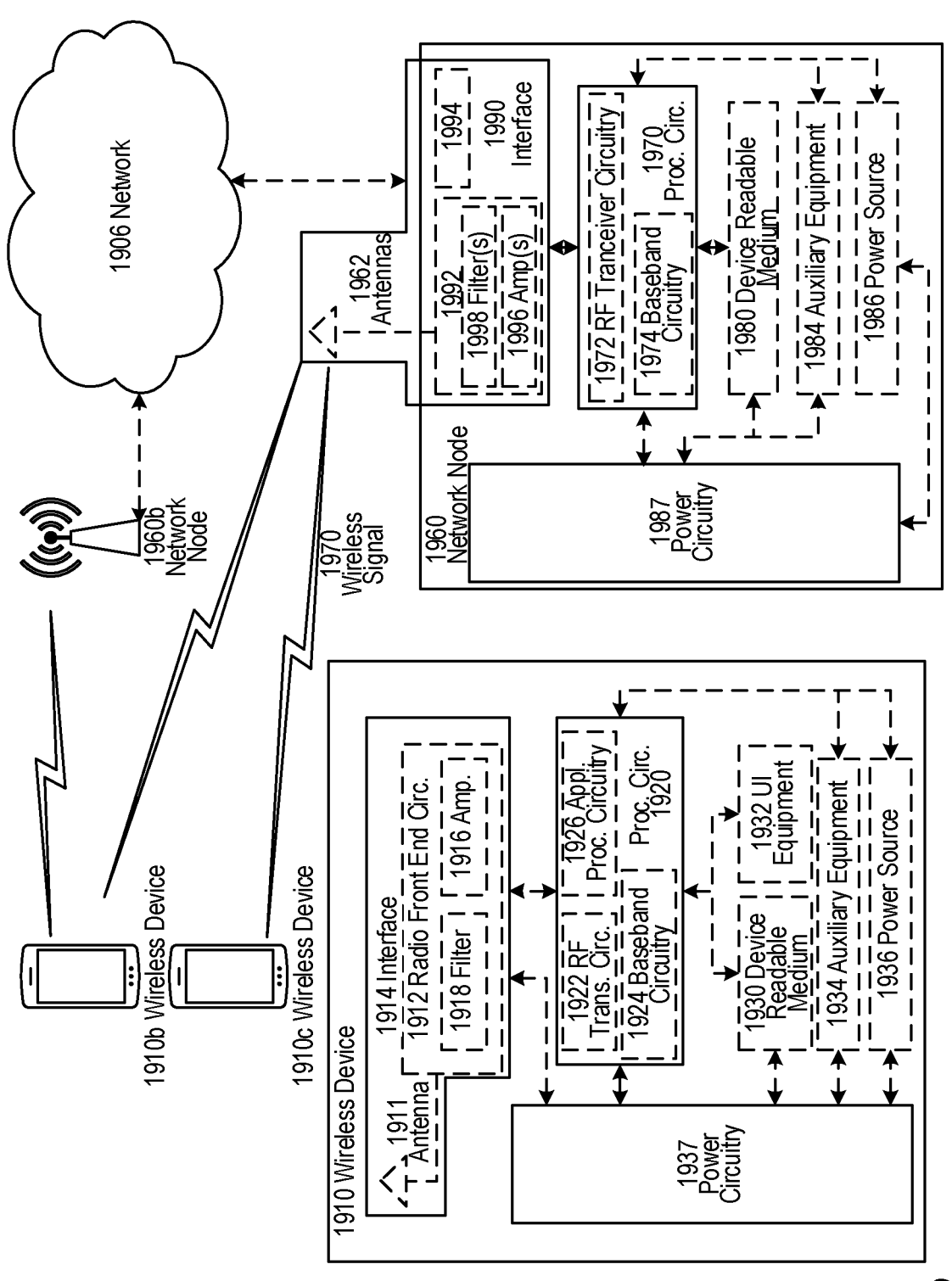
FIG. 19 shows an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 19. For simplicity, the wireless network of FIG. 19 only depicts network 1906, network nodes 1960 and 1960*b*, and WDs 1910, 1910*b*, and 1910*c*. In practice, a wireless network can further include any additional elements suitable to support communication between wireless devices or between a wireless device and another communication device, such as a landline telephone, a service provider, or any other network node or end device. Of the illustrated components, network node 1960 and wireless device (WD) 1910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1960 and WD 1910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 19, network node 1960 includes processing circuitry 1970, device readable medium 1980, interface 1990, auxiliary equipment 1984, power source 1986, power circuitry 1987, and antenna 1962. Although network node 1960 illustrated in the example wireless network of FIG. 19 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1960 are depicted as single boxes located within a larger box, or nested within multiple boxes, in practice, a network node can comprise multiple different physical components that make up a single illustrated component (e.g., device readable medium 1980 can comprise multiple separate hard drives as well as multiple RAM modules).

Similarly, network node 1960 can be composed of multiple physically separate components (e.g., a NodeB component and an RNC component, or a BTS component and a BSC component, etc.), which can each have their own respective components. In certain scenarios in which network node 1960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1960 can be configured to support multiple radio access technologies (RATs). In such embodiments, some components can be duplicated (e.g., separate device readable medium 1980 for the different RATs) and some components can be reused (e.g., the same antenna 1962 can be shared by the RATs). Network node 1960 can also include multiple sets of the various illustrated components for different wireless technologies integrated into network node 1960, such as, for example, GSM, WCDMA, LTE, NR, WiFi, or Bluetooth wireless technologies. These wireless technologies can be integrated into the same or different chip or set of chips and other components within network node 1960.

Processing circuitry 1970 can be configured to perform any determining, calculating, or similar operations (e.g., certain obtaining operations) described herein as being provided by a network node. These operations performed by processing circuitry 1970 can include processing information obtained by processing circuitry 1970 by, for example, converting the obtained information into other information, comparing the obtained information or converted information to information stored in the network node, and/or performing one or more operations based on the obtained information or converted information, and as a result of said processing making a determination.

Processing circuitry 1970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1960, either alone or in conjunction with other network node 1960 components (e.g., device readable medium 1980). Such functionality can include any of the various wireless features, functions, or benefits discussed herein.

For example, processing circuitry 1970 can execute instructions stored in device readable medium 1980 or in memory within processing circuitry 1970. In some embodiments, processing circuitry 1970 can include a system on a chip (SOC). As a more specific example, instructions (also referred to as a computer program product) stored in medium 1980 can include instructions that, when executed by processing circuitry 1970, can configure network node 1960 to perform operations corresponding to various exemplary methods (e.g., procedures) described herein.

In some embodiments, processing circuitry 1970 can include one or more of radio frequency (RF) transceiver circuitry 1972 and baseband processing circuitry 1974. In some embodiments, radio frequency (RF) transceiver circuitry 1972 and baseband processing circuitry 1974 can be on separate chips (or sets of chips), boards, or units, such as radio units and digital units. In alternative embodiments, part or all of RF transceiver circuitry 1972 and baseband processing circuitry 1974 can be on the same chip or set of chips, boards, or units In certain embodiments, some or all of the functionality described herein as being provided by a network node, base station, eNB or other such network device can be performed by processing circuitry 1970 executing instructions stored on device readable medium 1980 or memory within processing circuitry 1970. In alternative embodiments, some or all of the functionality can be provided by processing circuitry 1970 without executing instructions stored on a separate or discrete device readable medium, such as in a hard-wired manner. In any of those embodiments, whether executing instructions stored on a device readable storage medium or not, processing circuitry 1970 can be configured to perform the described functionality. The benefits provided by such functionality are not limited to processing circuitry 1970 alone or to other components of network node 1960 but are enjoyed by network node 1960 as a whole, and/or by end users and the wireless network generally.

Device readable medium 1980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1970. Device readable medium 1980 can store any suitable instructions, data or information, including a computer program, software, an application including one or more of logic, rules, code, tables, etc. and/or other instructions capable of being executed by processing circuitry 1970 and, utilized by network node 1960. Device readable medium 1980 can be used to store any calculations made by processing circuitry 1970 and/or any data received via interface 1990. In some embodiments, processing circuitry 1970 and device readable medium 1980 can be considered to be integrated.

Interface 1990 is used in the wired or wireless communication of signaling and/or data between network node 1960, network 1906, and/or WDs 1910. As illustrated, interface 1990 comprises port(s)/terminal(s) 1994 to send and receive data, for example to and from network 1906 over a wired connection. Interface 1990 also includes radio front end circuitry 1992 that can be coupled to, or in certain embodiments a part of, antenna 1962. Radio front end circuitry 1992 comprises filters 1998 and amplifiers 1996. Radio front end circuitry 1992 can be connected to antenna 1962 and processing circuitry 1970. Radio front end circuitry can be configured to condition signals communicated between antenna 1962 and processing circuitry 1970. Radio front end circuitry 1992 can receive digital data that is to be sent out to other network nodes or WDs via a wireless connection. Radio front end circuitry 1992 can convert the digital data into a radio signal having the appropriate channel and bandwidth parameters using a combination of filters 1998 and/or amplifiers 1996. The radio signal can then be transmitted via antenna 1962. Similarly, when receiving data, antenna 1962 can collect radio signals which are then converted into digital data by radio front end circuitry 1992. The digital data can be passed to processing circuitry 1970. In other embodiments, the interface can comprise different components and/or different combinations of components.

In certain alternative embodiments, network node 1960 may not include separate radio front end circuitry 1992, instead, processing circuitry 1970 can comprise radio front end circuitry and can be connected to antenna 1962 without separate radio front end circuitry 1992. Similarly, in some embodiments, all or some of RF transceiver circuitry 1972 can be considered a part of interface 1990. In still other embodiments, interface 1990 can include one or more ports or terminals 1994, radio front end circuitry 1992, and RF transceiver circuitry 1972, as part of a radio unit (not shown), and interface 1990 can communicate with baseband processing circuitry 1974, which is part of a digital unit (not shown).

Antenna 1962 can include one or more antennas, or antenna arrays, configured to send and/or receive wireless signals. Antenna 1962 can be coupled to radio front end circuitry 1990 and can be any type of antenna capable of transmitting and receiving data and/or signals wirelessly. In some embodiments, antenna 1962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1962 can be separate from network node 1960 and can be connectable to network node 1960 through an interface or port.

Antenna 1962, interface 1990, and/or processing circuitry 1970 can be configured to perform any receiving operations and/or certain obtaining operations described herein as being performed by a network node. Any information, data and/or signals can be received from a wireless device, another network node and/or any other network equipment. Similarly, antenna 1962, interface 1990, and/or processing circuitry 1970 can be configured to perform any transmitting operations described herein as being performed by a network node. Any information, data and/or signals can be transmitted to a wireless device, another network node and/or any other network equipment.

Power circuitry 1987 can comprise, or be coupled to, power management circuitry and can be configured to supply the components of network node 1960 with power for performing the functionality described herein. Power circuitry 1987 can receive power from power source 1986. Power source 1986 and/or power circuitry 1987 can be configured to provide power to the various components of network node 1960 in a form suitable for the respective components (e.g., at a voltage and current level needed for each respective component). Power source 1986 can either be included in, or external to, power circuitry 1987 and/or network node 1960. For example, network node 1960 can be connectable to an external power source (e.g., an electricity outlet) via an input circuitry or interface such as an electrical cable, whereby the external power source supplies power to power circuitry 1987. As a further example, power source 1986 can comprise a source of power in the form of a battery or battery pack which is connected to, or integrated in, power circuitry 1987. The battery can provide backup power should the external power source fail. Other types of power sources, such as photovoltaic devices, can also be used.

Alternative embodiments of network node 1960 can include additional components beyond those shown in FIG. 19 that can be responsible for providing certain aspects of the network node's functionality, including any of the functionality described herein and/or any functionality necessary to support the subject matter described herein. For example, network node 1960 can include user interface equipment to allow and/or facilitate input of information into network node 1960 and to allow and/or facilitate output of information from network node 1960. This can allow and/or facilitate a user to perform diagnostic, maintenance, repair, and other administrative functions for network node 1960.

In some embodiments, a wireless device (WD, e.g., WD 1910) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1910 includes antenna 1911, interface 1914, processing circuitry 1920, device readable medium 1930, user interface equipment 1932, auxiliary equipment 1934, power source 1936 and power circuitry 1937. WD 1910 can include multiple sets of one or more of the illustrated components for different wireless technologies supported by WD 1910, such as, for example, GSM, WCDMA, LTE, NR, WiFi, WiMAX, or Bluetooth wireless technologies, just to mention a few. These wireless technologies can be integrated into the same or different chips or set of chips as other components within WD 1910.

Antenna 1911 can include one or more antennas or antenna arrays, configured to send and/or receive wireless signals, and is connected to interface 1914. In certain alternative embodiments, antenna 1911 can be separate from WD 1910 and be connectable to WD 1910 through an interface or port. Antenna 1911, interface 1914, and/or processing circuitry 1920 can be configured to perform any receiving or transmitting operations described herein as being performed by a WD. Any information, data and/or signals can be received from a network node and/or another WD. In some embodiments, radio front end circuitry and/or antenna 1911 can be considered an interface.

As illustrated, interface 1914 comprises radio front end circuitry 1912 and antenna 1911. Radio front end circuitry 1912 comprise one or more filters 1918 and amplifiers 1916. Radio front end circuitry 1914 is connected to antenna 1911 and processing circuitry 1920 and can be configured to condition signals communicated between antenna 1911 and processing circuitry 1920. Radio front end circuitry 1912 can be coupled to or a part of antenna 1911. In some embodiments, WD 1910 may not include separate radio front end circuitry 1912; rather, processing circuitry 1920 can comprise radio front end circuitry and can be connected to antenna 1911. Similarly, in some embodiments, some or all of RF transceiver circuitry 1922 can be considered a part of interface 1914. Radio front end circuitry 1912 can receive digital data that is to be sent out to other network nodes or WDs via a wireless connection. Radio front end circuitry 1912 can convert the digital data into a radio signal having the appropriate channel and bandwidth parameters using a combination of filters 1918 and/or amplifiers 1916. The radio signal can then be transmitted via antenna 1911. Similarly, when receiving data, antenna 1911 can collect radio signals which are then converted into digital data by radio front end circuitry 1912. The digital data can be passed to processing circuitry 1920. In other embodiments, the interface can comprise different components and/or different combinations of components.

Processing circuitry 1920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1910 functionality either alone or in combination with other WD 1910 components, such as device readable medium 1930. Such functionality can include any of the various wireless features or benefits discussed herein.

For example, processing circuitry 1920 can execute instructions stored in device readable medium 1930 or in memory within processing circuitry 1920 to provide the functionality disclosed herein. More specifically, instructions (also referred to as a computer program product) stored in medium 1930 can include instructions that, when executed by processor 1920, can configure wireless device 1910 to perform operations corresponding to various exemplary methods (e.g., procedures) described herein.

As illustrated, processing circuitry 1920 includes one or more of RF transceiver circuitry 1922, baseband processing circuitry 1924, and application processing circuitry 1926. In other embodiments, the processing circuitry can comprise different components and/or different combinations of components. In certain embodiments processing circuitry 1920 of WD 1910 can comprise a SOC. In some embodiments, RF transceiver circuitry 1922, baseband processing circuitry 1924, and application processing circuitry 1926 can be on separate chips or sets of chips. In alternative embodiments, part or all of baseband processing circuitry 1924 and application processing circuitry 1926 can be combined into one chip or set of chips, and RF transceiver circuitry 1922 can be on a separate chip or set of chips. In still alternative embodiments, part or all of RF transceiver circuitry 1922 and baseband processing circuitry 1924 can be on the same chip or set of chips, and application processing circuitry 1926 can be on a separate chip or set of chips. In yet other alternative embodiments, part or all of RF transceiver circuitry 1922, baseband processing circuitry 1924, and application processing circuitry 1926 can be combined in the same chip or set of chips. In some embodiments, RF transceiver circuitry 1922 can be a part of interface 1914. RF transceiver circuitry 1922 can condition RF signals for processing circuitry 1920.

In certain embodiments, some or all of the functionality described herein as being performed by a WD can be provided by processing circuitry 1920 executing instructions stored on device readable medium 1930, which in certain embodiments can be a computer-readable storage medium. In alternative embodiments, some or all of the functionality can be provided by processing circuitry 1920 without executing instructions stored on a separate or discrete device readable storage medium, such as in a hard-wired manner. In any of those particular embodiments, whether executing instructions stored on a device readable storage medium or not, processing circuitry 1920 can be configured to perform the described functionality. The benefits provided by such functionality are not limited to processing circuitry 1920 alone or to other components of WD 1910, but are enjoyed by WD 1910 as a whole, and/or by end users and the wireless network generally.

Processing circuitry 1920 can be configured to perform any determining, calculating, or similar operations (e.g., certain obtaining operations) described herein as being performed by a WD. These operations, as performed by processing circuitry 1920, can include processing information obtained by processing circuitry 1920 by, for example, converting the obtained information into other information, comparing the obtained information or converted information to information stored by WD 1910, and/or performing one or more operations based on the obtained information or converted information, and as a result of said processing making a determination.

Device readable medium 1930 can be operable to store a computer program, software, an application including one or more of logic, rules, code, tables, etc. and/or other instructions capable of being executed by processing circuitry 1920. Device readable medium 1930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1920. In some embodiments, processing circuitry 1920 and device readable medium 1930 can be considered to be integrated.

User interface equipment 1932 can include components that allow and/or facilitate a human user to interact with WD 1910. Such interaction can be of many forms, such as visual, audial, tactile, etc. User interface equipment 1932 can be operable to produce output to the user and to allow and/or facilitate the user to provide input to WD 1910. The type of interaction can vary depending on the type of user interface equipment 1932 installed in WD 1910. For example, if WD 1910 is a smart phone, the interaction can be via a touch screen; if WD 1910 is a smart meter, the interaction can be through a screen that provides usage (e.g., the number of gallons used) or a speaker that provides an audible alert (e.g., if smoke is detected). User interface equipment 1932 can include input interfaces, devices and circuits, and output interfaces, devices and circuits. User interface equipment 1932 can be configured to allow and/or facilitate input of information into WD 1910 and is connected to processing circuitry 1920 to allow and/or facilitate processing circuitry 1920 to process the input information. User interface equipment 1932 can include, for example, a microphone, a proximity or other sensor, keys/buttons, a touch display, one or more cameras, a USB port, or other input circuitry. User interface equipment 1932 is also configured to allow and/or facilitate output of information from WD 1910, and to allow and/or facilitate processing circuitry 1920 to output information from WD 1910. User interface equipment 1932 can include, for example, a speaker, a display, vibrating circuitry, a USB port, a headphone interface, or other output circuitry. Using one or more input and output interfaces, devices, and circuits, of user interface equipment 1932, WD 1910 can communicate with end users and/or the wireless network and allow and/or facilitate them to benefit from the functionality described herein.

Auxiliary equipment 1934 is operable to provide more specific functionality which may not be generally performed by WDs. This can comprise specialized sensors for doing measurements for various purposes, interfaces for additional types of communication such as wired communications etc. The inclusion and type of components of auxiliary equipment 1934 can vary depending on the embodiment and/or scenario.

Power source 1936 can, in some embodiments, be in the form of a battery or battery pack. Other types of power sources, such as an external power source (e.g., an electricity outlet), photovoltaic devices or power cells, can also be used. WD 1910 can further comprise power circuitry 1937 for delivering power from power source 1936 to the various parts of WD 1910 which need power from power source 1936 to carry out any functionality described or indicated herein. Power circuitry 1937 can in certain embodiments comprise power management circuitry. Power circuitry 1937 can additionally or alternatively be operable to receive power from an external power source; in which case WD 1910 can be connectable to the external power source (such as an electricity outlet) via input circuitry or an interface such as an electrical power cable. Power circuitry 1937 can also in certain embodiments be operable to deliver power from an external power source to power source 1936. This can be, for example, for the charging of power source 1936. Power circuitry 1937 can perform any converting or other modification to the power from power source 1936 to make it suitable for supply to the respective components of WD 1910.

Figure 20:
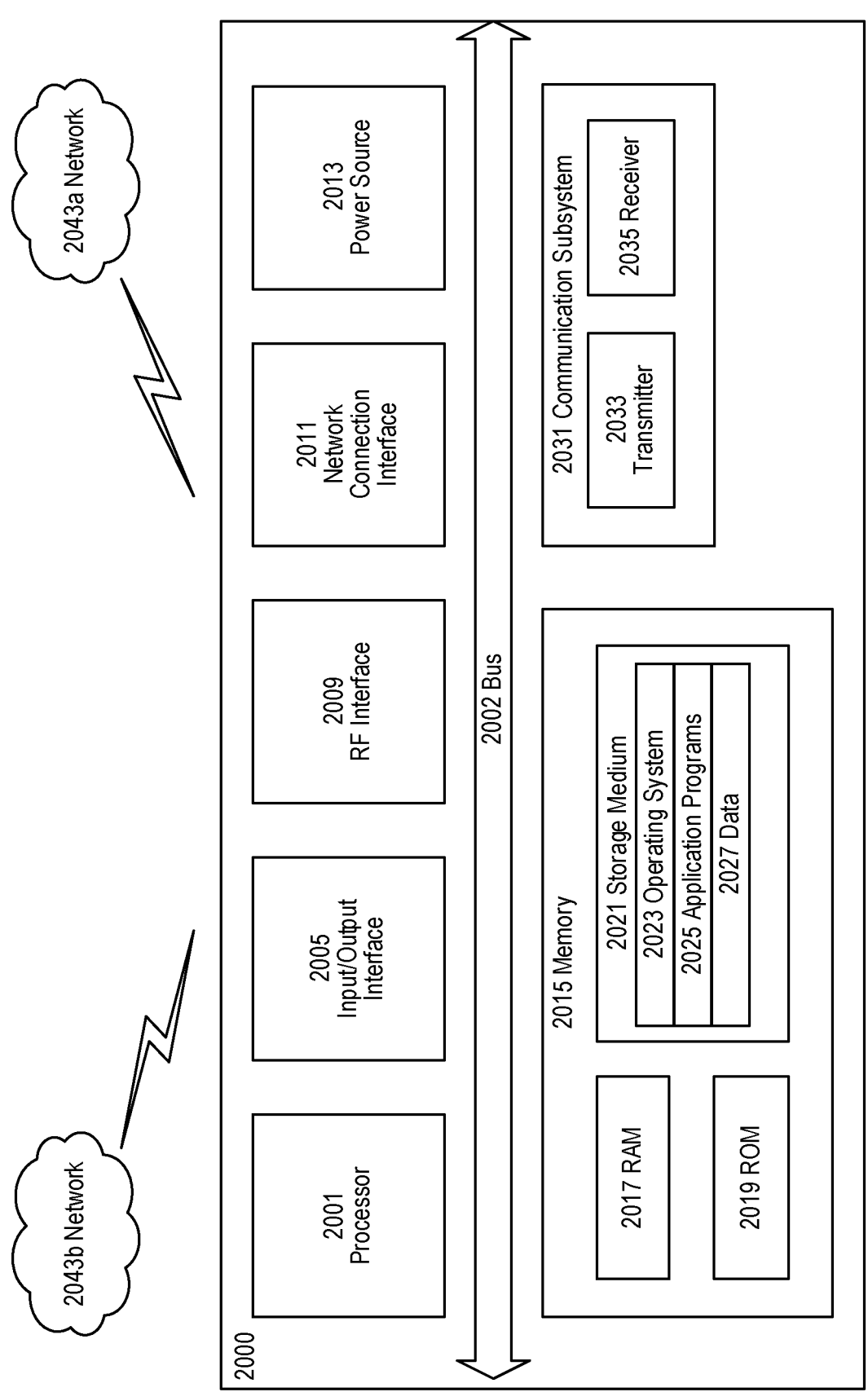
FIG. 20 shows an exemplary embodiment of a UE, in accordance with various aspects described herein.

FIG. 20 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 20200 can be any UE identified by the 3$^{rd}$ Generation Partnership Project (3GPP), including a NB-IoT UE, a machine type communication (MTC) UE, and/or an enhanced MTC (eMTC) UE. UE 2000, as illustrated in FIG. 20, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 20 is a UE, the components discussed herein are equally applicable to a WD, and vice-versa.

In FIG. 20, UE 2000 includes processing circuitry 2001 that is operatively coupled to input/output interface 2005, radio frequency (RF) interface 2009, network connection interface 2011, memory 2015 including random access memory (RAM) 2017, read-only memory (ROM) 2019, and storage medium 2021 or the like, communication subsystem 2031, power source 2033, and/or any other component, or any combination thereof. Storage medium 2021 includes operating system 2023, application program 2025, and data 2027. In other embodiments, storage medium 2021 can include other similar types of information. Certain UEs can utilize all of the components shown in FIG. 20, or only a subset of the components. The level of integration between the components can vary from one UE to another UE. Further, certain UEs can contain multiple instances of a component, such as multiple processors, memories, transceivers, transmitters, receivers, etc.

In FIG. 20, processing circuitry 2001 can be configured to process computer instructions and data. Processing circuitry 2001 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2001 can include two central processing units (CPUs). Data can be information in a form suitable for use by a computer.

In the depicted embodiment, input/output interface 2005 can be configured to provide a communication interface to an input device, output device, or input and output device. UE 2000 can be configured to use an output device via input/output interface 2005. An output device can use the same type of interface port as an input device. For example, a USB port can be used to provide input to and output from UE 2000. The output device can be a speaker, a sound card, a video card, a display, a monitor, a printer, an actuator, an emitter, a smartcard, another output device, or any combination thereof. UE 2000 can be configured to use an input device via input/output interface 2005 to allow and/or facilitate a user to capture information into UE 2000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 20, RF interface 2009 can be configured to provide a communication interface to RF components such as a transmitter, a receiver, and an antenna. Network connection interface 2011 can be configured to provide a communication interface to network 2043*a*. Network 2043*a* can encompass wired and/or wireless networks such as a local-area network (LAN), a wide-area network (WAN), a computer network, a wireless network, a telecommunications network, another like network or any combination thereof. For example, network 2043*a* can comprise a Wi-Fi network. Network connection interface 2011 can be configured to include a receiver and a transmitter interface used to communicate with one or more other devices over a communication network according to one or more communication protocols, such as Ethernet, TCP/IP, SONET, ATM, or the like. Network connection interface 2011 can implement receiver and transmitter functionality appropriate to the communication network links (e.g., optical, electrical, and the like). The transmitter and receiver functions can share circuit components, software or firmware, or alternatively can be implemented separately.

RAM 2017 can be configured to interface via bus 2002 to processing circuitry 2001 to provide storage or caching of data or computer instructions during the execution of software programs such as the operating system, application programs, and device drivers. ROM 2019 can be configured to provide computer instructions or data to processing circuitry 2001. For example, ROM 2019 can be configured to store invariant low-level system code or data for basic system functions such as basic input and output (I/O), startup, or reception of keystrokes from a keyboard that are stored in a non-volatile memory. Storage medium 2021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2021 can be configured to include operating system 2023; application program 2025 such as a web browser application, a widget or gadget engine or another application; and data file 2027. Storage medium 2021 can store, for use by UE 2000, any of a variety of various operating systems or combinations of operating systems. For example, application program 2025 can include executable program instructions (also referred to as a computer program product) that, when executed by processor 2001, can configure UE 2000 to perform operations corresponding to various exemplary methods (e.g., procedures) described herein.

Storage medium 2021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2021 can allow and/or facilitate UE 2000 to access computer-executable instructions, application programs or the like, stored on transitory or non-transitory memory media, to off-load data, or to upload data. An article of manufacture, such as one utilizing a communication system can be tangibly embodied in storage medium 2021, which can comprise a device readable medium.

In FIG. 20, processing circuitry 2001 can be configured to communicate with network 2043*b* using communication subsystem 2031. Network 2043*a* and network 2043*b* can be the same network or networks or different network or networks. Communication subsystem 2031 can be configured to include one or more transceivers used to communicate with network 2043*b*. For example, communication subsystem 2031 can be configured to include one or more transceivers used to communicate with one or more remote transceivers of another device capable of wireless communication such as another WD, UE, or base station of a radio access network (RAN) according to one or more communication protocols, such as IEEE 802.20, CDMA, WCDMA, GSM, LTE, UTRAN, WiMax, or the like. Each transceiver can include transmitter 2033 and/or receiver 2035 to implement transmitter or receiver functionality, respectively, appropriate to the RAN links (e.g., frequency allocations and the like). Further, transmitter 2033 and receiver 2035 of each transceiver can share circuit components, software or firmware, or alternatively can be implemented separately.

In the illustrated embodiment, the communication functions of communication subsystem 2031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2031 can include cellular communication, Wi-Fi communication, Bluetooth communication, and GPS communication. Network 2043*b* can encompass wired and/or wireless networks such as a local-area network (LAN), a wide-area network (WAN), a computer network, a wireless network, a telecommunications network, another like network or any combination thereof. For example, network 2043*b* can be a cellular network, a Wi-Fi network, and/or a near-field network. Power source 2013 can be configured to provide alternating current (AC) or direct current (DC) power to components of UE 2000.

The features, benefits and/or functions described herein can be implemented in one of the components of UE 2000 or partitioned across multiple components of UE 2000. Further, the features, benefits, and/or functions described herein can be implemented in any combination of hardware, software or firmware. In one example, communication subsystem 2031 can be configured to include any of the components described herein. Further, processing circuitry 2001 can be configured to communicate with any of such components over bus 2002. In another example, any of such components can be represented by program instructions stored in memory that when executed by processing circuitry 2001 perform the corresponding functions described herein. In another example, the functionality of any of such components can be partitioned between processing circuitry 2001 and communication subsystem 2031. In another example, the non-computationally intensive functions of any of such components can be implemented in software or firmware and the computationally intensive functions can be implemented in hardware.

Figure 21:
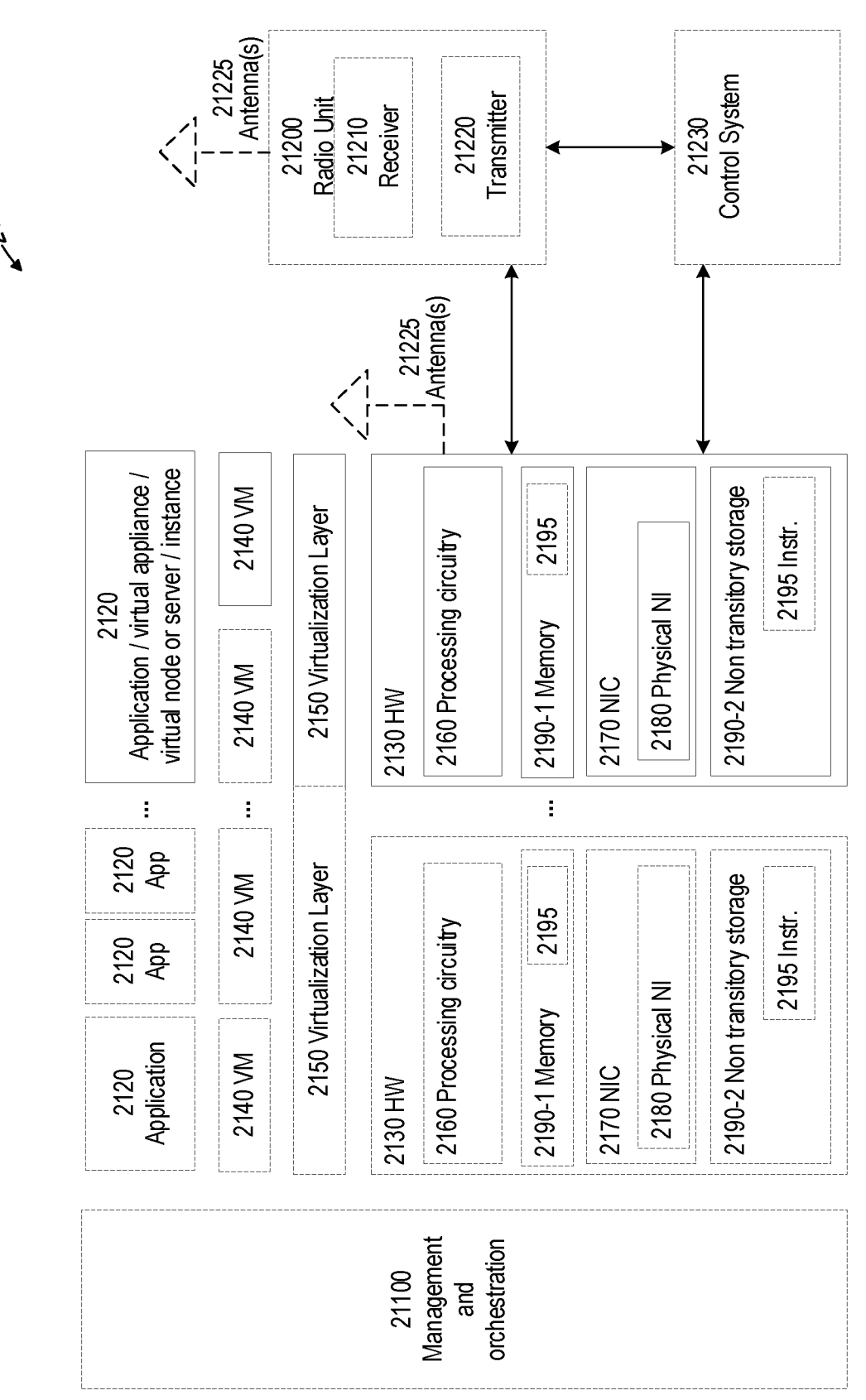
FIG. 21 is a block diagram illustrating an exemplary virtualization environment usable for implementation of various embodiments of network nodes described herein.

FIG. 21 is a schematic block diagram illustrating a virtualization environment 2100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2100 hosted by one or more of hardware nodes 2130. Further, in embodiments in which the virtual node is not a radio access node or does not require radio connectivity (e.g., a core network node), then the network node can be entirely virtualized.

The functions can be implemented by one or more applications 2120 (which can alternatively be called software instances, virtual appliances, network functions, virtual nodes, virtual network functions, etc.) operative to implement some of the features, functions, and/or benefits of some of the embodiments disclosed herein. Applications 2120 are run in virtualization environment 2100 which provides hardware 2130 comprising processing circuitry 2160 and memory 2190. Memory 2190 contains instructions 2195 executable by processing circuitry 2160 whereby application 2120 is operative to provide one or more of the features, benefits, and/or functions disclosed herein.

Virtualization environment 2100 can include general-purpose or special-purpose network hardware devices (or nodes) 2130 comprising a set of one or more processors or processing circuitry 2160, which can be commercial off-the-shelf (COTS) processors, dedicated Application Specific Integrated Circuits (ASICs), or any other type of processing circuitry including digital or analog hardware components or special purpose processors. Each hardware device can comprise memory 2190-1 which can be non-persistent memory for temporarily storing instructions 2195 or software executed by processing circuitry 2160. For example, instructions 2195 can include program instructions (also referred to as a computer program product) that, when executed by processing circuitry 2160, can configure hardware node 2120 to perform operations corresponding to various exemplary methods (e.g., procedures) described herein. Such operations can also be attributed to virtual node(s) 2120 that is/are hosted by hardware node 2130.

Each hardware device can comprise one or more network interface controllers (NICs) 2170, also known as network interface cards, which include physical network interface 2180. Each hardware device can also include non-transitory, persistent, machine-readable storage media 2190-2 having stored therein software 2195 and/or instructions executable by processing circuitry 2160. Software 2195 can include any type of software including software for instantiating one or more virtualization layers 2150 (also referred to as hypervisors), software to execute virtual machines 2140 as well as software allowing it to execute functions, features and/or benefits described in relation with some embodiments described herein.

Virtual machines 2140, comprise virtual processing, virtual memory, virtual networking or interface and virtual storage, and can be run by a corresponding virtualization layer 2150 or hypervisor. Different embodiments of the instance of virtual appliance 2120 can be implemented on one or more of virtual machines 2140, and the implementations can be made in different ways.

During operation, processing circuitry 2160 executes software 2195 to instantiate the hypervisor or virtualization layer 2150, which can sometimes be referred to as a virtual machine monitor (VMM). Virtualization layer 2150 can present a virtual operating platform that appears like networking hardware to virtual machine 2140.

As shown in FIG. 21, hardware 2130 can be a standalone network node with generic or specific components. Hardware 2130 can comprise antenna 21225 and can implement some functions via virtualization. Alternatively, hardware 2130 can be part of a larger cluster of hardware (e.g., such as in a data center or customer premise equipment (CPE)) where many hardware nodes work together and are managed via management and orchestration (MANO) 21100, which, among others, oversees lifecycle management of applications 2120.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 2140 can be a software implementation of a physical machine that runs programs as if they were executing on a physical, non-virtualized machine. Each of virtual machines 2140, and that part of hardware 2130 that executes that virtual machine, be it hardware dedicated to that virtual machine and/or hardware shared by that virtual machine with others of the virtual machines 2140, forms a separate virtual network elements (VNE).

Still in the context of NFV, Virtual Network Function (VNF) is responsible for handling specific network functions that run in one or more virtual machines 2140 on top of hardware networking infrastructure 2130 and corresponds to application 2120 in FIG. 21.

In some embodiments, one or more radio units 21200 that each include one or more transmitters 21220 and one or more receivers 21210 can be coupled to one or more antennas 21225. Radio units 21200 can communicate directly with hardware nodes 2130 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 21230, which can alternatively be used for communication between the hardware nodes 2130 and radio units 21200.

Figure 22:
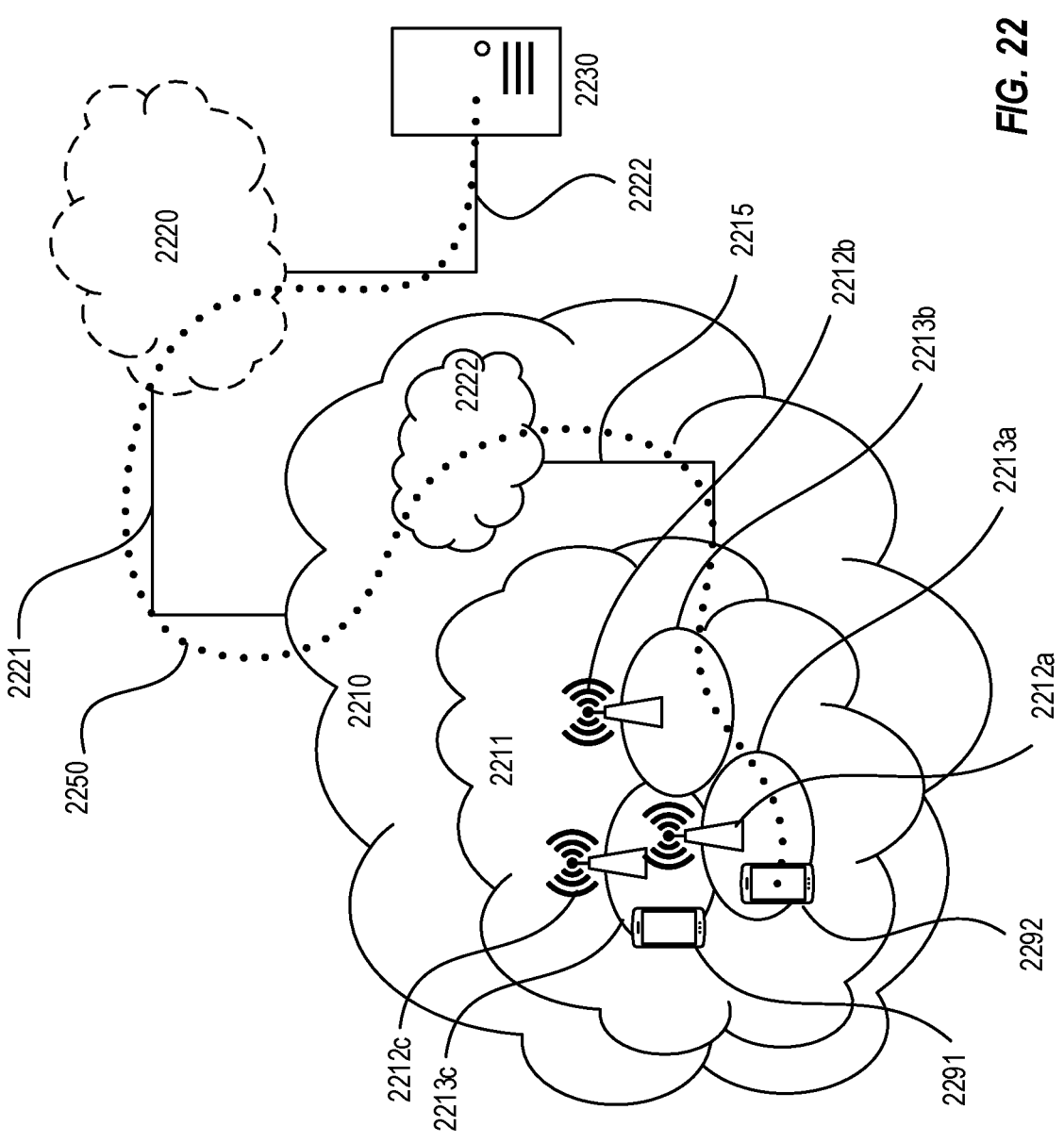
FIGS. 22-23 are block diagrams of various exemplary communication systems and/or networks, in accordance with various aspects described herein.

With reference to FIG. 22, in accordance with an embodiment, a communication system includes telecommunication network 2210, such as a 3GPP-type cellular network, which comprises access network 2211, such as a radio access network, and core network 2222. Access network 2211 comprises a plurality of base stations 2212a, 2212b, 2212c, such as NBs, eNBs, gNBs or other types of wireless access points, each defining a corresponding coverage area 2213a, 2213b, 2213c. Each base station 2212a, 2212b, 2212c is connectable to core network 2222 over a wired or wireless connection 2215. A first UE 2291 located in coverage area 2213c can be configured to wirelessly connect to, or be paged by, the corresponding base station 2212c. A second UE 2292 in coverage area 2213a is wirelessly connectable to the corresponding base station 2212a. While a plurality of UEs 2291, 2292 are illustrated in this example, the disclosed embodiments are equally applicable to a situation where a sole UE is in the coverage area or where a sole UE is connecting to the corresponding base stations.

Telecommunication network 2210 is itself connected to host computer 2230, which can be embodied in the hardware and/or software of a standalone server, a cloud-implemented server, a distributed server or as processing resources in a server farm. Host computer 2230 can be under the ownership or control of a service provider or can be operated by the service provider or on behalf of the service provider. Connections 2221 and 2222 between telecommunication network 2210 and host computer 2230 can extend directly from core network 2222 to host computer 2230 or can go via an optional intermediate network 2220. Intermediate network 2220 can be one of, or a combination of more than one of, a public, private or hosted network; intermediate network 2220, if any, can be a backbone network or the Internet; in particular, intermediate network 2220 can comprise two or more sub-networks (not shown).

The communication system of FIG. 22 as a whole enables connectivity between the connected UEs 2291, 2292 and host computer 2230. The connectivity can be described as an over-the-top (OTT) connection 2250. Host computer 2230 and the connected UEs 2291, 2292 are configured to communicate data and/or signaling via OTT connection 2250, using access network 2211, core network 2222, any intermediate network 2220 and possible further infrastructure (not shown) as intermediaries. OTT connection 2250 can be transparent in the sense that the participating communication devices through which OTT connection 2250 passes are unaware of routing of uplink and downlink communications. For example, base station 2212 may not or need not be informed about the past routing of an incoming downlink communication with data originating from host computer 2230 to be forwarded (e.g., handed over) to a connected UE 2291. Similarly, base station 2212 need not be aware of the future routing of an outgoing uplink communication originating from the UE 2291 towards the host computer 2230.

Example implementations, in accordance with an embodiment, of the UE, base station and host computer discussed in the preceding paragraphs will now be described with reference to FIG. 23. In communication system 2300, host computer 2310 comprises hardware 2315 including communication interface 2316 configured to set up and maintain a wired or wireless connection with an interface of a different communication device of communication system 2300. Host computer 2310 further comprises processing circuitry 2318, which can have storage and/or processing capabilities. In particular, processing circuitry 2318 can comprise one or more programmable processors, application-specific integrated circuits, field programmable gate arrays or combinations of these (not shown) adapted to execute instructions. Host computer 2310 further comprises software 2311, which is stored in or accessible by host computer 2310 and executable by processing circuitry 2318. Software 2311 includes host application 2312. Host application 2312 can be operable to provide a service to a remote user, such as UE 2330 connecting via OTT connection 2350 terminating at UE 2330 and host computer 2310. In providing the service to the remote user, host application 2312 can provide user data which is transmitted using OTT connection 2350.

Communication system 2300 can also include base station 2320 provided in a telecommunication system and comprising hardware 2325 enabling it to communicate with host computer 2310 and with UE 2330. Hardware 2325 can include communication interface 2326 for setting up and maintaining a wired or wireless connection with an interface of a different communication device of communication system 2300, as well as radio interface 2327 for setting up and maintaining at least wireless connection 2370 with UE 2330 located in a coverage area (not shown in FIG. 23) served by base station 2320. Communication interface 2326 can be configured to facilitate connection 2360 to host computer 2310. Connection 2360 can be direct, or it can pass through a core network (not shown in FIG. 23) of the telecommunication system and/or through one or more intermediate networks outside the telecommunication system. In the embodiment shown, hardware 2325 of base station 2320 can also include processing circuitry 2328, which can comprise one or more programmable processors, application-specific integrated circuits, field programmable gate arrays or combinations of these (not shown) adapted to execute instructions.

Base station 2320 also includes software 2321 stored internally or accessible via an external connection. For example, software 2321 can include program instructions (also referred to as a computer program product) that, when executed by processing circuitry 2328, can configure base station 2320 to perform operations corresponding to various exemplary methods (e.g., procedures) described herein.

Communication system 2300 can also include UE 2330 already referred to, whose hardware 2335 can include radio interface 2337 configured to set up and maintain wireless connection 2370 with a base station serving a coverage area in which UE 2330 is currently located. Hardware 2335 of UE 2330 can also include processing circuitry 2338, which can comprise one or more programmable processors, application-specific integrated circuits, field programmable gate arrays or combinations of these (not shown) adapted to execute instructions.

UE 2330 also includes software 2331, which is stored in or accessible by UE 2330 and executable by processing circuitry 2338. Software 2331 includes client application 2332. Client application 2332 can be operable to provide a service to a human or non-human user via UE 2330, with the support of host computer 2310. In host computer 2310, an executing host application 2312 can communicate with the executing client application 2332 via OTT connection 2350 terminating at UE 2330 and host computer 2310. In providing the service to the user, client application 2332 can receive request data from host application 2312 and provide user data in response to the request data. OTT connection 2350 can transfer both the request data and the user data. Client application 2332 can interact with the user to generate the user data that it provides. Software 2331 can also include program instructions (also referred to as a computer program product) that, when executed by processing circuitry 2338, can configure UE 2330 to perform operations corresponding to various exemplary methods (e.g., procedures) described herein.

Figure 23:
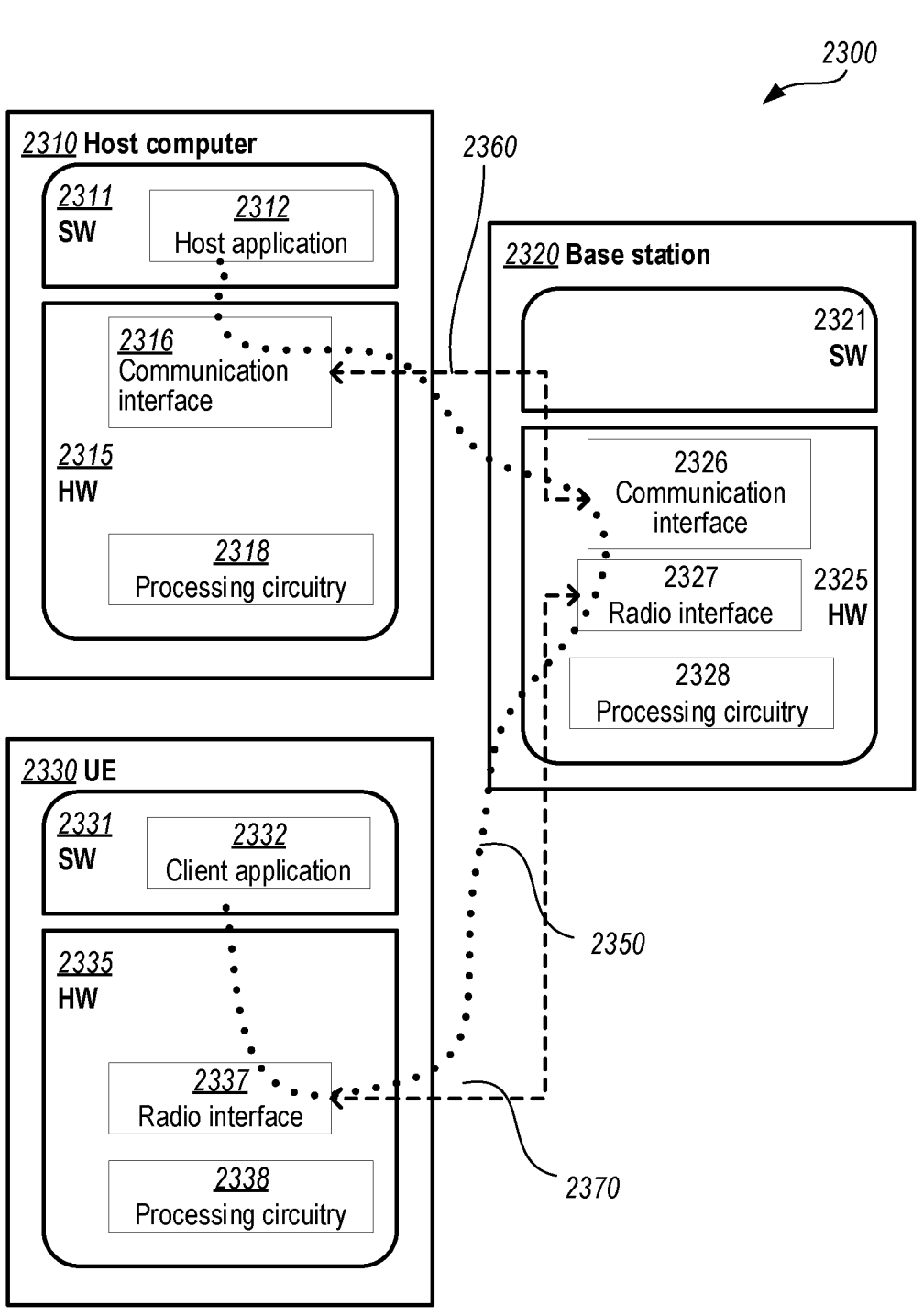

As an example, host computer 2310, base station 2320 and UE 2330 illustrated in FIG. 23 can be similar or identical to host computer 2230, one of base stations 2212a, 2212b, 2212*c* and one of UEs 2291, 2292 of FIG. 22, respectively. This is to say, the inner workings of these entities can be as shown in FIG. 23 and independently, the surrounding network topology can be that of FIG. 22.

In FIG. 23, OTT connection 2350 has been drawn abstractly to illustrate the communication between host computer 2310 and UE 2330 via base station 2320, without explicit reference to any intermediary devices and the precise routing of messages via these devices. Network infrastructure can determine the routing, which it can be configured to hide from UE 2330 or from the service provider operating host computer 2310, or both. While OTT connection 2350 is active, the network infrastructure can further take decisions by which it dynamically changes the routing (e.g., on the basis of load balancing consideration or reconfiguration of the network).

Wireless connection 2370 between UE 2330 and base station 2320 is in accordance with the teachings of the embodiments described throughout this disclosure. One or more of the various embodiments improve the performance of OTT services provided to UE 2330 using OTT connection 2350, in which wireless connection 2370 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2350 between host computer 2310 and UE 2330, in response to variations in the measurement results. The measurement procedure and/or the network functionality for reconfiguring OTT connection 2350 can be implemented in software 2311 and hardware 2315 of host computer 2310 or in software 2331 and hardware 2335 of UE 2330, or both. In embodiments, sensors (not shown) can be deployed in or in association with communication devices through which OTT connection 2350 passes; the sensors can participate in the measurement procedure by supplying values of the monitored quantities exemplified above or by supplying values of other physical quantities from which software 2311, 2331 can compute or estimate the monitored quantities. The reconfiguring of OTT connection 2350 can include message format, retransmission settings, preferred routing etc.; the reconfiguring need not affect base station 2320, and it can be unknown or imperceptible to base station 2320. Such procedures and functionalities can be known and practiced in the art. In certain embodiments, measurements can involve proprietary UE signaling facilitating host computer 2310's measurements of throughput, propagation times, latency and the like. The measurements can be implemented in that software 2311 and 2331 causes messages to be transmitted, in particular empty or 'dummy' messages, using OTT connection 2350 while it monitors propagation times, errors, etc.

Figures 24, 25, 26, 27:
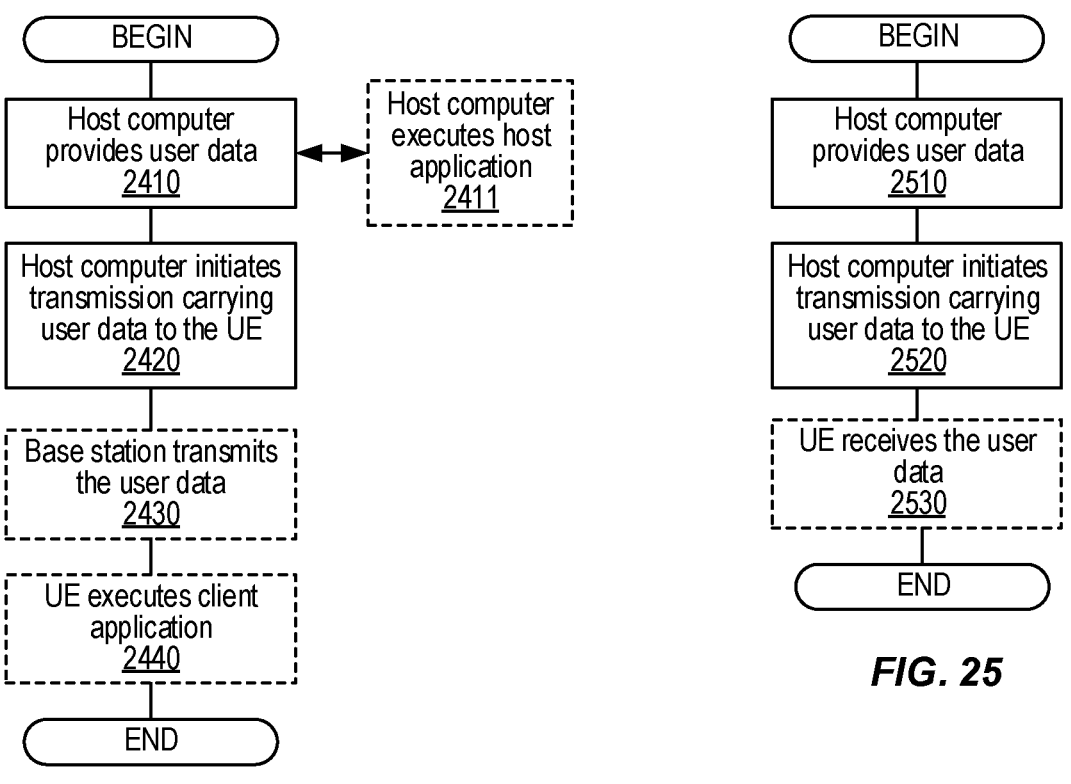
FIGS. 24-27 are flow diagrams of exemplary methods and/or procedures for transmission and/or reception of user data.

FIG. 24 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 24 will be included in this section. In step 2410, the host computer provides user data. In substep 2411 (which can be optional) of step 2410, the host computer provides the user data by executing a host application. In step 2420, the host computer initiates a transmission carrying the user data to the UE. In step 2430 (which can be optional), the base station transmits to the UE the user data which was carried in the transmission that the host computer initiated, in accordance with the teachings of the embodiments described throughout this disclosure. In step 2440 (which can also be optional), the UE executes a client application associated with the host application executed by the host computer.

FIG. 25 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission can pass via the base station, in accordance with the teachings of the embodiments described throughout this disclosure. In step 2530 (which can be optional), the UE receives the user data carried in the transmission.

FIG. 26 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 26 will be included in this section. In step 2610 (which can be optional), the UE receives input data provided by the host computer. Additionally or alternatively, in step 2620, the UE provides user data. In substep 2621 (which can be optional) of step 2620, the UE provides the user data by executing a client application. In substep 2611 (which can be optional) of step 2610, the UE executes a client application which provides the user data in reaction to the received input data provided by the host computer. In providing the user data, the executed client application can further consider user input received from the user. Regardless of the specific manner in which the user data was provided, the UE initiates, in substep 2630 (which can be optional), transmission of the user data to the host computer. In step 2640 of the method, the host computer receives the user data transmitted from the UE, in accordance with the teachings of the embodiments described throughout this disclosure.

FIG. 27 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 27 will be included in this section. In step 2710 (which can be optional), in accordance with the teachings of the embodiments described throughout this disclosure, the base station receives user data from the UE. In step 2720 (which can be optional), the base station initiates transmission of the received user data to the host computer. In step 2730 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated embodiments:

A1. A method performed by a first network node operating as a parent or ancestor node for a second network node in a first Integrated Access and Wireless Access Backhaul (JAB) network, the method comprising:

determining that the second network node is migrating from a first central unit associated with the first IAB network to a second central unit associated with a second IAB network; and in response to determining that the second network node is migrating from the first central unit associated with the first IAB network to the second central unit associated with the second IAB network, performing at least one action with respect to at least one packet associated with the second network node while the second network node is being handed over to the second IAB network.

A2. The method of Embodiment A1, wherein:

the first network node comprises a first IAB node, the second network comprises a second IAB node, and the first network node is operating as an immediate source parent node with respect to the second network node.

A3. The method of Embodiment A2, wherein determining that the second network node is migrating from the first IAB network to the second IAB network comprises:

receiving a radio resource control message in a User Equipment (UE) context modification request; and determining that the second network node is migrating to the second IAB network based on the radio resource control message in the UE context modification request.

A4. The method of any one of Embodiments A2-A3, further comprising determining that the handover is an inter-Central Unit (inter-CU) handover.

A5. The method of Embodiment A2, wherein determining that the second network node is migrating from the first central unit associated with the first IAB network to the second central unit associated with the second IAB network comprises receiving a message from the first central unit, the message indicating that the second network node is migrating from the first central unit to the second central unit.

A6. The method of Embodiment A5, wherein the message comprises a F1 Application Protocol (F1-AP) User Equipment Context Modification Request message.

A7. The method of Embodiment A5, wherein the message comprises a Backhaul Adaptation Protocol (BAP) control message that is received from the second network node or a third network node that is operating as a parent or ancestor node with respect to the second network node.

A8. The method of Embodiment A1, wherein:
the first network node comprises a first IAB node or a distributed unit,
the second network comprises a second IAB node, and
the first network node is operating as source ancestor node with respect to the second network node.

A9. The method of Embodiment A8, wherein determining that the second network node is migrating from the first IAB network to the second IAB network comprises receiving a message from a third network node associated with the first IAB network, the message indicating that the second network node is migrating from the first IAB network to the second IAB network.

A10. The method of Embodiment A9, wherein the message comprises an F1 message received from the first central unit.

A11. The method of Embodiment A9, wherein the message comprises a BAP control message received from a third network node that is a child or parent node of the first network node.

A12. The method of any one of Embodiments A9-A11, wherein the third network node is operating as an immediate parent node with respect to the second network node.

A13. The method of any one of Embodiments A9-A11, wherein the third network node is operating as a source ancestor network node with respect to the second network node.

A14. The method of any one of Embodiments A9-A11, wherein the third network node comprises a central unit associated with the first IAB network.

A15. The method of any one of Embodiments A1-A14, wherein determining that the second network node is migrating from the first IAB network to the second IAB network comprises determining that a handover procedure is being performed to handover the second network node to a second IAB network.

A16. The method of any one of Embodiments A1-A15, further comprising receiving an indication of how to handle the at least one packet associated with the second network node while the second network node is being handed over to the second IAB network.

A17. The method of Embodiment A16, wherein the indication indicates that the first network node is to perform at least one of:
receiving the at least one packet associated with the second network node;
transmitting the at least one packet associated with the second network node;
forwarding the at least one packet associated with the second network node; and
deleting the at least one packet associated with the second network node.

A18. The method of any one of Embodiments A1-A17, wherein performing the at least one action with respect to the at least one packet associated with the second network node comprises performing at least one of:
receiving the at least one packet associated with the second network node;
transmitting the at least one packet associated with the second network node;
forward the at least one packet associated with the second network node; and
delete the at least one packet associated with the second network node.

A19. The method of any one of Embodiments A1-A18, wherein the at least one packet comprises at least one downlink packet buffered at the first network node, the at least one at least one packet having been routed downstream via the second network node.

A20. The method of any one of Embodiments A1-A18, wherein the at least one packet comprises at least one uplink packet buffered at the first network node, the at least one packet having been received from the second network node, or from an IAB network node or a user equipment (UE) served by the second network node.

A21. The method of any one of Embodiments A1-A20, further comprising receiving a message indicating the at least one action, the at least one action comprises at least one of:
forwarding all downlink packets associated with the second network node;
forwarding all downlink packets associated with a list of egress Backhaul (BH) channels;
deleting all downlink packets associated with a list of egress BH channels;
forwarding all downlink packets associated with a list of Quality of Service (QoS) profiles;
forwarding all downlink packets associated with a particular priority;
forwarding all downlink packets associated with a list of BAP routing identifiers;
deleting all downlink packets associated with the second network node;
deleting all downlink packets associated with a list of egress BH channels;
deleting all downlink packets associated with a list of QoS profiles;
deleting all downlink packets associated with a particular priority; and
deleting all downlink packets associated with a list of BAP routing identifiers.

A22. A computer program comprising instructions which when executed on a computer perform any of the methods of embodiments A1-A21.

A23. A computer program product comprising instructions which when executed on a computer perform any of the methods of embodiments A1-A21.

A24. A non-transitory computer-readable medium storing instructions which when executed by a computer perform any of the methods of embodiments A1-A21.

A25. A network node comprising:
processing circuitry configured to perform operations corresponding to any of the methods of embodiments A1-A21; and
power supply circuitry configured to supply power to the network node.

A26. A communication system including a host computer comprising:
processing circuitry configured to provide user data; and a communication interface configured to forward the user data to a cellular network for transmission to a wireless device, wherein the cellular network comprises a network node having a radio interface and processing circuitry, the network node's processing circuitry configured to perform operations corresponding to any of the methods of embodiments A1-A21.

A27. The communication system of embodiment A26, further including the network node.

A28. The communication system of any of embodiments A26-A27, further including the wireless device, wherein the wireless device is configured to communicate with the network node.

A29. The communication system of any of embodiments A26-A28, wherein:

the processing circuitry of the host computer is configured to execute a host application, thereby providing the user data; and the wireless device comprises processing circuitry configured to execute a client application associated with the host application.

A30. A method implemented in a communication system including a host computer, a network node and a wireless device, the method comprising:

at the host computer, providing user data; and at the host computer, initiating a transmission carrying the user data to the wireless device via a cellular network comprising the network node, wherein the network node is configured to perform operations corresponding to any of the methods of embodiments A1-A21.

A31. The method of the embodiment A30, further comprising, at the network node, transmitting the user data.

A32. The method of any of embodiments A30-A31, wherein the user data is provided at the host computer by executing a host application, the method further comprising, at the wireless device, executing a client application associated with the host application.

A33. A wireless device configured to communicate with a network node, the wireless device comprising a radio interface and processing circuitry configured to perform operations corresponding to any of the methods of embodiments A30-A32.

A34. A communication system including a host computer comprising a communication interface configured to receive user data originating from a transmission from a wireless device to a network node, wherein the network node comprises a radio interface and processing circuitry, the network node's processing circuitry being configured to perform operations corresponding to any of the methods of embodiments A1-A21.

A35. The communication system of embodiment A34, further including the network node.

A36. The communication system of any of embodiments A34-A35, further including the wireless device, wherein the wireless device is configured to communicate with the network node.

A37. The communication system of any of embodiments A34-A36, wherein:

the processing circuitry of the host computer is configured to execute a host application; and the wireless device is configured to execute a client application associated with the host application, thereby providing the user data to be received by the host computer.

A38. The communication system of any of embodiments A34-A37, wherein the network node comprises a base station.

The invention claimed is:

1. A method performed by a first network node arranged as an ancestor node of a second network node in an Integrated Access Backhaul (IAB) network, the method comprising:

determining that the second network node is migrating from a first centralized unit (CU) to a second CU;

based on determining that the second network node is migrating from the first CU to the second CU, performing modified handling of buffered data associated with the second network node, including at least one of the following:

uplink (UL) data buffered at the first network node, downlink (DL) data buffered at the first network node, and UL data buffered at one or more child nodes of the first network node; and receiving instructions for modified handling of buffered data associated with the second network node, wherein the modified handling is performed in accordance with the instructions.

2. The method of claim 1, wherein performing the modified handling includes one or more of the following:

sending, to a parent node of the first network node, one or more buffer status reports (BSR) regarding the UL data buffered at the first network node, forwarding at least a portion of the UL data buffered at the first network node to the parent node, deleting at least a portion of the UL data buffered at the first network node, forwarding at least a portion of the DL data buffered at the first network node to at least one of the child nodes, deleting at least a portion of the DL data buffered at the first network node, providing one or more UL scheduling grants to at least one of the child nodes for UL data buffered at the at least one child node, and refraining from providing one or more UL scheduling grants to the at least one child node.

3. The method of claim 1, wherein the UL and/or DL data associated with the second network node that is buffered at the first network node includes one or more of the following:

UL data originating from the second network node;

UL data originating from one or more descendant nodes of the second network node;

UL data originating from user equipment, UEs, served directly or indirectly by the second network node;

DL data destined for the second network node;

DL data destined for one or more descendant nodes of the second network node; and DL data destined for UEs served directly or indirectly by the second network node.

4. The method of claim 1, wherein the instructions for modified handling of buffered data associated with the second network node include:

one or more first criteria related to amounts of DL data buffered at the first network node; and one or more second criteria related to whether DL data buffered at the first network node should be deleted or forwarded to respective descendant nodes.

5. The method of claim 4, wherein the second criteria include one or more of the following:

an indicator that all types of buffered DL data should be deleted or forwarded;

list of backhaul radio link control (BH RLC) channels
whose buffered DL data should be forwarded;
list of BH RLC channels whose buffered DL data should
be deleted;
list of access RLC channels whose buffered DL data
should be forwarded;
list of access RLC channels whose buffered DL data
should be deleted;
list of Quality of Service (QoS) profiles and/or priorities
for which buffered DL data should be forwarded;
list of QoS profiles and/or priorities for which buffered
DL data should be deleted;
list of backhaul adaptation protocol (BAP) routing iden-
tifiers for which buffered DL data should be forwarded;
and
list of BAP routing identifiers for which buffered DL data
should be deleted.

6. The method of claim 1, wherein the instructions for
modified handling of buffered data associated with the
second network node include:
one or more third criteria related to amounts of UL data
buffered at the first network node; and
one or more fourth criteria related to whether buffer status
reports (BSRs) should be transmitted, to a parent node,
for UL data buffered at the first network node.

7. The method of claim 6, wherein each of the first and
third criteria identify amounts according to one or more of
the following: all buffered data, an explicit amount of
buffered data, a percentage of buffered data, and a duration.

8. The method of claim 6 wherein the fourth criteria
include one or more of the following:
an indicator that BSRs should be transmitted for all types
of buffered UL data;
list of backhaul radio link control (BH RLC) channels for
which BSRs should be transmitted;
list of access RLC channels for which BSRs should be
transmitted;
list of Quality of Service (QoS) profiles and/or priorities
for which BSRs should be transmitted; and
list of backhaul adaptation protocol (BAP) routing iden-
tifiers for which BSRs should be transmitted.

9. The method of claim 1, wherein the instructions for
modified handling of buffered data associated with the
second network node include:
a first configuration for handling UL data buffered at a first
child node;
a second configuration for handling UL data buffered at a
second child node; and
a third configuration for handling UL data buffered at both
the first and second child nodes.

10. The method of claim 1, wherein the instructions for
modified handling of buffered data associated with the
second network node include:
one or more fifth criteria related to amounts of UL data
buffered at the child nodes; and
one or more sixth criteria related to whether UL grants
should be provided for UL data buffered at the child
nodes.

11. The method of claim 10, wherein the sixth criteria
include one or more of the following:
an indicator that UL grants should be provided for all
buffered UL data;
list of backhaul radio link control (BH RLC) channels for
which UL grants should be provided;
list of access RLC channels for which UL grants should
be provided;

64 list of Quality of Service (QoS) profiles and/or priorities
for which UL grants should be provided; and
list of backhaul adaptation protocol (BAP) routing iden-
tifiers for which UL grants should be provided.

12. The method of claim 1, further comprising sending, to
the first CU, a migration report about the modified handling
of the buffered data associated with the second network
node, wherein the migration report includes one or more of
the following: amount of data deleted, amount of data
forwarded, timestamp of last forwarded DL data, and time-
stamp of last forwarded UL data.

13. The method of claim 1, wherein determining that the
second network node is migrating from the first CU to the
second CU is based on one of the following messages:
a User Equipment (UE) Context Modification Request
message from the first CU; or
a Backhaul Adaptation Protocol (BAP) control message
from the second network node or from a third network
node arranged as child node of the first network node
and as an ancestor node of the second network node.

14. The method of claim 13, wherein determining that the
second network node is migrating from the first CU to the
second CU is based on one of the following in the UE
Context Modification Request message:
an embedded radio resource control (RRC) message;
a separate indication that an embedded RRC message is
for an inter-CU handover of the second network node
to the second CU; or
a BAP address of the second network node.

15. A first network node arranged as an ancestor node of
a second network node in an Integrated Access Backhaul
(IAB) network, the first network node comprising process-
ing circuitry and memory, the memory containing instruc-
tions executable by the processing circuitry whereby the first
network node being configured to:
determine that the second network node is migrating from
a first centralized unit (CU) to a second CU;
based on determining that the second network node is
migrating from the first CU to the second CU, perform
modified handling of buffered data associated with the
second network node, including at least one of the
following:
uplink (UL) data buffered at the first network node,
downlink (DL) data buffered at the first network node,
and
UL data buffered at one or more child nodes of the first
network node; and
receive instructions for modified handling of buffered data
associated with the second network node, wherein the
modified handling is performed in accordance with the
instructions.

16. The first network node of claim 15, wherein perform
the modified handling includes one or more of the following:
send, to a parent node of the first network node, one or
more buffer status reports (BSR) regarding the UL data
buffered at the first network node,
forward at least a portion of the UL data buffered at the
first network node to the parent node,
delete at least a portion of the UL data buffered at the first
network node,
forward at least a portion of the DL data buffered at the
first network node to at least one of the child nodes,
delete at least a portion of the DL data buffered at the first
network node,
provide one or more UL scheduling grants to at least one
of the child nodes for UL data buffered at the at least
one child node, and refrain from providing one or more UL scheduling grants to the at least one child node.

17. The first network node of claim 15, wherein the UL and/or DL data associated with the second network node that is buffered at the first network node includes one or more of the following:

UL data originating from the second network node;

UL data originating from one or more descendant nodes of the second network node;

UL data originating from user equipment (UE) served directly or indirectly by the second network node;

DL data destined for the second network node;

DL data destined for one or more descendant nodes of the second network node; and DL data destined for UEs served directly or indirectly by the second network node.

18. The first network node of claim 15, wherein the instructions for modified handling of buffered data associated with the second network node include:

one or more first criteria related to amounts of DL data buffered at the first network node; and one or more second criteria related to whether DL data buffered at the first network node should be deleted or forwarded to respective descendant nodes.

* * * * *